US007460159B2

(12) United States Patent
Ohkawara et al.

(10) Patent No.: US 7,460,159 B2
(45) Date of Patent: Dec. 2, 2008

(54) IMAGE FORMING APPARATUS

(75) Inventors: Hisakazu Ohkawara, Tokyo (JP);
Hidenori Akamatsu, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 774 days.

(21) Appl. No.: 11/083,158

(22) Filed: Mar. 18, 2005

(65) Prior Publication Data
US 2005/0206744 A1 Sep. 22, 2005

(30) Foreign Application Priority Data

Mar. 19, 2004 (JP) ............................. 2004-079940
Sep. 13, 2004 (JP) ............................. 2004-265698

(51) Int. Cl.
*H04N 5/228* (2006.01)
(52) U.S. Cl. .................................. 348/222.1
(58) Field of Classification Search ............... 348/222.1
See application file for complete search history.

(56) References Cited

U.S. PATENT DOCUMENTS

| 3,636,250 | A | * | 1/1972 | Haeff .......................... 358/480 |
| 4,122,462 | A | * | 10/1978 | Hirayama et al. ........... 396/549 |
| 4,257,701 | A | * | 3/1981 | Hirayama et al. ............. 399/5 |
| 4,448,513 | A | * | 5/1984 | Hirayama et al. ............. 399/6 |
| 5,610,651 | A | * | 3/1997 | Yamakawa et al. .......... 347/250 |
| 6,157,400 | A | | 12/2000 | Genovese |
| 6,219,085 | B1 | | 4/2001 | Hanna |
| 6,236,418 | B1 | | 5/2001 | Yamakawa |
| 6,459,520 | B1 | * | 10/2002 | Takayama ................... 359/204 |
| 6,525,875 | B1 | * | 2/2003 | Lauer .......................... 359/371 |
| 6,833,856 | B2 | * | 12/2004 | Maeda ........................ 347/248 |
| 2003/0067533 | A1 | | 4/2003 | Omori et al. |
| 2005/0206744 | A1 | | 9/2005 | Ohkawara et al. |

FOREIGN PATENT DOCUMENTS

| JP | 3-110512 | 5/1991 |
| JP | 3020423 | 1/2000 |
| JP | 2000-258329 | 9/2000 |
| JP | 2001-180043 | 7/2001 |
| JP | 2003-279873 | 10/2003 |

OTHER PUBLICATIONS

John C. Mallinson, "Frequency Modulation in Video Tape Recorders", IEEE Transactions on Magnetics, vol. 34, No. 6, XP-011032099, Nov. 1998, pp. 3916-3921.
U.S. Appl. No. 11/222,797, filed Sep. 12, 2005, Ohkawara, et al.

* cited by examiner

*Primary Examiner*—James M Hannett
(74) *Attorney, Agent, or Firm*—Oblon, Spivak, McClelland, Maier & Neustadt, P.C.

(57) ABSTRACT

Magnification correction of an image is performed by changing the cycle time of an optional pixel in the unit of pixel, until a phase adjustment amount (phase shift value) calculated by fixing the frequency exceeds a preset specified value, and after the phase adjustment amount exceeds the preset specified value, magnification correction of the image is performed by changing the frequency of an image signal in the unit of a line or in the unit of a plurality of lines. Accordingly, the number of execution of the magnification correction of an image by the latter method, in which it is necessary to suspend the image forming operation at the time of execution thereof, can be reduced.

38 Claims, 43 Drawing Sheets

IMAGE FORMING APPARATUS

CROSS-REFERENCE TO RELATED APPLICATIONS

The present document incorporates by reference the entire contents of Japanese priority document, 2004-079940 filed in Japan on Mar. 19, 2004 and 2004-265698 filed in Japan on Sep. 13, 2004.

BACKGROUND OF THE INVENTION

1) Field of the Invention

The present invention relates to correcting magnification of an image in the image forming apparatuses.

2) Description of the Related Art

In laser printers, which are image forming apparatuses, a photoconductor, which is an image carrier, is scanned in a horizontal scanning direction (i.e., main scanning direction) by optical beams (laser beams) deflected by a deflector to write an image of the surface of the photoconductor. The deflector is, for example, a rotating polygon mirror.

Specifically, optical beams are deflected at an isometric velocity in the horizontal scanning direction by the deflector, and the optical beams are corrected from deflection at the isometric velocity to deflection at a uniform velocity by a f$\theta$ lens.

The f$\theta$ lenses are generally made of plastic. The shape or the refractive index of the plastic lens changes with surrounding temperature. If the shape or the refractive index changes, the scanning position deviates and results into a magnification error in the horizontal scanning direction. The magnification error leads to a degraded image. The refractive index also changes with the wavelength of the laser beam.

Various technologies have been proposed to correct the magnification error. In one approach, laser beams scanned in the horizontal scanning direction are respectively detected by laser beam detectors provided at two positions in the horizontal scanning direction, and the time difference between detection of the laser beams in the two detectors is measured, and the magnification in the horizontal scanning direction is corrected based on this time difference.

Laser printers are disclosed in Japanese Patent Application Laid-open No. 2003-279873. In one of these laser printers, a scanning target surface is scanned in the horizontal scanning direction by beams of light deflected by a deflector, the beams of light are respectively detected on a write start position side and a write end position side, to correct the phase data based on the fluctuation amount of time required for scanning between the two positions, and the phase of respective signals of an image clock that performs image formation based on the phase data is shifted (phase modulation), thereby correcting the magnification of the image in the horizontal scanning direction on the image carrier.

In other laser printer disclosed in Japanese Patent Application Laid-open No. 2003-279873, the whole misregistration of dots in the horizontal scanning direction is shifted by changing the frequency of the image clock (frequency modulation), to correct the magnification of the image in the horizontal scanning direction on the image carrier.

The laser printer that corrects the magnification of the image by phase modulation in which the phase of the image clock signal is shifted can change the correction amount in a short period of time, and hence, correction can be performed in between sheets of paper (at the timing when image formation is not performed), when images are continuously formed. However, since image degradation occurs more or less as compared with the magnification correction of the image by frequency modulation, there is a problem in that when the phase shift amount of the image clock signal increases, degradation in the formed image increases.

On the other hand, when magnification correction of the image is performed by frequency modulation in which the whole misregistration amount of dots is shifted, a better image can be obtained as compared with the one obtained by phase modulation. In the case of frequency modulation, however, a PLL circuit is normally used for generating a pixel clock for modulating the laser beams corresponding to an image signal. The PLL circuit includes a voltage control oscillator that changes the frequency according to the applied voltage, and it is necessary to stop the printing operation until the PLL oscillating frequency is stabilized after having started a change in the oscillating frequency of the PLL, thereby causing inconvenience.

That is, in the case of a method of correcting the frequency of the image signal, for example, number of prints and time are counted, and magnification correction of the image by frequency modulation is performed at an interval of certain time that is considered not to cause a side effect such as image degradation. In this case, however, image forming operation is suspended in order to correct the magnification of the image by frequency modulation. Therefore, there is a problem in that as the number of suspension increases, the gross printing speed (number of image formation per unit time) as an image forming apparatus largely decreases.

Further, when magnification correction of an image is performed by frequency modulation, if the timing for performing the frequency correction is previously set, then even when the magnification error in the horizontal scanning direction increases in the period after frequency correction of the image signal until the next frequency correction is performed, frequency correction is not performed until the timing for the next frequency correction, and hence, image degradation occurs during this time.

SUMMARY OF THE INVENTION

It is an object of the present invention to solve at least the problems in the conventional technology.

An image forming apparatus according to an aspect of the present invention includes a deflector that deflects optical beams modulated according to an image signal to perform scanning in a horizontal scanning direction to form an image on an image carrier; two optical beam detectors that respectively detect optical beams deflected by the deflector at two positions on a horizontal scanning line; a time difference measuring unit that measures the time difference between detection of the optical beams by the detectors; a magnification correcting unit that corrects the magnification of an image in the horizontal scanning direction based on the time difference measured by the time difference measuring unit, wherein the magnification correcting unit includes a frequency modulator that performs magnification correction of an image by changing a frequency of the image signal in units of a line or lines; and a phase modulator that performs magnification correction of the image by fixing the frequency and changing a cycle time of an optional pixel in units of pixel; a comparing unit that compares the phase adjustment amount calculated by the phase modulator with a preset specified value; and an arrangement that causes the phase modulator to perform the magnification correction of the image upon the comparing unit determining that the phase adjustment amount does not exceed the specified value, and, once the comparing unit determines that the phase adjustment amount exceeds the specified value, causes the frequency modulator to perform the magnification correction of the image.

An image forming apparatus according to another aspect of the present invention includes a deflector that deflects optical beams modulated according to an image signal to perform scanning in a horizontal scanning direction to form, an image on an image carrier; two optical beam detectors that respectively detect optical beams deflected by the deflector at two positions on a horizontal scanning line; a time difference measuring unit that measures the time difference between detection of the optical beams by the detectors; a magnification correcting unit that corrects the magnification of an image in the horizontal scanning direction based on the time difference measured by the time difference measuring unit, wherein the magnification correcting unit includes a frequency modulator that performs magnification correction of an image by changing a frequency of the image signal in units of line or lines; and a phase modulator that performs magnification correction of the image by changing a cycle time of an optional pixel in units of pixel; a comparing unit that compares a phase adjustment amount in a predetermined region in the horizontal scanning direction calculated by the phase modulator with a preset specified value; and an arrangement that, depending on the result obtained by the comparing unit, decides whether the phase modulator to perform the magnification correction of the image or the frequency modulator to perform the magnification correction of the image.

An image forming apparatus according to still another aspect of the present invention includes a deflector that deflects optical beams modulated according to an image signal to perform scanning in a horizontal scanning direction to form an image on an image carrier; two optical beam detectors that respectively detect optical beams deflected by the deflector at two positions on a horizontal scanning line; a time difference measuring unit that measures the time difference between detection of the optical beams by the detectors; a magnification correcting unit that corrects the magnification of an image in the horizontal scanning direction based on the time difference measured by the time difference measuring unit, wherein the magnification correcting unit includes a frequency modulator that performs magnification correction of an image by changing a frequency of the image signal in units of line or lines; and a phase modulator that performs magnification correction of the image by changing a cycle time of an optional pixel in units of pixel; a comparing unit that compares the phase adjustment amount in a predetermined region in the horizontal scanning direction calculated by the phase modulator with a preset specified value; a predetermined region-changing unit that changes the predetermined region in the horizontal scanning direction corresponding to an image area in the horizontal scanning direction; and an arrangement that, depending on the result obtained by the comparing unit, decides whether the phase modulator to perform the magnification correction of the image or the frequency modulator to perform the magnification correction of the image.

An image forming apparatus according to still another aspect of the present invention includes a deflector that deflects optical beams modulated according to an image signal to perform scanning in a horizontal scanning direction to form an image on an image carrier; two optical beam detectors that respectively detect optical beams deflected by the deflector at two positions on a horizontal scanning line; a time difference measuring unit that measures the time difference between detection of the optical beams by the detectors; a magnification correcting unit that corrects the magnification of an image in the horizontal scanning direction based on the time difference measured by the time difference measuring unit, wherein the magnification correcting unit includes a frequency modulator that performs magnification correction of an image by changing a frequency of the image signal in units of line or lines; and a phase modulator that performs magnification correction of the image by changing a cycle time of an optional pixel in units of pixel; a comparing unit that compares the phase adjustment amount in a predetermined region in the horizontal scanning direction calculated by the phase modulator with a preset specified value; a predetermined region-changing unit that changes the predetermined region in the horizontal scanning direction depending on a size, a shape, or an orientation of a transfer paper; and an arrangement that, depending on the result obtained by the comparing unit, decides whether the phase modulator to perform the magnification correction of the image or the frequency modulator to perform the magnification correction of the image.

An image forming apparatus according to still another aspect of the present invention includes a deflector that deflects optical beams modulated according to an image signal to perform scanning in a horizontal scanning direction to form an image on an image carrier; two optical beam detectors that respectively detect optical beams deflected by the deflector at two positions on a horizontal scanning line; a time difference measuring unit that measures the time difference between detection of the optical beams by the detectors; a magnification correcting unit that corrects the magnification of an image in the horizontal scanning direction based on the time difference measured by the time difference measuring unit, wherein the magnification correcting unit includes a frequency modulator that performs magnification correction of an image by changing a frequency of the image signal in units of line or lines; and a phase modulator that performs magnification correction of the image by fixing the frequency and changing a cycle time of an optional pixel in the unit of pixel; a comparing unit that compares the phase adjustment amount calculated by the phase modulator with a preset specified value; a specified value-changing unit that changes the specified value according to an image type; and an arrangement that causes the phase modulator to perform the magnification correction of the image until the comparing unit determines that the phase adjustment amount exceeds the specified value, and, once the comparing unit determines that the phase adjustment amount exceeds the specified value, causes the frequency modulator to perform the magnification correction of the image.

An image forming apparatus according to still another aspect of the present invention includes a deflector that deflects optical beams modulated according to an image signal to perform scanning in a horizontal scanning direction to form an image on an image carrier; two optical beam detectors that respectively detect optical beams deflected by the deflector at two positions on a horizontal scanning line; a time difference measuring unit that measures the time difference between detection of the optical beams by the detectors; a magnification correcting unit that corrects the magnification of an image in the horizontal scanning direction based on the time difference measured by the time difference measuring unit, wherein the magnification correcting unit includes a frequency modulator that performs magnification correction of an image by changing a frequency of the image signal in units of a line or lines; and a phase modulator that performs magnification correction of the image by fixing the frequency and changing a cycle time of an optional pixel in units of pixel; a comparing unit that compares the phase adjustment amount in a horizontal scanning predetermined region calculated by the phase modulator with a preset specified value; a specified value-changing unit that changes the specified value according to an image type; an arrangement that, depending on the result obtained by the comparing unit, decides whether the phase modulator to perform the magnification correction of the image or the frequency modulator to perform the magnification correction of the image.

An image forming apparatus according to still another aspect of the present invention includes a deflector that deflects optical beams modulated according to an image signal to perform scanning in a horizontal scanning direction to form an image on an image carrier; two optical beam detectors that respectively detect optical beams deflected by the deflector at two positions on a horizontal scanning line; a time difference measuring unit that measures the time difference between detection of the optical beams by the detectors; a magnification correcting unit that corrects the magnification of an image in the horizontal scanning direction based on the time difference measured by the time difference measuring unit, wherein the magnification correcting unit includes a frequency modulator that performs magnification correction of an image by changing a frequency of the image signal in units of a line or lines; and a phase modulator that performs magnification correction of the image by fixing the frequency and changing a cycle time of an optional pixel in units of pixel; and a frequency adjustment amount converter that converts the phase adjustment amount set by the phase modulator to a frequency adjustment amount by the frequency modulator.

An image forming apparatus according to still another aspect of the present invention includes a deflector that deflects optical beams modulated according to an image signal to perform scanning in a horizontal scanning direction to form an image on an image carrier; two optical beam detectors that respectively detect optical beams deflected by the deflector at two positions on a horizontal scanning line; a time difference measuring unit that measures the time difference between detection of the optical beams by the detectors; a magnification correcting unit that corrects the magnification of an image in the horizontal scanning direction based on the time difference measured by the time difference measuring unit, wherein the magnification correcting unit includes a frequency modulator that performs magnification correction of an image by changing a frequency of the image signal in units of a line or lines; and a phase modulator that performs magnification correction of the image by fixing the frequency and changing a cycle time of an optional pixel in units of pixel; a frequency adjustment amount converter that converts the phase adjustment amount set by the phase modulator to a frequency adjustment amount by the frequency modulator; a comparing unit that compares the phase adjustment amount in a horizontal scanning predetermined region with a preset specified value; a region-changing unit that changes the horizontal scanning predetermined region according to a horizontal scanning imaging range; and an arrangement that causes the phase modulator to perform the magnification correction of the image upon the comparing unit determining that the phase adjustment amount does not exceed the specified value, and, once the comparing unit determines that the phase adjustment amount exceeds the specified value, causes the frequency modulator to perform the magnification correction of the image based on the frequency adjustment amount calculated by the frequency adjustment amount converter.

An image forming apparatus according to still another aspect of the present invention includes a deflector that deflects optical beams modulated according to an image signal to perform scanning in a horizontal scanning direction to form an image on an image carrier; two optical beam detectors that respectively detect optical beams deflected by the deflector at two positions on a horizontal scanning line; a time difference measuring unit that measures the time difference between detection of the optical beams by the detectors; a magnification correcting unit that corrects the magnification of an image in the horizontal scanning direction based on the time difference measured by the time difference measuring unit, wherein the magnification correcting unit includes a frequency modulator that performs magnification correction of an image by changing a frequency of the image signal in units of a line or lines; and a phase modulator that performs magnification correction of the image by fixing the frequency and changing a cycle time of an optional pixel in units of pixel; a frequency adjustment amount converter that converts the phase adjustment amount set by the phase modulator to a frequency adjustment amount by the frequency modulator; a comparing unit that compares the phase adjustment amount in a horizontal scanning predetermined region exceeds a preset specified value; a region-changing unit that changes the horizontal scanning predetermined region according to a size, a shape, or an orientation of a transfer paper; and an arrangement that causes the phase modulator to perform the magnification correction of the image upon the comparing unit determining that the phase adjustment amount does not exceed the specified value, and, once the comparing unit determines that the phase adjustment amount exceeds the specified value, causes the frequency modulator to perform the magnification correction of the image based on the frequency adjustment amount calculated by the frequency adjustment amount converter.

The other objects, features, and advantages of the present invention are specifically set forth in or will become apparent from the following detailed description of the invention when read in conjunction with the accompanying drawings.

DETAILED DESCRIPTION

Exemplary embodiments of the present invention will be explained below with reference to the accompanying drawings.

Figure 1:
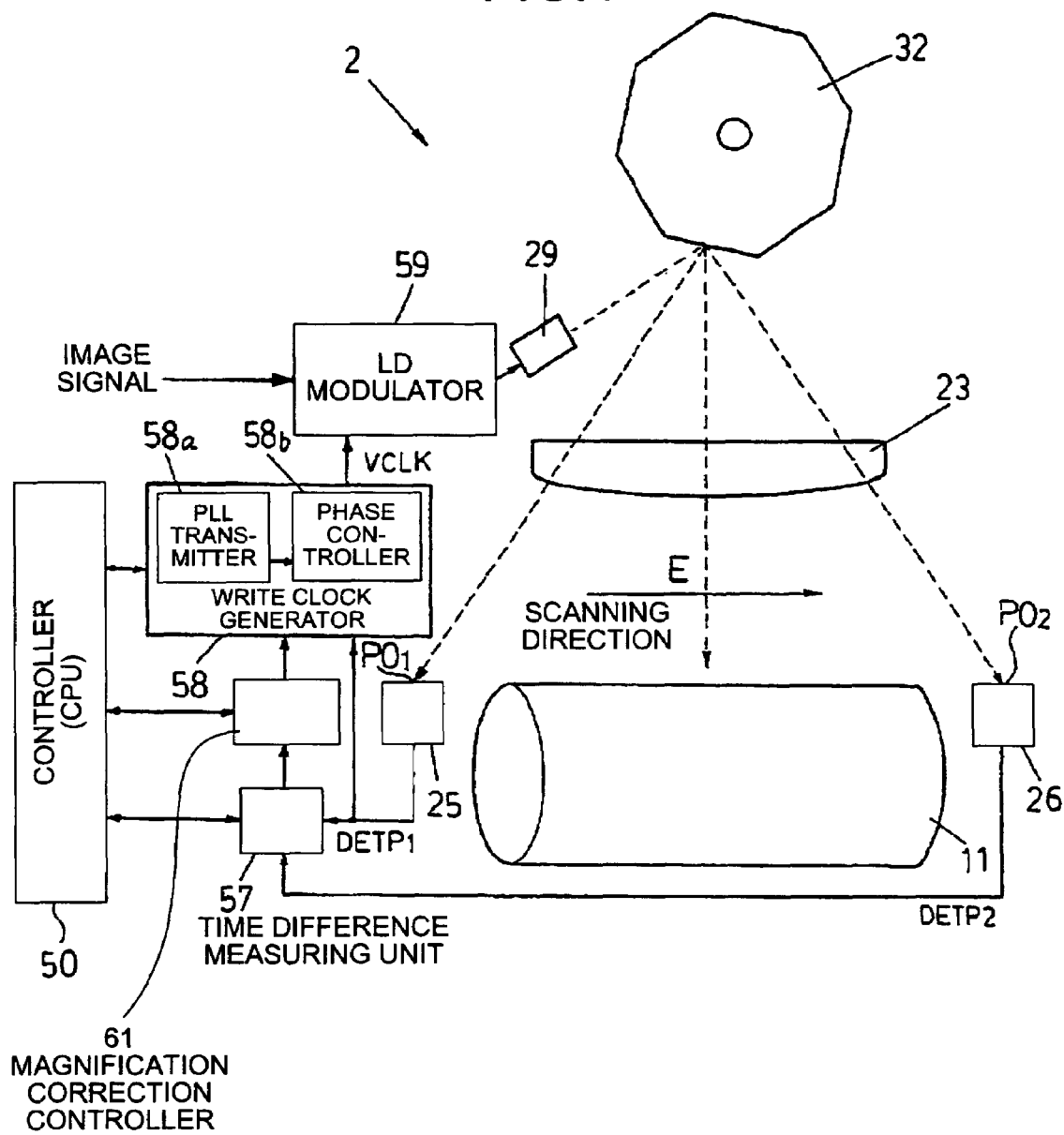
FIG. 1 is a schematic block diagram of relevant parts of an optical scanner and a photoconductor together with an associated control system of an image forming apparatus according to a first embodiment of the present invention.
Figure 2:
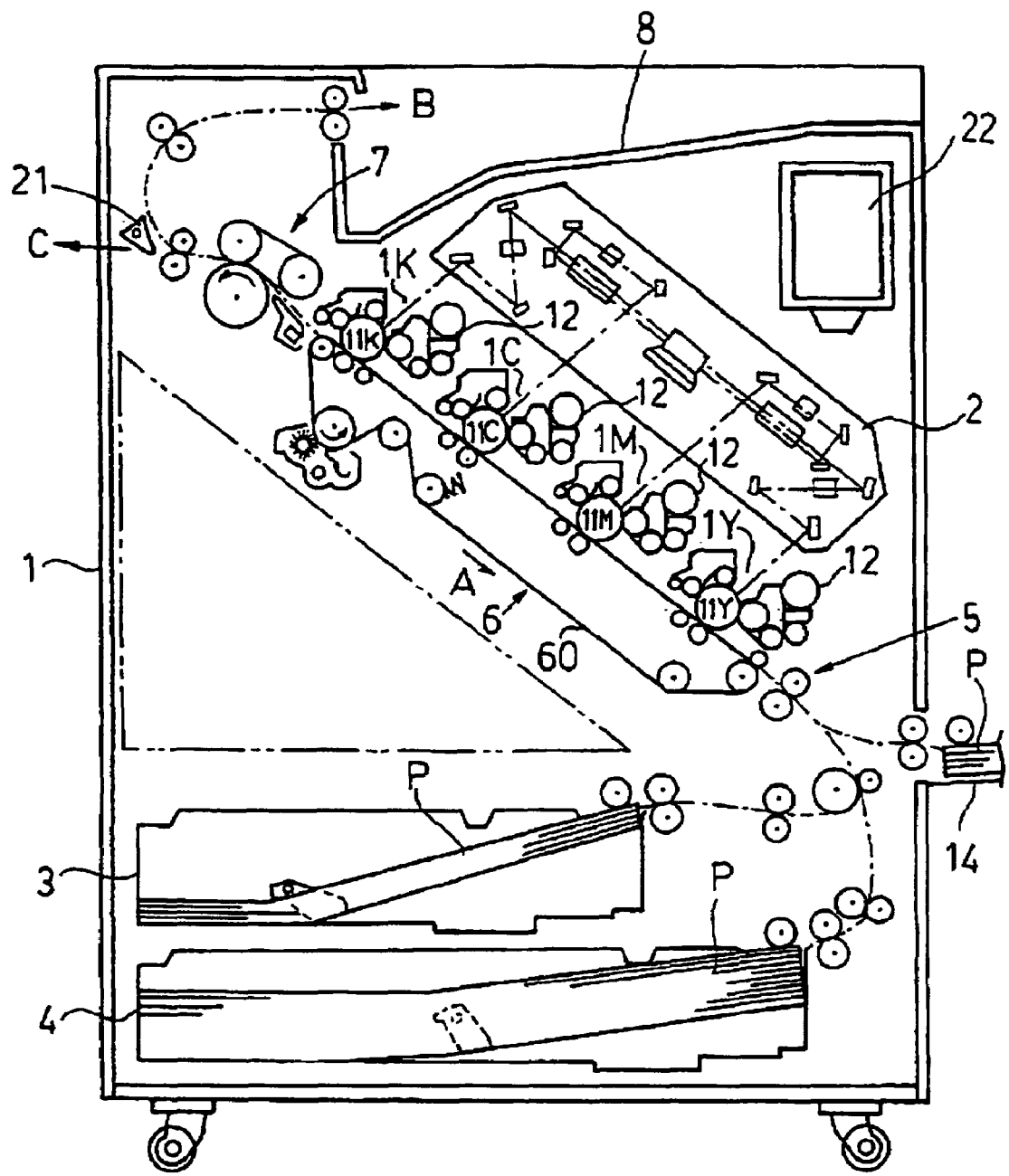
FIG. 2 is an overall block diagram of a laser printer that is an example of the image forming apparatus.

FIG. 1 is a schematic block diagram of relevant parts of an optical scanner and a photoconductor together with an associated control system of an image forming apparatus according to a first embodiment of the present invention. FIG. 2 is an overall block diagram of a laser printer, being the image forming apparatus.

An optical scanner 2 in the laser printer, being the image forming apparatus shown in FIG. 1, includes: a polygon mirror 32, being a deflector that deflects to scan optical beams modulated corresponding to an image signal in the horizontal scanning direction to form an image on a photoconductor 11, being an image carrier; sensors 25 and 26, being two optical beam detectors that respectively detect optical beams deflected by the polygon mirror 32 at two positions $PO_1$ and $PO_2$ on a horizontal scanning line; the time difference measuring unit 57 that measures the time difference since one sensor 25, of two sensors 25 and 26, has detected the optical beam until the other sensor 26 detects the optical beam; a magnification correction controller 61 that functions as a magnification correction unit that corrects the magnification of an image in the horizontal scanning direction on the photoconductor 11 corresponding to the time difference measured by the time difference measuring unit 57; and a write clock generator 58.

The write clock generator 58 includes two units, that is, a PLL transmitter 58a that functions as a frequency modulator that performs magnification correction of an image in the horizontal scanning direction, by changing the frequency of the image signal in the unit of a line or in the unit of a plurality of lines, and a phase controller 58b that functions as a phase modulator that performs magnification correction of the image in the horizontal scanning direction by fixing the frequency and changing the cycle time of an optional pixel in the unit of pixel. In the first embodiment, the magnification correction controller 61 also functions as the frequency modulator and the phase modulator.

The laser printer is also provided with a phase adjustment amount-determining unit that determines the magnitude correlation between the phase adjustment amount between the sensors 25 and 26 calculated by the phase modulator by fixing the frequency of the image signal and a set specified value, and the magnification correction controller 61 functions as the phase adjustment amount-determining unit. Further, in the laser printer, the controller 50 (micro computer) controls such that the phase modulator performs magnification correction of an image in the horizontal scanning direction until the phase adjustment amount exceeds the specified value, and after the phase adjustment amount exceeds the specified value, the frequency modulator performs magnification correction of the image in the horizontal scanning direction, based on the determination result of the magnification correction controller 61.

The laser printer is an image forming apparatus that forms an image by using an electrographic method, as the whole configuration thereof is shown in FIG. 2, wherein photosensitive drums 11Y, 11M, 11C, and 11K (hereinafter, simply as the photoconductor 11, unless otherwise specified), being an image carrier that forms an image of the respective colors of yellow (Y), magenta (M), cyan (C), and black (B), are respectively arranged with a space therebetween along the direction of the arrow A, being a traveling direction of a transfer carrier belt 60 of a belt drive 6. A corresponding development unit 12 is respectively provided for the four photoconductors 11.

An optical scanner 2 is arranged above the four photoconductors 11. Paper feed cassettes 3 and 4 are provided in the lower part of an apparatus body 1 of the laser printer, and a resist roller pair 5, and the belt drive 6 that sequentially carries transfer paper (sheet) P to a toner image forming unit where the photoconductor 11 is provided, in the state with the transfer paper P carried, and carries the transfer paper P to a fixing unit 7 are also provided. In the first embodiment, the belt drive 6 functions as a transfer unit.

Further, the laser printer includes a paper ejection tray 8, a manual feed tray 14, a toner supply container 22, and the like.

In the laser printer, the transfer paper P is carried on a transport route shown by one-dot chain line in FIG. 2, an image is formed thereon, and the transfer paper P is ejected on the paper ejection tray 8.

That is, when starting the image forming operation, the transfer paper P fed from the paper feed cassettes 3, 4, or the manual feed tray 14 is carried to the resist roller pair 5, while being guided by a transport guide plate and stopped there temporarily.

The resist roller pair 5 rotates at a predetermined timing, and the transfer paper P is carried onto the transfer carrier belt 60 and electrostatically attracted onto the belt surface. The transfer paper P is then carried to the toner image forming unit where the photoconductor 11 is provided by the transfer carrier belt 60 rotating in a direction of the arrow A in FIG. 2.

Toner images of the respective colors formed on the respective photoconductors 11Y, 11M, 11C, and 11K are sequentially transferred and superposed on the transfer paper P by an action of transfer electric field an a nip pressure in the toner image forming unit. Accordingly, a full colored toner image is formed on the transfer paper P.

After the toner image has been transferred onto the transfer paper P, the surfaces of the respective photoconductors 11 are cleaned and the electricity is removed therefrom by respective cleaning units, and are prepared for the next formation of the electrostatic latent image.

The transfer paper P on which the full-color toner image is formed is carried toward a first paper ejection direction shown by the arrow B or a second paper ejection direction shown by the arrow C, corresponding to a switching position of a switching guide 21, after the toner image has been fixed by the fixing unit 7.

When the transfer paper P is ejected onto the paper ejection tray 8 from the first paper ejection direction, the transfer paper P is ejected in a so-called face down state, with the image surface facing down, and stacked. When the transfer paper P is ejected in the second paper ejection direction, the transfer paper P is carried toward a post-processor (not shown) such as a sorter, a stapler, or the like.

The optical scanner 2 emits optical beams (laser beams), as shown in FIG. 1, from a laser diode (LD) 29, being an optical beam generator that lights up according to an image signal. The optical beams are turned into parallel beams by a collimate lens, passes through a cylindrical lens, is deflected by the polygon mirror 32, passes through an fθ lens 23 and a toroidal lens (hereinafter, "BTL"), and scans the photoconductor 11. The BTL performs focusing mainly in the vertical scanning direction, that is, performs condensing function and position correction (cross-scan error compensation and the like) in the vertical scanning direction.

In FIG. 1, only one of the four photoconductors 11 is shown. The other three photoconductors and corresponding optical scanners have the same configuration, with only the color of an image to be formed being different, and hence the illustration thereof is omitted.

The polygon mirror 32 is rotated by a polygon motor as a driving unit, and the fθ lens mainly performs velocity transformation so that the laser beams scanning at an isometric velocity by the polygon mirror 32 is converted so as to scan on the photoconductor 11 at a constant velocity.

Scanning light by the laser beams reflected by the polygon mirror 32 and transmitted through the fθ lens 23 is respectively detected with the time difference by the sensors 25 and 26. The sensor 25 also serves as a synchronism detection sensor for detecting a laser beam-scanning synchronization signal, which becomes a synchronism detection signal.

When the sensors 25 and 26 respectively detect the scanning light, the sensor 25 outputs a laser beam detection signal DETP1, and the sensor 2 outputs a laser beam detection signal DETP2, and the laser beam detection signals DETP1 and DETP2 are transmitted to the time difference measuring unit 57. The time difference measuring unit 57 has a calculation function of measuring the time difference between the time when the laser beam detection signals DETP1 and DETP2 are output, and averaging the time difference, and the time difference measuring unit 57 performs measurement and calculation of the time difference between the laser beam detection signals DETP1 and DETP2, according to the set timing from the controller (CPU) 50, and transmits the measurement result and the calculation result to the magnification correction controller 61.

The magnification correction controller 61 has a storage unit that stores initially set values and current set values of the set write clock frequency and phase shift value (phase adjustment amount) transmitted from the controller 50, and has a function of calculating the phase shift value (phase adjustment amount) when an optimum write clock frequency is set, by using the fact that the image magnification in the horizontal scanning direction is changed by the frequency of the write clock and by using the fact that the image magnification is changed by shifting the phase.

The magnification correction controller 61 has a function of calculating the optimum phase shift value (phase adjustment amount) by fixing the write clock frequency, and also has a function of comparing the calculated phase shift value with the specified value set by the controller 50, thereby transmitting a write clock setting signal and a control signal for executing the phase shift to the write clock generator 58 at a predetermined timing respectively.

The write clock generator 58 includes a PLL transmitter 58a that generates a clock n times as large as a write clock VCLK upon reception of a clock from an oscillator (not shown), and the phase controller 58b having a function of dividing the frequency of a PLL transmission clock by n, synchronized with the laser beam detection signal DETP1 as a synchronization detection signal to generate the write clock VCLK synchronized with the laser beam detection signal DETP1 and a function of shifting (changing) the write clock cycle time of an optional pixel in the unit of pixel by adding or subtracting double of the integer in the half cycle of the PLL transmission clock to or from a special cycle of the write clock.

The write clock generator 58 executes generation of the write clock and phase shift under control of the magnification correction controller 61.

The write clock VCLK subjected to the image magnification correction in the horizontal scanning due to changeability of the write clock frequency and the phase shift value by the write clock generator 58 is transmitted to an LD modulator 59 that functions as an optical beam generator actuator.

The LD modulator 59 controls lighting of the laser diode 29 in an LD unit according to the image signal synchronized with the write clock VCLK from the write clock generator 58. Accordingly, laser beams modulated according to the image signal are emitted from the laser diode 29, and the laser beams are deflected by the rotating polygon mirror 32 to scan the photoconductor 11 via the fθ lens 23 in the direction of the arrow E in FIG. 1.

In FIG. 1, an example in which the write clock generator 58, the time difference measuring unit 57, and the magnification correction controller 61 are formed respectively in separate blocks has been explained, but the configuration can be such that these constitute a write clock generator as a single block.

The magnification correction processing of an image performed by the control system in the image forming apparatus according to the present invention will be explained with reference to FIG. 3.

Figure 3:
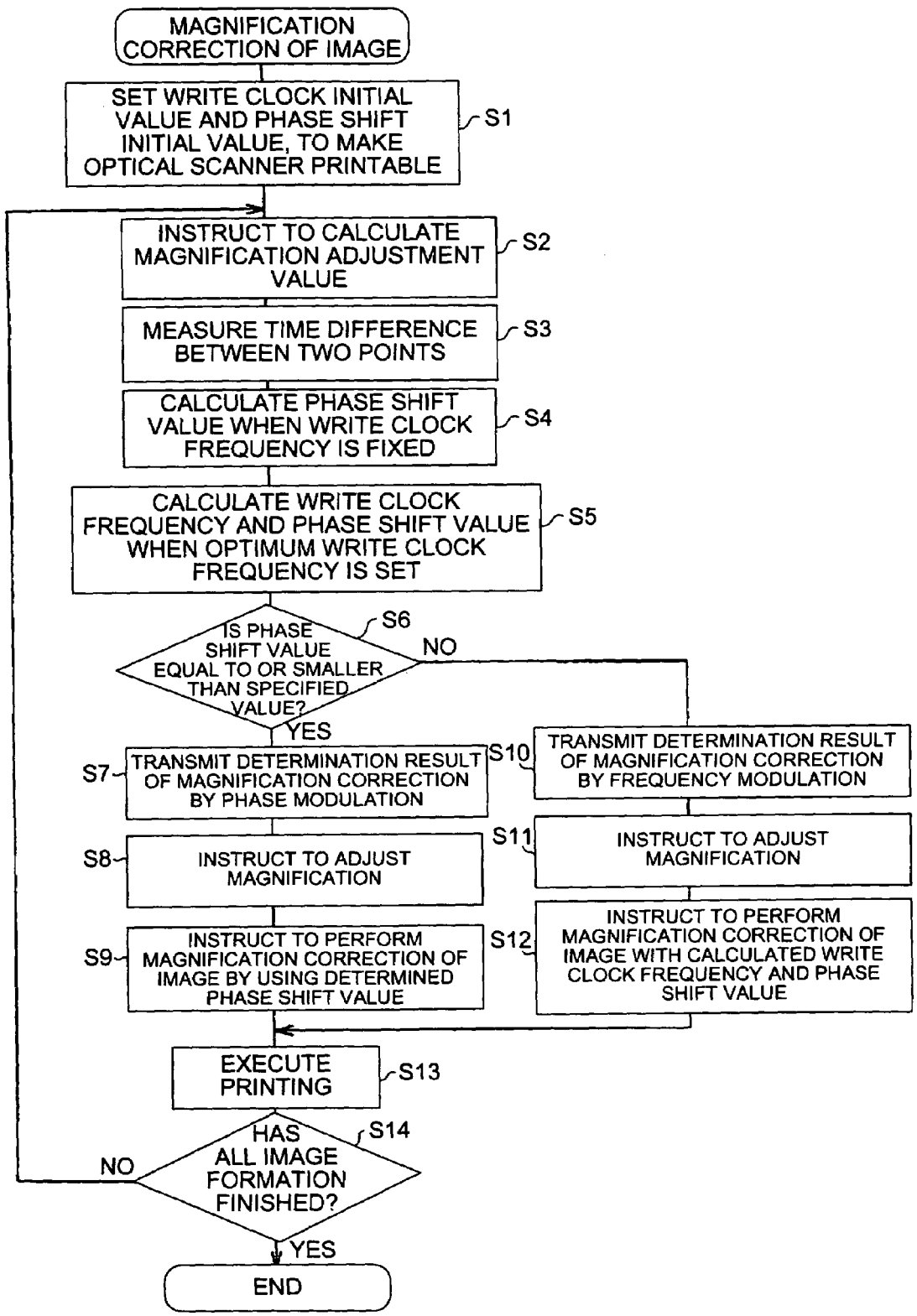
FIG. 3 is a flowchart of a routine for a magnification correction of an image performed by the control system in the image forming apparatus according to the first embodiment.

When the routine in FIG. 3 is started, the controller 50 sets a write clock initial value and a phase shift initial value in the magnification correction controller 61, at step S1, at a predetermined timing such as after turning the power on or restarting after having stopped the machine, and makes the optical scanner 2 printable corresponding to the set write clock initial value and phase shift initial value. In this state, since the printing is possible, printing can be performed.

At next step S2, at the timing when the polygon mirror 32 is rotating between sheets or during printing, and when the laser diode 29 is in the state capable of lighting, the controller 50 outputs an instruction to calculate a magnification adjustment value to the time difference measuring unit 57 and the magnification correction controller 61, respectively.

At step S3, the controller 50 allows the time difference measuring unit 57 to measure the time difference since the sensor 25 has detected the laser beam at specified timing until the sensor 26 detects the laser beam for the specified number of measurements, to calculate a mean value of the measurement result. As a result, the time difference measuring unit 57 outputs the mean value or the like of the measurement result of the time difference to the magnification correction controller 61.

At next step S4, the controller 50 allows the magnification correction controller 61 to calculate a phase shift value (phase adjustment amount) when the write clock frequency is fixed from the mean value or the like of the measurement result of the time difference. At step S5, substantially at the same timing as at step S4 in parallel, the controller 50 allows the magnification correction controller 61 to calculate a write clock frequency (write clock value) and a phase shift value when an optimum write clock frequency is set from the mean value or the like of the measurement result of the time difference.

At step S6, the controller 50 determines the magnitude correlation between the phase shift value (phase adjustment amount) calculated at step S4 and the specified value preset in the controller 50, that is, whether the phase shift value is equal to or smaller than the specified value, and stores the comparison result (magnitude correlation) in the storage unit.

According to the determination, when the phase shift value is equal to or smaller than the specified value, that is, when the phase shift value does not exceed the specified value (YES), at step S7, the controller 50 transmits the determination result such that magnification correction of an image is to be executed by phase modulation, by which magnification correction of the image can be performed without expanding the interval between sheets even during continuous printing, to the write clock generator 58.

At step S8, the controller 50 issues a magnification adjustment instruction to the magnification correction controller 61 at the timing effective for printing after having calculated the phase shift value. Accordingly, the magnification correction controller 61 stores the instruction. At step S9, the magnification correction controller 61 transmits a control signal for performing the magnification correction of the image by using the determined phase shift value to the write clock generator 58. Accordingly, the magnification correction of the image is performed by changing the cycle time of an optional pixel in the unit of pixel.

According to the determination at step S6, when the phase shift value is larger than the specified value, and the phase shift value exceeds the specified value, control proceeds to step S10, where a determination result of magnification correction by the frequency modulation for performing magnification correction of an image by changing the write clock frequency (frequency of an image signal) in the unit of a line or in the unit of a plurality of lines is transmitted to the write clock generator 58.

The magnification correction by the frequency modulation cannot be performed at timing during image formation, and a certain period of time is necessary for the magnification correction. Therefore, it is necessary to have an interval between sheets during continuous printing. Accordingly, continuous printing is temporarily suspended, and at step S11, a magnification adjustment instruction is sent to the magnification correction controller 61 at a convenient timing.

Accordingly, the magnification correction controller 61 stores the instruction. At step S12, the controller 50 allows the magnification correction controller 61 to transmit a control signal for performing the magnification correction of the image with optimum write clock frequency and phase shift value calculated at step S5 to the write clock generator 58. Accordingly, magnification correction of the image is performed by the frequency modulation in which the frequency of the image signal is changed in the unit of a line or in the unit of a plurality of lines.

At step S13, printing is executed according to the control signal set and transmitted to the write, clock generator 58 at step S9, or the control signal set and transmitted to the write clock generator 58 at step S12.

At step S14, it is determined whether the all set image formation has finished, and if the image formation has finished, the processing in this routine is finished. If all image formation has not finished yet, with returning to step S2, to repeat the processing and determination at step S2 and following steps at a predetermined timing.

Thus, in the image forming apparatus (laser printer) according to the first embodiment, magnification correction of an image is performed by changing the cycle time of an optional pixel in the unit of pixel until the phase adjustment value (phase shift value) exceeds a preset specified value, and after the phase adjustment value exceeds the preset specified value, magnification correction of the image is performed by changing the frequency of the image signal in the unit of pixel or in the unit of a plurality of pixels. Therefore, in the latter case, continuous printing must be suspended temporarily to have an interval between sheets, but the number of execution of magnification correction of the image by frequency modulation can be reduced, and as a result, the productivity of image formation can be improved.

Figure 4:
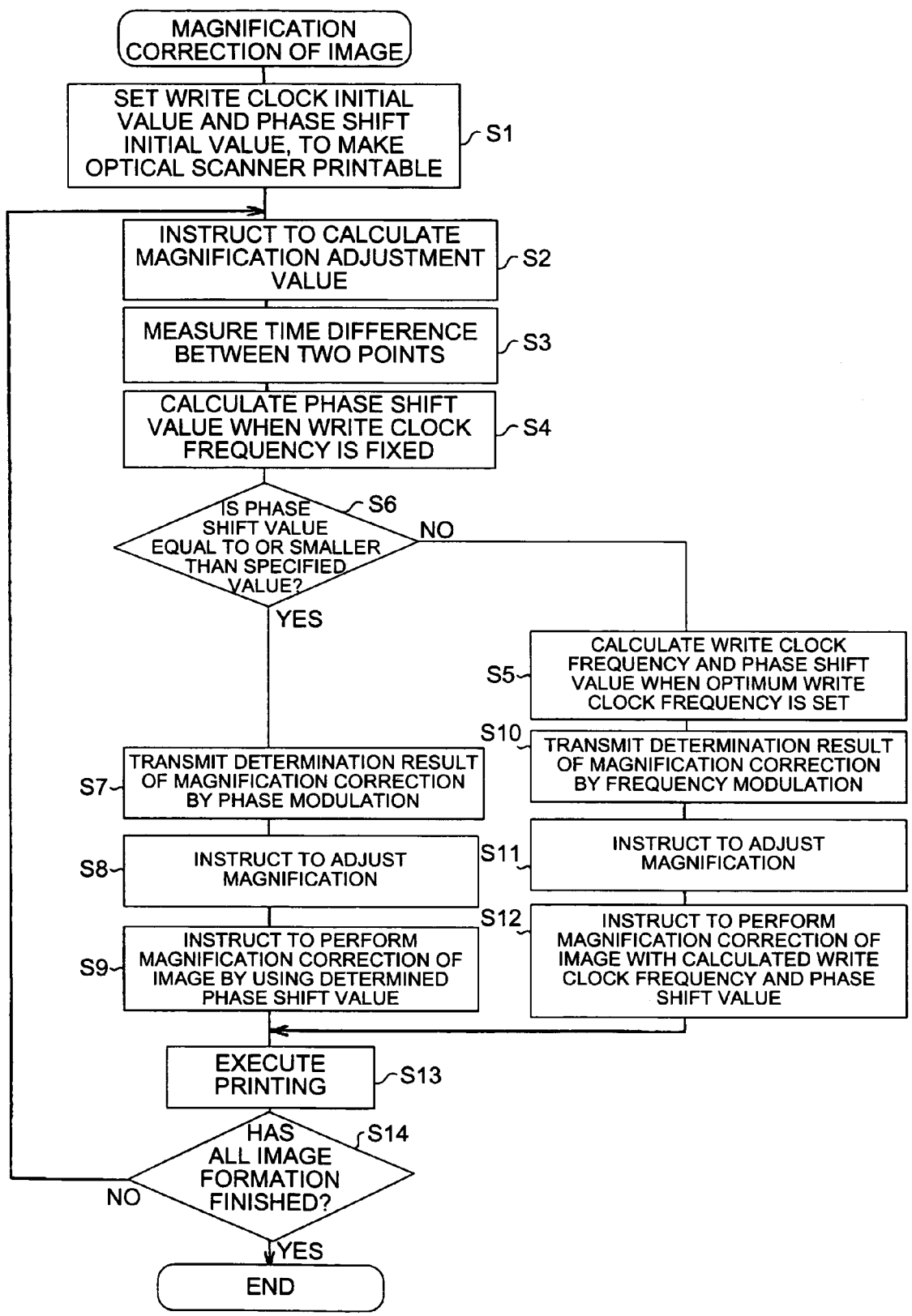
FIG. 4 is a flowchart of a routine for a magnification correction of an image performed by a control system in an image forming apparatus according to a second embodiment of the present invention.

FIG. 4 is a flowchart of a routine for the magnification correction of an image performed by a control system in an image forming apparatus according to a second embodiment of the present invention. For the brevity of explanation, like step numbers are used for like parts in FIG. 3. The configuration of the whole image forming apparatus according to the second embodiment is the same as that of the first embodiment. Moreover, the configuration of the control system is the same as that explained with reference to FIG. 1, but only the content of the control performed by the controller (CPU) is different.

In the image forming apparatus according to the second embodiment, when the routine shown in FIG. 4 is started, the processing explained at steps S1 to S4 in FIG. 3 is respectively performed, so that the magnification correction controller 61 calculates a phase shift value (phase adjustment amount) when the write clock is fixed by a mean value of the measurement result of the time difference measured at step S3.

Thereafter, control proceeds to step S6, where the controller 50 determines the magnitude correlation between the phase shift value calculated at step S4 and the specified value preset in the controller 50, that is, whether the phase shift value is equal to or smaller than the specified value, and stores the comparison result (magnitude correlation) in the storage unit.

According to the determination, when the phase shift value is equal to or smaller than the specified value, that is, when the phase shift value does not exceed the specified value (YES), the same processing and determination at step S7 and following steps in FIG. 3 are performed.

According to the determination at step S6, when the phase shift value is larger than the specified value, and the phase shift value exceeds the specified value, control proceeds to step S5, to perform the same processing as that explained at step S5 in FIG. 3. That is, the magnification correction controller 61 calculates a write clock value and a phase shift value when an optimum write clock frequency is set from the mean value or the like of the measurement result of the time difference. Thereafter, the same processing and determination as those explained at step S10 and onward in FIG. 3 are performed.

In other words, in the second embodiment, only when the phase shift value when the write clock is fixed is larger than the specified value, calculation of the write clock value and the phase shift value when the optimum write clock frequency is set is performed.

The same effects as in the first embodiment can be obtained in the second embodiment.

Figure 5:
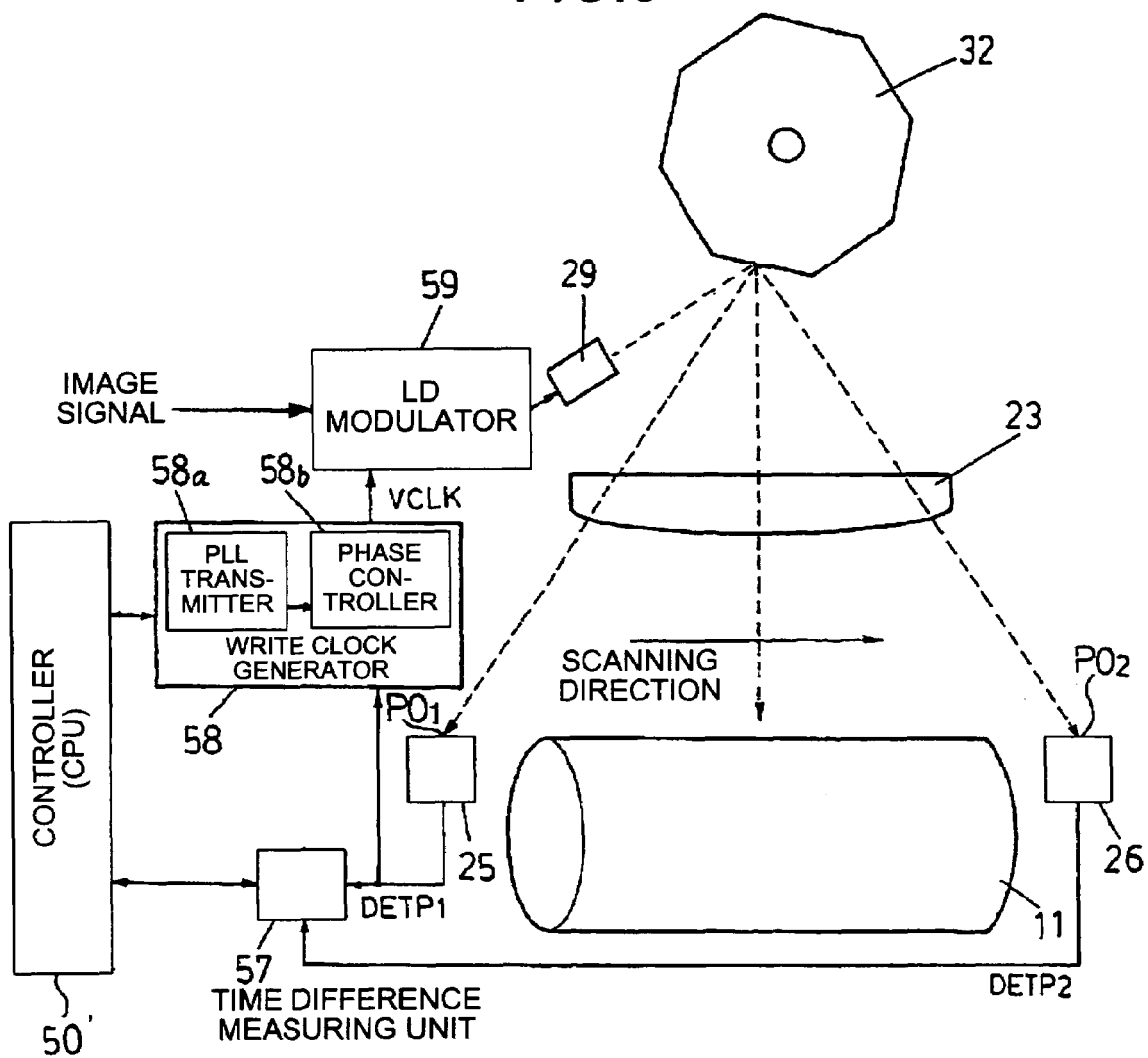
FIG. 5 is a schematic block diagram of relevant parts of an optical scanner and a photoconductor together with an associated control system of an image forming apparatus according to a third embodiment of the present invention.

FIG. 5 is a schematic block diagram of relevant parts of an optical scanner and a photoconductor together with an associated control system of an image forming apparatus according to a third embodiment of the present invention; and FIG.

6 is a flowchart of a routine for a magnification correction of an image performed by the control system. In FIG. 5, like reference signs are designated with like parts in FIG. 1.

The configuration of the image forming apparatus according to the third embodiment is the same as that shown in FIG. 2.

The image forming apparatus according to the third embodiment is different from the image forming apparatus according to the first embodiment in that a controller (CPU) 50' performs the function of the magnification correction controller 61 shown in FIG. 3. The controller 50' is a microcomputer same as the controller 50, and only the content to be controlled by the controller 50 is different.

The time difference measuring unit 57 performs time difference measurement and calculation between the laser beam detection signals DETP1 and DETP 2, and transmits the measurement result and the calculation result to the controller 50'. The controller 50' has a storage unit that stores the initially set values and the current set values of the write clock frequency and the phase shift value (phase adjustment amount), and has a function of calculating the optimum write clock frequency and the phase shift value by using the fact that the image magnification in the horizontal scanning direction is changed by the frequency of the optimum write clock, and by using the fact that the image magnification is changed by shifting the phase.

The controller 50' has a function of calculating the optimum phase shift value (phase adjustment amount) by fixing the write clock frequency, and also has a function of comparing the calculated phase shift value with the preset specified value, thereby transmitting a write clock setting signal and a control signal for executing the phase shift to the write clock generator 58 at a predetermined timing respectively.

That is, in the third embodiment, the controller 50' functions as the phase adjustment amount-determining unit. The controller 50' also functions as a frequency modulator together with the PLL transmitter 58a, and as a phase modulator together with the phase controller 58b.

In FIG. 5, an example in which the write clock generator 58 and the time difference measuring unit 57 are formed respectively in separate blocks has been explained, but the configuration can be such that these constitute a write clock generator as a single block.

Figure 6:
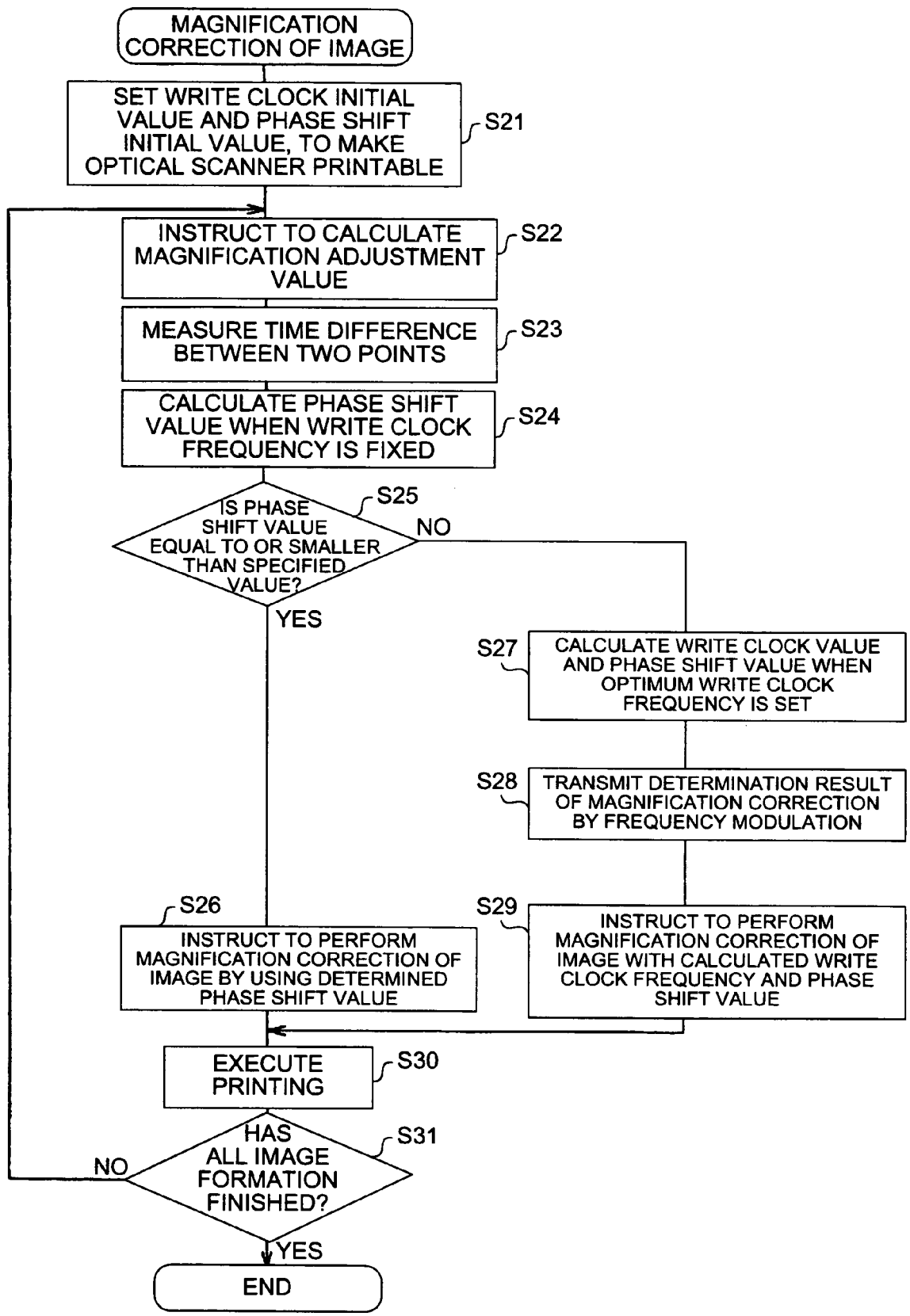
FIG. 6 is a flowchart of a routine for a magnification correction of an image performed by the control system in the image forming apparatus according to the third embodiment.

The controller 50' in the third embodiment starts the routine of the magnification correction processing of an image shown in FIG. 6 at a predetermined timing.

That is, at first step S21, the controller 50' sets the write clock initial value and the phase shift initial value in the write clock generator 58, at a predetermined timing such as after turning the power on or restarting after having stopped the machine, and makes the optical scanner printable corresponding to the set write clock initial value and phase shift initial value. In this state, since the printing is possible, printing can be performed.

At next step S22, at the timing when the polygon mirror 32 is rotating between sheets or during printing, and when the laser diode 29 is in the state capable of lighting, the controller 50 outputs an instruction to calculate a magnification adjustment value to the time difference measuring unit 57.

At step S23, the controller 50' allows the time difference measuring unit 57 to measure the time difference since the sensor 25 has detected the laser beam at specified timing until the sensor 26 detects the laser beam for the specified number of measurements. The controller 50' inputs the measurement result to calculate a mean value or the like of the measurement result.

At next step S24, a phase shift value (phase adjustment amount) when the write clock frequency is fixed is calculated from the mean value or the like of the measurement result of the time difference. At step S25, the controller 50' determines the magnitude correlation between the phase shift value (phase adjustment amount) calculated at step S24 and the specified value preset in the controller 50', that is, whether the phase shift value is equal to or smaller than the specified value, and stores the comparison result (magnitude correlation) in the storage unit.

According to the determination, when the phase shift value is equal to or smaller than the specified value, that is, when the phase shift value does not exceed the specified value (YES), at step S26, the controller 50' transmits a control signal for performing the magnification correction of the image based on the determined phase shift value to the write clock generator 58, so as to perform magnification correction of the image by changing the cycle time of an optional pixel in the unit of pixel.

According to the determination at step S25, when the phase shift value is larger than the specified value, and the phase shift value exceeds the specified value, control proceeds to step S27, where a write clock frequency and a phase shift value when an optimum write clock frequency is set is calculated from the measurement and calculation results at step S23. That is, the write clock frequency and the phase shift value when executing the frequency modulation in which magnification correction of an image is performed by changing the frequency of the image signal in the unit of a line or in the unit of a plurality of lines are calculated.

At next step S28, a control signal for performing magnification correction of an image based on the write clock frequency and the phase shift value calculated at step S27 is transmitted to the write clock generator 58, and at step S29, a control signal for performing magnification correction of an image based on the write clock frequency and the phase shift value calculated at step S27 is transmitted to the write clock generator 58, and at step S29. Accordingly, magnification correction of the image is performed by the frequency modulation in which the frequency of the image signal is changed in the unit of a line or in the unit of a plurality of lines.

In the case of magnification correction by frequency modulation, since the write clock is changed, magnification correction cannot be performed at timing at timing during image formation. Further, since a certain period of time is necessary for the magnification correction processing, it is necessary to have an interval between sheets during continuous printing. Accordingly, continuous printing is temporarily suspended, and the control signal is sent to the write clock generator 58 at a convenient timing.

At next step S30, printing is executed at the write clock frequency, with the write clock frequency changed according to the control signal set and transmitted to the write clock generator 58 at step S26, or the control signal set and transmitted to the write clock generator 58 at step S29.

At step S31, it is determined whether the all set image formation has finished, and if the image formation has finished, the processing in this routine is finished. However, if all image formation has not finished yet, control returns to step S22, to repeat the processing and determination at step S22 and following steps at a predetermined timing.

Figure 7:
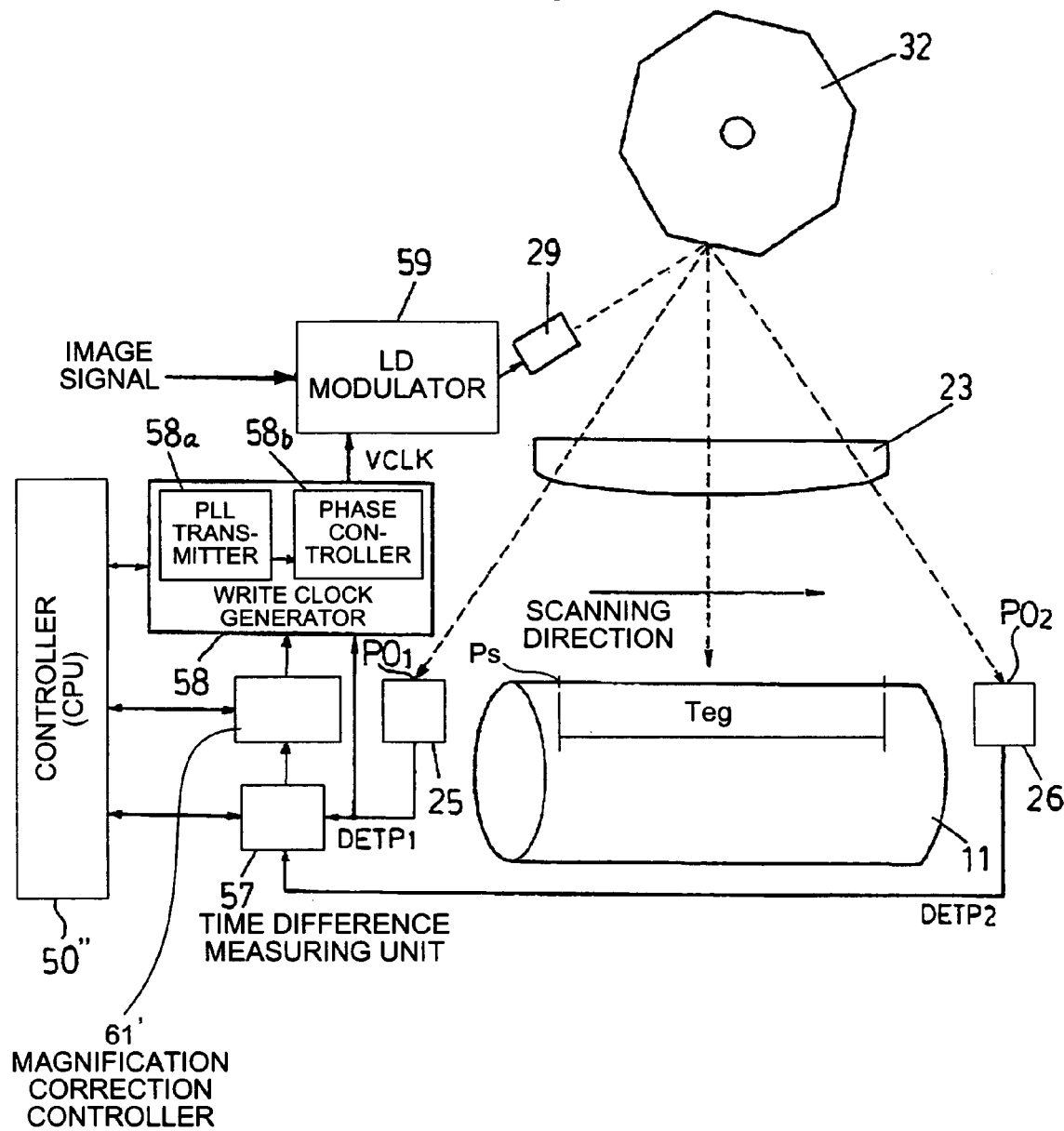
FIG. 7 is a schematic block diagram of relevant parts of an optical scanner and a photoconductor together with an associated control system of an image forming apparatus according to a fourth embodiment of the present invention.
Figure 8:
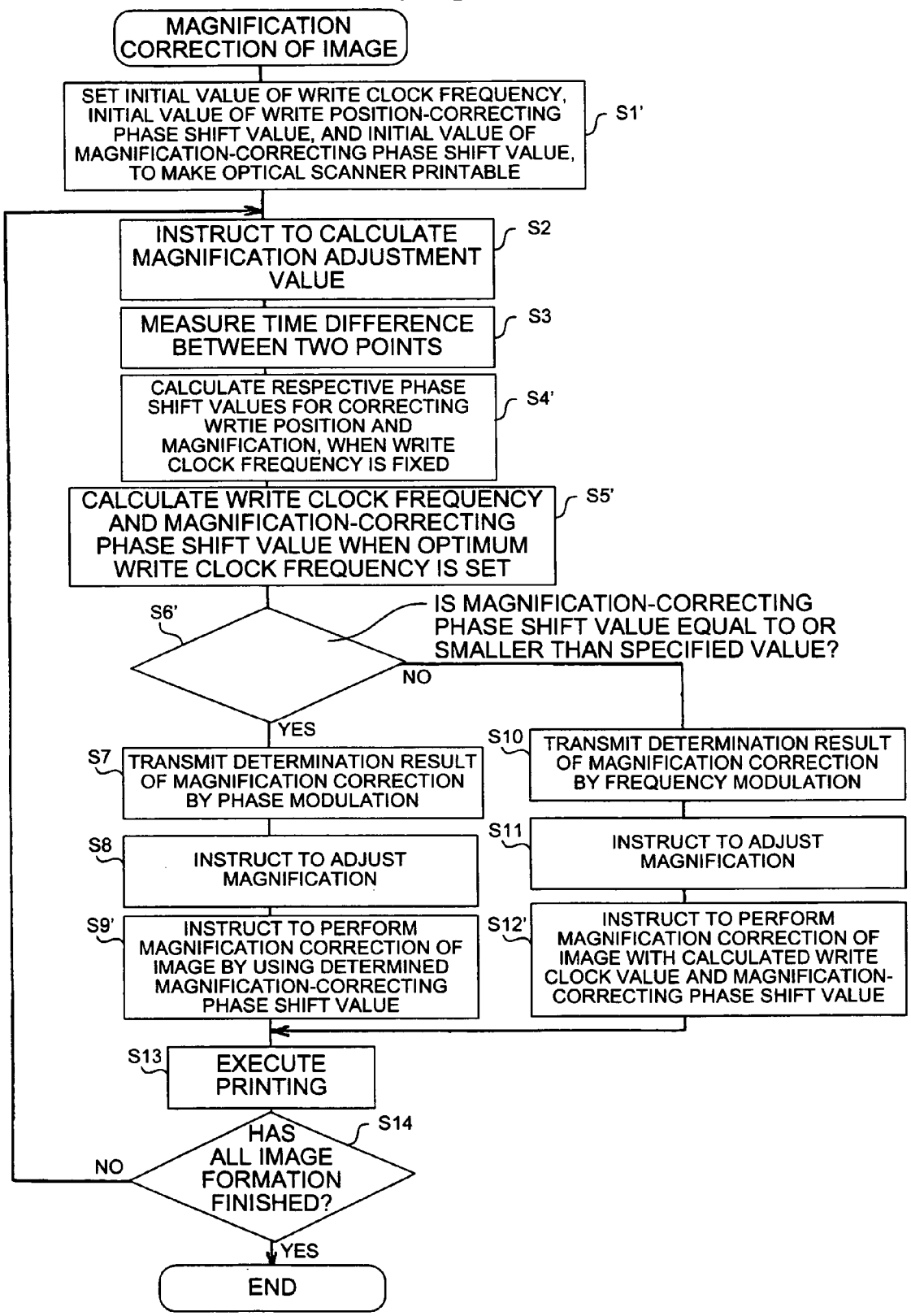
FIG. 8 is a flowchart of a routine for a magnification correction of an image performed by the control system in the image forming apparatus according to the fourth embodiment.

FIG. 7 is a schematic block diagram of relevant parts of an optical scanner and a photoconductor together with an associated control system of an image forming apparatus according to a fourth embodiment of the present invention; and FIG. 8 is a flowchart of a routine for a magnification correction of an image performed by the control system. Like reference signs are designated with like parts in FIG. 1. Further, in FIG. 8, like step numbers in FIG. 3 are used for steps at which like processing and determination are performed, to simplify the explanation.

The configuration of the image forming apparatus according to the fourth embodiment is the same as that shown in FIG. 2.

The image forming apparatus according to the fourth embodiment is different from the image forming apparatus according to the first embodiment in that a write start position Ps in the horizontal scanning direction shown in FIG. 7 can be corrected by a write start position-correcting phase adjustment amount (hereinafter, as write position-correcting phase shift value), and magnification in the horizontal scanning direction can be corrected by a magnification-correcting phase adjustment amount in the horizontal scanning direction (hereinafter, as magnification-correcting phase shift value), and magnitude correlation between the magnification-correcting phase shift value and the set specified value is determined, and until the magnification-correcting phase shift value as the determination result exceeds the specified value, magnification correction of an image is performed by phase modulation calculated by fixing the frequency of an image signal, and after the magnification-correcting phase shift value exceeds the specified value, magnification correction of the image is performed by frequency modulation.

Thus, in the configuration in which the optimum phase adjustment (phase shift) is performed by changing the cycle time of an optional pixel in the unit of pixel, that is, optimum write start position Ps in the horizontal scanning direction and magnification correction in the horizontal scanning direction are performed based on the write position-correcting phase shift value and the magnification-correcting phase shift value calculated by fixing the write clock frequency, the magnification correction controller 61' has a configuration including a storage unit that stores the initially set values of the write clock frequency transmitted from a controller (CPU) 50", the write position-correcting phase shift value in the horizontal scanning direction and the magnification-correcting phase shift value, as well as the current set values.

The controller (CPU) 50" is a microcomputer, which starts the routine for a magnification correction of an image shown in FIG. 8, at a predetermined timing such as after turning the power on or restarting after having stopped the machine.

At first step S1', the controller 50" sets an initial value of the write clock frequency, an initial value of the write position-correcting phase shift value (write position-correcting phase shift initial value), and an initial value of the magnification-correcting phase shift value (magnification-correcting phase shift initial value) in the magnification correction controller 61', at a predetermined timing such as after turning the power on or restarting after having stopped the machine, and makes the optical scanner 2 printable corresponding to the set initial value of the write clock frequency and phase shift initial values. In this state, since the printing is possible, printing can be performed.

Steps S2 and S3 are same as the steps S2 and S3 shown in FIG. 3. At step S4', the magnification correction controller 61' calculates the write position-correcting phase shift value in the horizontal scanning direction and the magnification-correcting phase shift value when the write clock frequency is fixed from a mean value or the like of the measurement result of the time difference since the sensor 25 has detected the laser beam until the sensor 26 detects the laser beam.

At step S5', the magnification correction controller 61' calculates a write clock value (frequency) and a magnification-correcting phase shift value when an optimum write clock frequency is set, from the mean value or the like of the measurement result of the time difference.

At next step S6', the controller 50" determines the magnitude correlation between the magnification-correcting phase shift value calculated at step S4' and the specified value preset in the controller 50", that is, whether the magnification-correcting phase shift value is equal to or smaller than the specified value, and stores the comparison result (magnitude correlation) in the storage unit.

According to the determination, when the magnification-correcting phase shift value is equal to or smaller than the specified value, that is, when the magnification-correcting phase shift value does not exceed the specified value (YES), the same processing and determination as those explained with reference to FIG. 3 are performed at step S7 and following steps, to perform magnification correction of an image by phase modulation, with the frequency fixed. At this time, in the fourth embodiment, at step S9', magnification correction in the horizontal scanning direction is performed only by using the magnification-correcting phase shift value.

According to the determination at step S6', when the magnification-correcting phase shift value is larger than the specified value, and the magnification-correcting phase shift value exceeds the specified value, the same processing and determination as those explained with reference to FIG. 3 are performed at step S10 and following steps, to perform magnification correction of the image by frequency modulation, in which magnification correction is performed by changing the frequency of an image signal to an optimum write clock frequency in the unit of a line or in the unit of a plurality of lines.

Thus, in the fourth embodiment, the phase adjustment amount (phase shift) at the time of fixing the write clock frequency is divided into the write position-correcting phase shift value for correcting the write start position and the magnification-correcting phase shift value in the horizontal scanning direction. Only the magnification-correcting phase shift value is compared with the specified value to determine the magnitude correlation, and magnification correction of the image by phase modulation and magnification correction of the image by frequency modulation is changed over according to the determination result. Even when the changeover of the image magnification correction method is determined based on only the magnification-correcting phase shift value, there is no problem since the write position-correcting phase shift value affects little on image degradation in the image area.

Magnification correction of the image by the frequency modulation, in which the image forming operation needs to be suspended temporarily, is executed only when the magnification-correcting phase shift value exceeds the specified value. Since the frequency of executing the magnification correction of the image by the frequency modulation can be reduced, the gross printing speed (productivity of image formation), as the whole image forming apparatus, can be improved.

As a fifth embodiment, it is possible that the magnification correction controller 61' shown in FIG. 7 is not provided, in other words, a configuration that is the same as that in the third embodiment (see FIG. 5) is employed.

In this case, the time difference measuring unit 57 shown in FIG. 7 performs time difference measurement and calculation between the laser beam detection signals DETP1 and DETP2, and transmits the measurement result and calculation result to the controller 50".

The controller 50" has a configuration including a storage unit that stores respective initially set values and current set value of the write clock frequency, the magnification-correcting phase shift value, and the write position-correcting phase shift value.

Further, the controller 50" has a function of calculating an optimum write clock frequency, and a magnification-correcting phase shift value and a write position-correcting phase shift value at the optimum frequency, a function of calculating an optimum magnification-correcting phase shift value by fixing the write clock frequency, and a function of comparing the calculated magnification-correcting phase shift value with the preset specified value, and transmits a write clock setting signal and a control signal for performing phase shift to the write clock generator 58 at a predetermined timing, respectively.

Figure 9:
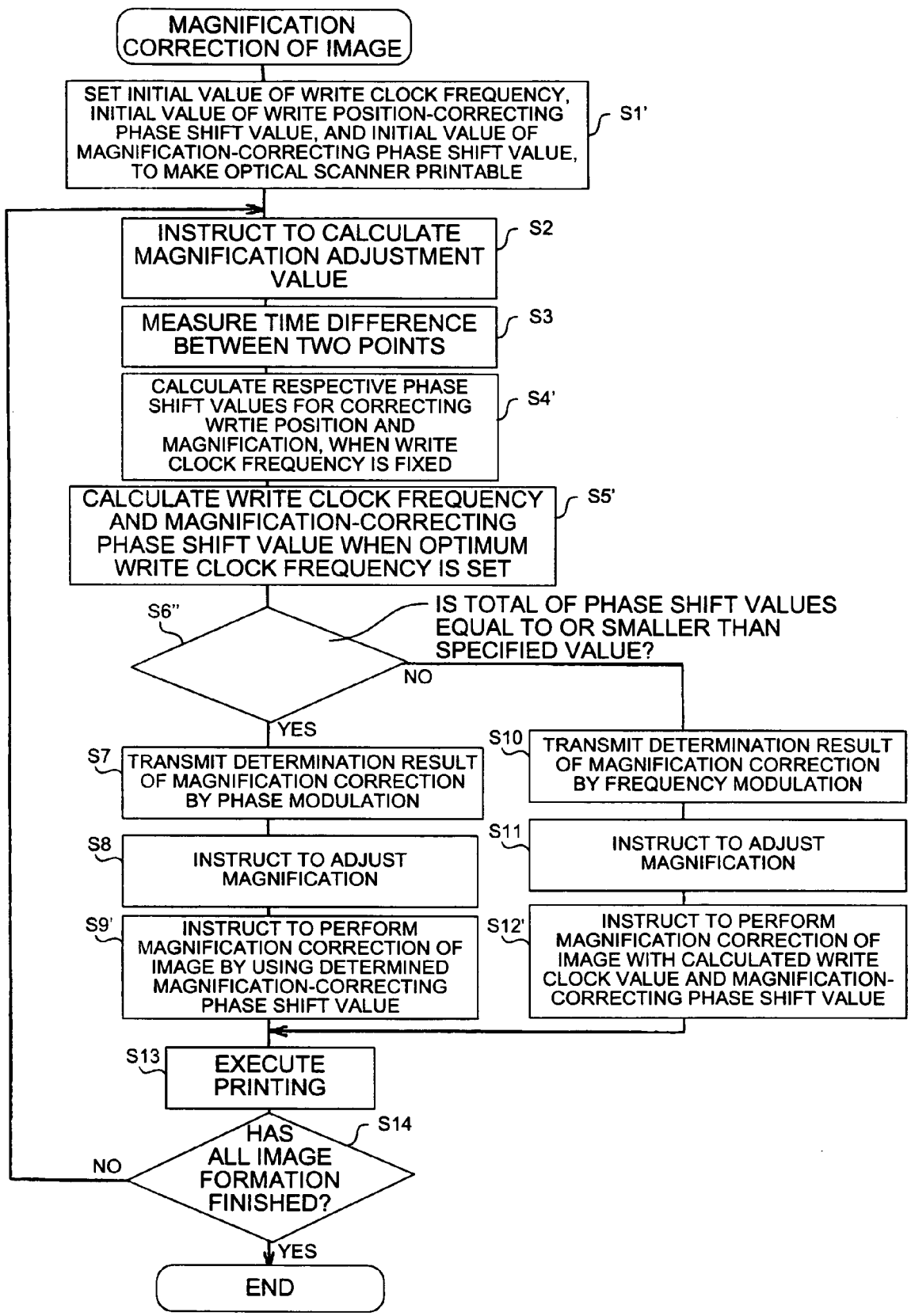
FIG. 9 is a flowchart of a routine for a magnification correction of an image performed by a control system in an image forming apparatus according to a sixth embodiment of the present invention.

FIG. 9 is a flowchart of a routine for a magnification correction of an image performed by a control system in an image forming apparatus according to a sixth embodiment of the present invention. For the brevity of explanation, parts that perform like processing and determination as in FIG. 8 are designated by like step numbers.

The configuration of the image forming apparatus according to the sixth embodiment is the same as that shown in FIG. 2.

The control system of the image forming apparatus is the same as that of the fourth embodiment explained with reference to FIG. 7 (or can have the configuration shown in FIG. 5), and only the content of the control performed by the control system is different. Therefore, illustration of the control system is omitted as well, and as required, explanation is given by using the reference signs used in FIG. 7.

The phase modulator in the image forming apparatus according to the sixth embodiment can correct the write start position in the horizontal scanning direction by a write position-correcting phase shift value (write start position-correcting phase adjustment amount), and the magnification in the horizontal scanning direction by a magnification-correcting phase shift value (magnification-correcting phase adjustment amount in the horizontal scanning direction), respectively, as in the fourth embodiment explained with reference to FIGS. 7 and 8.

In the sixth embodiment, a phase adjustment amount-determining unit (corresponding to the magnification correction controller 61' in FIG. 7) determines the magnitude correlation between a phase shift value (phase adjustment amount) obtained by adding the write position-correcting phase shift value and a magnification-correcting phase shift value (similar to those explained in the fourth embodiment), and the set specified value. The phase adjustment amount-determining unit performs magnification correction of an image in the horizontal scanning direction by phase modulation in which the write clock frequency is fixed, until the phase adjustment amount exceeds the specified value, and performs magnification correction of the image in the horizontal scanning direction by frequency modulation, in which the write clock frequency is changed to an optimum value, after the phase adjustment amount exceeds the specified value, according to the determination result.

That is, when the routine in FIG. 9 is started, at the first step, the controller (the same microcomputer as the controller 50" in FIG. 7) of the image forming apparatus according to the sixth embodiment performs the same processing as at step S1' in FIG. 8, to set the write clock initial value, the write position-correcting phase shift initial value, and the magnification-correcting phase shift initial value, thereby making the optical scanner printable according to the set write clock initial value and the phase shift initial values.

At steps S2 and S3, the controller performs the same processing as at steps S2 and S3 in FIG. 8, and at step S4', calculates the write position-correcting phase shift value in the horizontal scanning direction when the write clock frequency is fixed and the magnification-correcting phase shift value from a mean value or the like of the measurement result of the time difference since the sensor 25 has detected the laser beam until the sensor 26 detects the laser beam, as in the fourth embodiment.

At step S5', the magnification correction controller 61' calculates a write clock value (frequency) and a magnification-correcting phase shift value when an optimum write clock frequency is set, from the mean value or the like of the measurement result of the time difference.

At next step S6", the controller 50" determines the magnitude correlation between the phase adjustment amount obtained by adding up the write position-correcting phase shift value and the magnification-correcting phase shift value when the write clock frequency is fixed, calculated at step S4', that is, the total of the phase shift values and the preset specified value indicates that the total of the phase shift values is equal to or smaller than the specified value, and stores the determination result (magnitude correlation) in the storage unit.

According to the determination, when the total of the phase shift values is equal to or smaller than the specified value, that is, when the total of the phase shift values does not exceed the specified value (YES), the same processing and determination as those explained with reference to FIG. 8 are performed at step S7 and following steps, to perform magnification correction of an image by phase modulation, with the frequency fixed.

According to the determination at step S6", when the total of the phase shift values is larger than the specified value, and the total of the phase shift values exceeds the specified value, the same processing and determination as those explained with reference to FIG. 8 are performed at step S10 and following steps, to perform magnification correction of the image by frequency modulation, in which magnification correction is performed by changing the frequency of an image signal to an optimum write clock frequency in the unit of a line or in the unit of a plurality of lines.

Thus, in the sixth embodiment, magnification correction of an image by phase modulation (fixed frequency) and magnification correction of the image by frequency modulation are changed over, according to whether the phase shift value obtained by adding up the write position-correcting phase shift value and the magnification-correcting phase shift value when the write clock frequency is fixed exceeds the preset specified value.

Therefore, as compared with the fourth embodiment explained with reference to FIGS. 7 and 8, the phase adjustment amount (phase shift value) can be determined accurately. Accordingly, magnification correction of an image can be changed over with high accuracy, thereby enabling accurate prevention of image degradation.

Figure 10A:
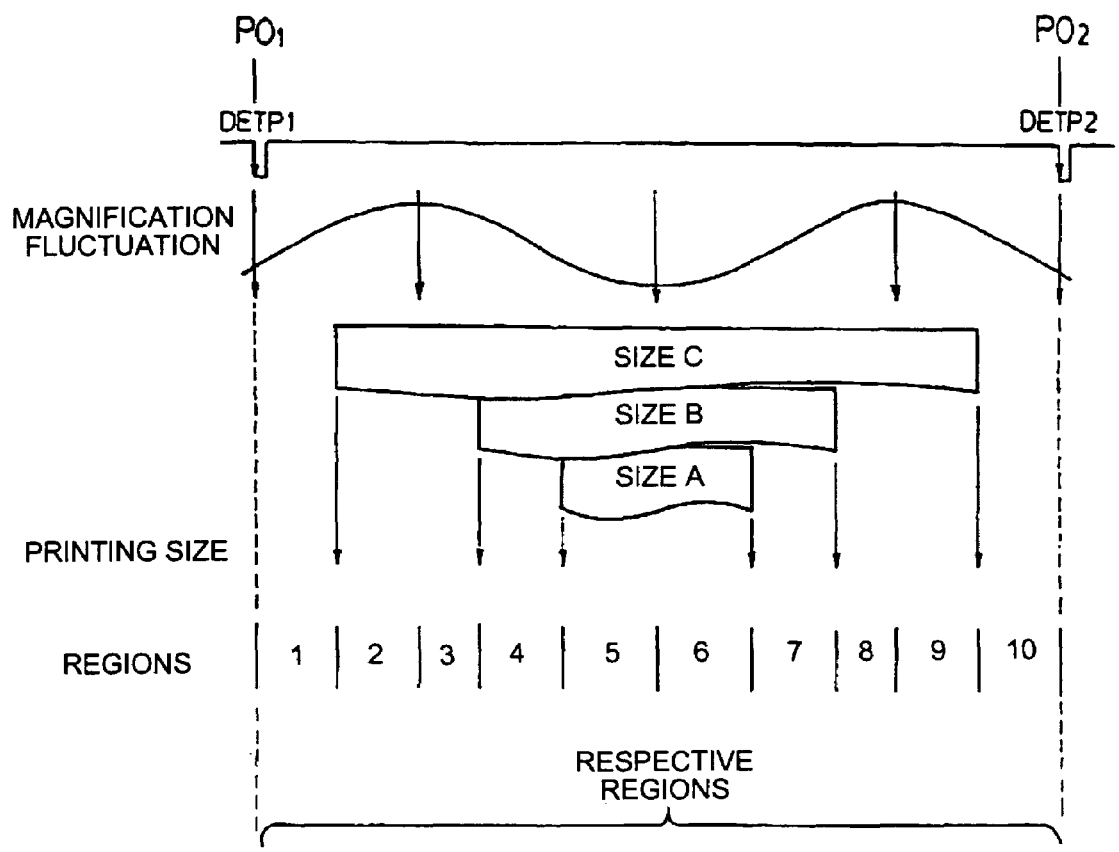
FIGS. 10A and 10B are explanatory views of how the horizontal scanning direction is divided into regions by an image forming apparatus according to a seventh embodiment of the present invention.
Figure 10B:
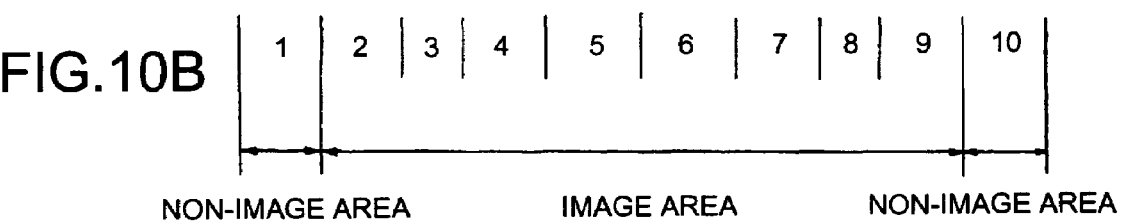
Figure 11:
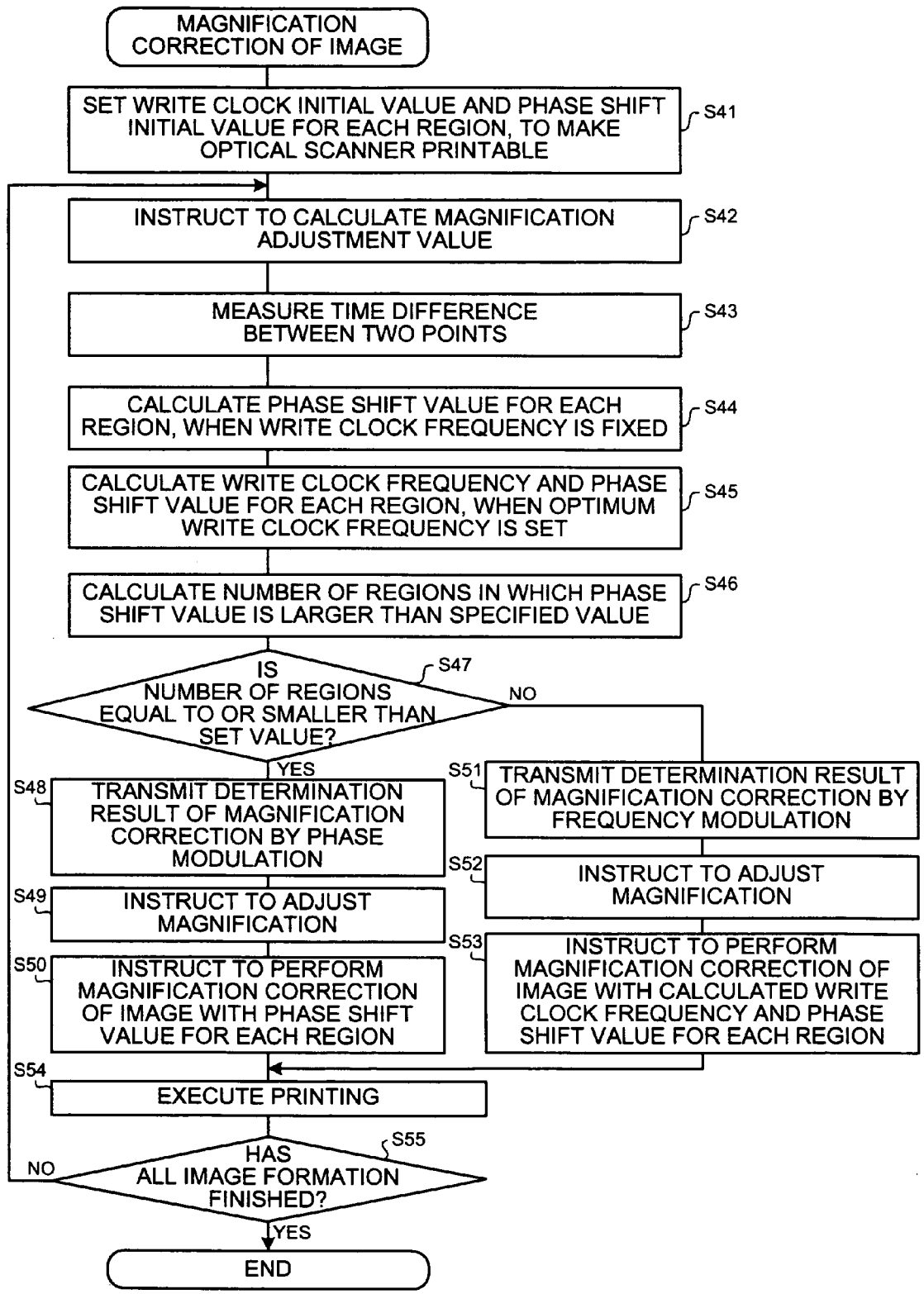
FIG. 11 is a flowchart of a routine for a magnification correction of an image performed by a control system in the image forming apparatus according to the seventh embodiment.

FIGS. 10A and 10B are explanatory views of region dividing in the horizontal scanning direction performed by an image forming apparatus according to a seventh embodiment of the present invention; and FIG. 11 is a flowchart of a routine for a magnification correction of an image performed by a control system in the image forming apparatus according to the seventh embodiment.

The configuration of the image forming apparatus according to the seventh embodiment is the same as that shown in FIG. 2. Moreover, the control system is the same as that of the first embodiment or the second embodiment, and only the content of the control performed by the control system is different. Therefore, illustration of the control system is omitted as well, and as required, explanation is given by using the reference signs used in FIG. 1.

The image forming apparatus according to the seventh embodiment is different from that of the first embodiment in that the phase adjustment amount-determining unit (the magnification correction controller 61 in FIG. 1) determines the magnitude correlation between a phase adjustment amount in a predetermined region in the horizontal scanning direction calculated by the phase modulator (the phase modulator 58b in FIG. 1) and the set specified value, and based on the determination result of the phase adjustment amount-determining unit, magnification correction of an image by the phase modulator is changed over to magnification correction of the image by the frequency modulator (the PLL transmitter 58a in FIG. 1).

In the seventh embodiment, the predetermined region in the horizontal scanning direction, that is, the region between detection positions $PO_1$ and $PO_2$ of the sensors 25 and 26 as shown in FIG. 10A (also see FIG. 1), is divided into a plurality of areas, for example, into ten (1 to 10) areas in the horizontal scanning direction, corresponding to the magnification fluctuation characteristic of the fθ lens and the print size width according to an assumed size of the transfer paper. The phase shift value for each divided area, that is, the phase shift value (phase adjustment amount) calculated by fixing the write clock frequency is set for each region as shown in Table 1.

TABLE 1

| Region | Specified value | Phase shift value |
|--------|-----------------|-------------------|
| 1      | I               | I                 |
| 2      | II              | II                |
| 3      | III             | III               |
| 4      | IV              | IV                |
| 5      | V               | V                 |
| 6      | VI              | VI                |
| 7      | VII             | VII               |
| 8      | VIII            | VIII              |
| 9      | IX              | IX                |
| 10     | X               | X                 |

Further, the magnification correction controller 61 and the controller 50 (see FIG. 1) set the specified values I to X corresponding to each area as shown in Table 1, and calculate the phase shift values I to X and store these values.

Determination of the magnitude correlation between the phase shift value and the specified value is performed in the following manner.

At first, comparison is made between phase shift values I to X and corresponding specified values I to X for each region of the divided first to the tenth areas. The regions are then divided into a region in which the phase shift value is equal to or smaller than the specified value, and a region in which the phase shift value is larger than the specified value, and when the number of regions in which the phase shift value is larger than the specified value becomes equal to or larger than a preset number, magnification correction of an image is performed by frequency modulation in which magnification correction is performed by changing the frequency of an image signal to an optimum write clock frequency in the unit of a line or in the unit of a plurality of lines.

In FIGS. 10A and 10B, an example in which a predetermined region in the horizontal scanning direction is divided into a plurality of regions having an unequal width, corresponding to the magnification fluctuation characteristic of the fθ lens and the print size width according to an assumed size of the transfer paper is shown as an example. However, the respective regions to be divided can be divided into regions having an equal width.

The image forming apparatus according to the seventh embodiment starts the routine of magnification correction of an image shown in FIG. 11, at a predetermined timing.

At first step S41, the controller 50 sets a write clock frequency initial value (hereinafter, simply as write clock initial value) and a phase shift initial value in the magnification correction controller 61, at a predetermined timing such as after turning the power on or restarting after having stopped the machine. At this time, the phase shift value of the whole area between the detection positions $PO_1$ and $PO_2$ (also see FIG. 1) is not set, but a phase shift initial value (phase adjustment amount) is set for each divided area.

The optical scanner 2 is made printable corresponding to the set write clock initial value and phase shift initial value.

At next step S42, the same processing as explained at step S2 in FIG. 3 is performed, to issue an instruction to calculate a magnification adjustment value. At step S43, the same processing as explained at step S3 in FIG. 3 is performed, to perform measurement of the time difference since the sensor 25 has detected the laser beam until the sensor 26 detects the laser beam for a specified number of times, so that a mean value or the like of the measurement result is calculated.

At step S44, the phase shift value (phase adjustment amount) is calculated for each region when the write clock frequency is fixed from the mean value or the like of the measurement result of the time difference.

At step S45, substantially at the same timing as at step S44 in parallel, a write clock frequency (write clock value) when an optimum write clock frequency is set is calculated from the mean value or the like of the measurement result of the time difference. Further, the phase shift value (phase adjustment amount) for each region when the frequency is changed to the optimum write clock frequency is calculated.

At step S46, the phase shift value (a value calculated by fixing the write clock frequency) is compared with the specified values I to X (see Table 1) corresponding thereto for each region, to calculate the number of regions in which the phase shift value is larger than the specified value.

At step S47, it is determined whether the number of regions in which the phase shift value is larger than the specified value is equal to or smaller than the preset value, and if the number is equal to or smaller than the preset value (Yes), control proceeds to steps S48 and S49, to transmit a determination result such that magnification correction of an image is to be executed by phase modulation that can perform magnification correction of the image without expanding the interval between sheets even during continuous printing, as in the processing explained at steps S7 and S8 in FIG. 3, to issue a magnification adjustment instruction.

At step S50, the controller 50 issues an instruction for performing magnification correction of an image with the respective phase shift values when the write clock frequency is fixed, calculated for respective regions. Accordingly, magnification correction of the image is performed by changing the cycle time of an optional pixel in the unit of pixel.

According to the determination at step S47, when control proceeds to step S51 since the number of regions in which the phase shift value is larger than the specified value exceeds the set value, the same processing as explained at steps S10 and S11 in FIG. 3 is performed to transmit a determination result such that magnification correction of an image is to be executed by frequency modulation in which magnification correction of the image is performed by changing the write clock frequency (frequency of an image signal) in the unit of a line or in the unit of a plurality of lines, to issue a magnification adjustment instruction.

At step S53, the controller 50 issues an instruction for performing magnification correction of an image based on the optimum write clock frequency and the phase shift value for each region calculated at step S45. As a result, the magnification correction of an image is performed by frequency modulation, in which the frequency of an image signal is changed in the unit of a line or in the unit of a plurality of lines.

The processing and determination as those explained at step S13 and following steps in FIG. 3 are then performed at step S54 and following steps, and when the set all image formation has finished, the processing in this routine is finished.

In FIG. 11, an example in which a phase shift value for each region when the write clock frequency is fixed, and a phase shift value for each region when an optimum write clock frequency is set are respectively calculated, before determining whether the number of regions in which the phase shift value is larger than the specified value is equal to or smaller than the preset value has been explained. However, the calculation of the phase shift value for each region when the optimum write clock frequency is set may not be performed at step S45 in FIG. 11, but the processing at step S45 can be performed at steps previous to step S51 and only when the number of regions in which the phase shift value is larger than the specified value is larger than the set value (NO determination result) in the determination at step S47.

The comparison between the phase shift value and the specified value can be performed in such a manner that, as shown in Table 2, a specified value obtained by unifying a plurality of divided regions is provided, which is then compared with a phase shift value obtained by similarly unifying a plurality of divided regions. For example, even when the phase shift value is set for each region of from the first to the tenth regions, as in the example shown in Table 2, the respective regions are unified into a region of from the second to the fourth regions, a region of from the fifth to the sixth regions, and a region of from the seventh to the ninth regions, respectively, and the phase shift values II, III, and IV are respectively set corresponding thereto, and these can be compared with the respective specified values II, III, and IV.

The number of regions obtained by unifying a plurality of regions in which the phase shift value exceeds the corresponding specified value is calculated, and when the number exceeds a preset value, magnification correction of an image is performed by frequency modulation, which is performed by changing the write clock frequency.

In this case, the magnification correction controller 61 (when applied to FIG. 5, the controller 50') has a function of calculating the phase shift value for each region shown in Table 2, and storing the calculation result. Further, the magnification correction controller 61 also includes a storage unit in which a specified value unified for each of a plurality of regions can be set.

The way to unify the first to the tenth regions into a plurality of regions is not limited to the one shown in Table 2.

TABLE 2

| Region | Specified value | Phase shift value |
|---|---|---|
| 1 | I | I |
| 2 | II | II |
| 3 | | |
| 4 | | |

TABLE 2-continued

| Region | Specified value | Phase shift value |
|---|---|---|
| 5 | III | III |
| 6 | | |
| 7 | IV | IV |
| 8 | | |
| 9 | | |
| 10 | V | V |

The predetermined region in the horizontal scanning direction to be divided in the horizontal scanning direction can be positioned in a horizontal scanning image area, as the second to the ninth areas shown in FIG. 10B. The phase shift value (phase adjustment amount) in the image area can be then monitored, and hence, image degradation in the image area can be prevented.

Figure 12:
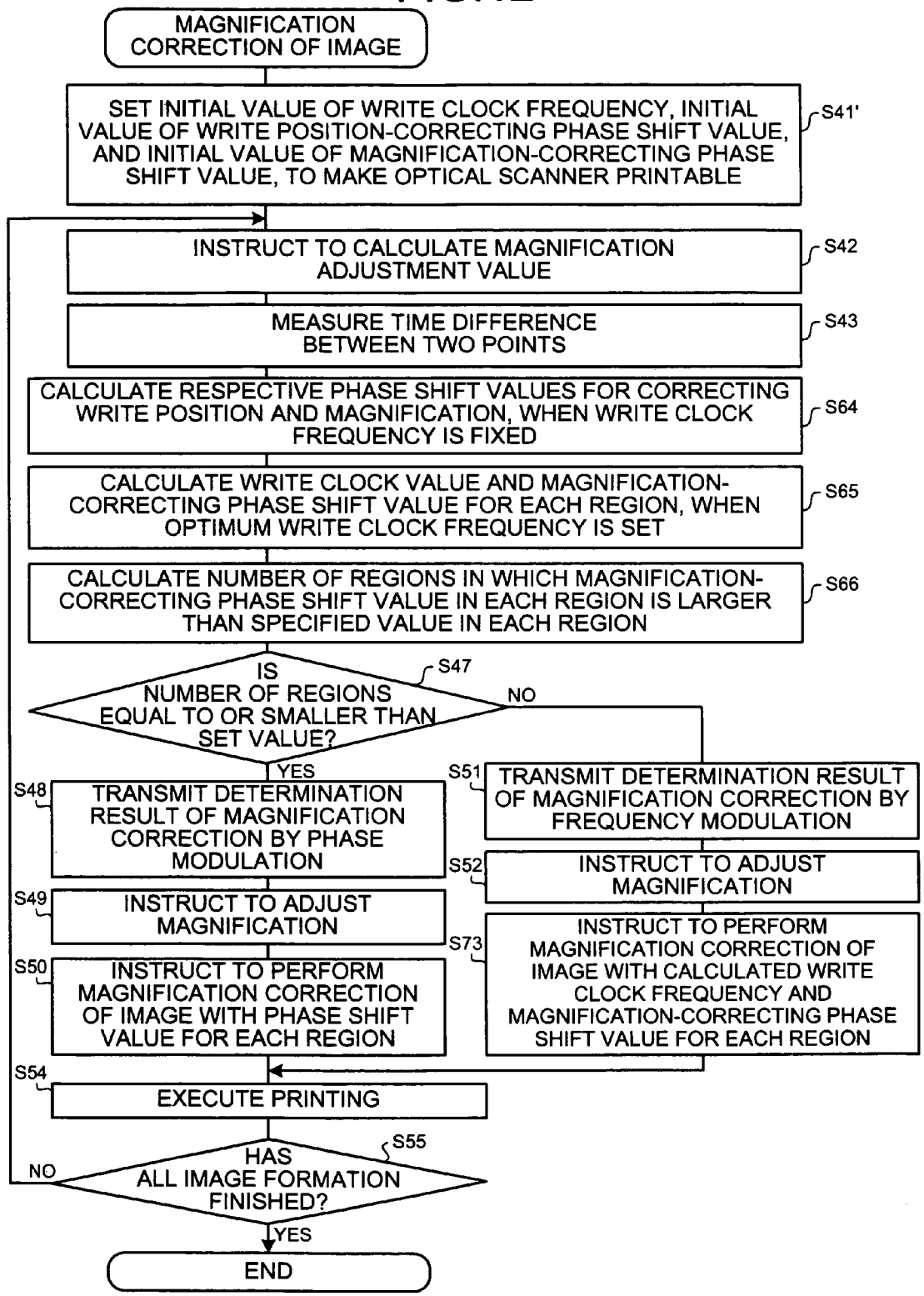
FIG. 12 is a flowchart of a routine for a magnification correction of an image performed by a control system in an image forming apparatus according to an eighth embodiment of the present invention.

FIG. 12 is a flowchart of a routine for a magnification correction of an image performed by a control system in an image forming apparatus according to an eighth embodiment of the present invention. For the brevity of explanation, like step numbers are used for like steps for performing the same processing and determination as in FIG. 11.

The configuration of the image forming apparatus according to the eight embodiment is the same as that shown in FIG. 2. Moreover, the control system is also the same as that of the fourth embodiment or the second embodiment, and only the content of the control performed by the control system is different. Therefore, illustration of the control system is omitted as well, and as required, explanation is given by using the reference signs used in FIG. 7.

In the same manner as the fourth embodiment, with reference to FIGS. 7 and 8, the phase modulator in the image forming apparatus according to the eighth embodiment can respectively correct the write start position in the horizontal scanning direction by a write position-correcting phase shift value (write start position-correcting phase adjustment amount), and magnification in the horizontal scanning direction by a magnification-correcting phase shift value (magnification-correcting phase adjustment amount in the horizontal scanning direction) by phase modulation, and the phase adjustment amount-determining unit (the magnification correction controller 61' in FIG. 7) determines the magnitude correlation between the magnification-correcting phase shift value in a predetermined region in the horizontal scanning direction and the set specified value.

When the routine in FIG. 12 is started, at first step S41', the controller (a microcomputer similar to the controller 50" in FIG. 7) of the image forming apparatus according to the eighth embodiment performs the same processing as at step S1' in FIG. 8, and at next steps S42 and S43, performs the processing in FIG. 11.

At next step S64, a magnification-correcting phase shift value and a write position-correcting phase shift value for each region (each predetermined region divided into 1 to 10 regions shown in FIG. 10 in the horizontal scanning direction) when the write clock frequency is fixed are calculated (see Table 3).

At step S65, substantially at the same timing as at step S64 in parallel, a write clock frequency (write clock value) when an optimum write clock frequency is set is calculated. Further, a magnification-correcting phase shift value for each region when the optimum write clock frequency is set is calculated.

TABLE 3

| Region | Specified value | Write position-correcting phase shift value | Magnification-correcting phase shift value |
|---|---|---|---|
| 1 | I | I | I |
| 2 | II | II | II |
| 3 | III | III | III |
| 4 | IV | IV | IV |
| 5 | V | V | V |
| 6 | VI | VI | VI |
| 7 | VII | VII | VII |
| 8 | VIII | VIII | VIII |
| 9 | IX | IX | IX |
| 10 | X | X | X |

At next step S66, the magnification-correcting phase shift value (a value calculated by fixing the write clock frequency) for each region is compared with the specified value I to X corresponding thereto for each region (see FIG. 3), to calculate the number of regions in which the magnification-correcting phase shift value in each area is larger than the specified value in each area.

At step S47, it is determined whether the calculated number of regions is equal to or smaller than a preset value, and if it is equal to or smaller than a preset value (YES), control proceeds to steps S48 and S49, to transmit a determination result such that magnification correction of an image is to be executed by phase modulation that can perform magnification correction of the image without expanding the interval between sheets even during continuous printing, as in the processing explained at steps S7 and S8 in FIG. 3, to issue a magnification adjustment instruction.

At step S70, the controller 50 issues an instruction for performing magnification correction of an image with the respective magnification-correcting phase shift values when the write clock frequency is fixed, calculated for respective regions. Accordingly, magnification correction of the image is performed by changing the cycle time of an optional pixel in the unit of pixel.

According to the determination at step S47, when control proceeds to step S51 since the number of regions in which the phase shift value is larger than the specified value exceeds the set value, the same processing as explained at steps S10 and S11 in FIG. 3 is performed at steps S51 and S52, to transmit a determination result such that magnification correction of an image is to be executed by frequency modulation in which magnification correction of the image is performed by changing the write clock frequency (frequency of an image signal) in the unit of a line or in the unit of a plurality of lines, to issue a magnification adjustment instruction.

At step S73, the controller 50 issues an instruction for performing magnification correction of an image based on the optimum write clock frequency and the magnification-correcting phase shift value for each region calculated at step S65. Accordingly, the magnification correction of the image is performed by frequency modulation, in which the frequency of an image signal is changed in the unit of a line or in the unit of a plurality of lines.

Thereafter, the processing and determination as those explained at step S54 and following steps in FIG. 11 are performed, and when the set all image formation has finished, the processing in this routine is finished.

In FIG. 12, an example in which a magnification-correcting phase shift value and a write position-correcting phase shift value for each region when the write clock frequency is fixed, and a phase shift value for each region when an optimum write clock frequency is set are respectively calculated, before determining whether the number of regions in which the magnification-correcting phase shift value for each region is larger than the specified value for each region is equal to or smaller than the preset value has been explained. However, the calculation of the phase shift value for each region when the optimum write clock frequency is set may not be performed at step S65 in FIG. 12, but can be performed at steps previous to step S51, and when the number of regions in which the phase shift value is larger than the specified value is larger than the set value (NO determination result) in the determination at step S47.

According to the eighth embodiment, determination to change over the magnification correction of an image from the one by phase modulation to the one by frequency modulation is performed by comparing only the magnification-correcting phase shift value with the specified value, and the write position-correcting phase shift value having little influence on image degradation in the image area is not used. Accordingly, the content of the control can be simplified.

Figure 13:
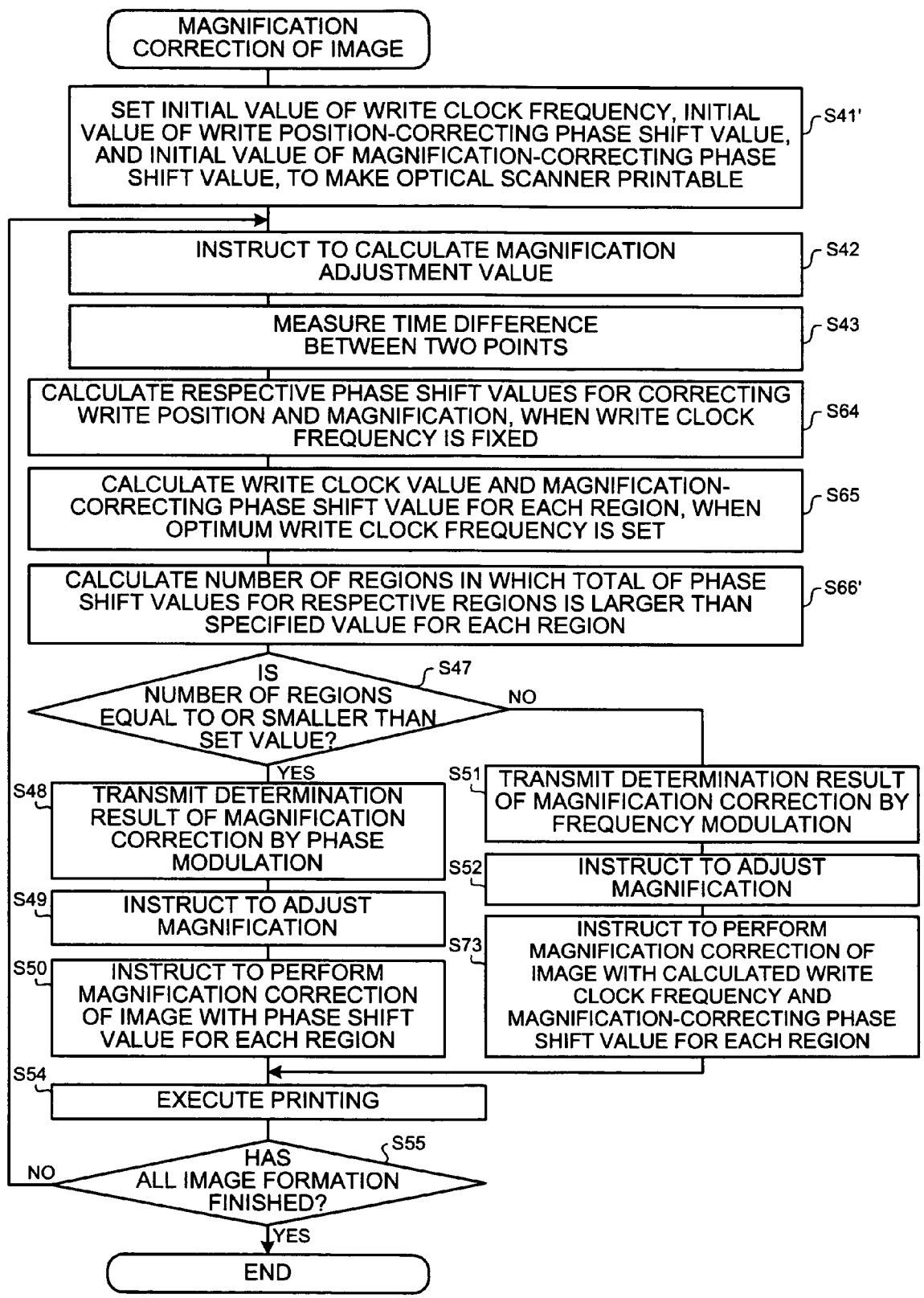
FIG. 13 is a flowchart of a routine for a magnification correction of an image performed by the control system in the image forming apparatus according to a ninth embodiment of the present invention.

FIG. 13 is a flowchart of a routine for a magnification correction of an image performed by a control system in an image forming apparatus according to a ninth embodiment of the present invention. For the brevity of explanation, like step numbers are used for like steps for performing the same processing and determination as in FIG. 12.

The configuration of the image forming apparatus according to the ninth embodiment is the same as that shown in FIG. 2. Moreover, the control system is the same as that of the fourth embodiment or the second embodiment, and only the content of the control performed by the control system is different. Therefore, illustration of the control system is omitted as well.

The phase modulator in the image forming apparatus according to the ninth embodiment is different from the eighth embodiment shown in FIG. 12 only in the following aspect. That is, the phase adjustment amount-determining unit determines the magnitude correlation between a phase adjustment amount obtained by adding up a write position-correcting phase shift value (write start position phase adjustment amount) in a predetermined region in the horizontal scanning direction and a magnification-correcting phase shift value (magnification phase adjustment amount in the horizontal scanning direction), and the set specified value.

When the routine in FIG. 13 is started, at first step S41', the controller (a microcomputer similar to the controller 50" in FIG. 7) of the image forming apparatus according to the ninth embodiment performs the same processing as at step S1' in FIG. 8, and thereafter, the same processing at steps S42, S43, S64, and S65 is performed.

At step S66', a phase shift value (phase adjustment amount) obtained by adding up the write position-correcting phase shift value and the magnification-correcting phase shift value (a value calculated with the write clock frequency being fixed) calculated for each of 1 to 10 regions shown in Table 3 is compared with the corresponding specified values I to X for each region, and the number of regions in which the total of phase shift values for respective regions is larger than the specified value for each region is calculated.

Thereafter, the determination and processing at step S47 and following steps in FIG. 12 are performed. That is, if the number of regions in which the total of phase shift values for respective regions is larger than the specified value for each region is equal to or smaller than a preset value, magnification correction of an image is executed by phase modulation that can perform magnification correction of the image without expanding the interval between sheets even during continuous printing.

If the number of regions in which the total of phase shift values for respective regions is larger than the specified value for each region exceeds the preset value, magnification correction of the image is executed by frequency modulation, in which magnification correction of the image is performed by changing the write clock frequency (frequency of an image signal) in the unit of a plurality of lines.

The processing at step S65 in FIG. 13 may be performed between step S47 and step S51, rather than being performed immediately after step S64.

According to the ninth embodiment, determination to change over magnification correction of an image from the one by phase modulation to the one by frequency modulation is performed by comparing the phase shift value obtained by adding up the write position-correcting phase shift value and the magnification-correcting phase shift value with the specified value, and hence, the phase shift amount in a region in which it is desired to prevent image degradation can be accurately obtained.

Figure 14:
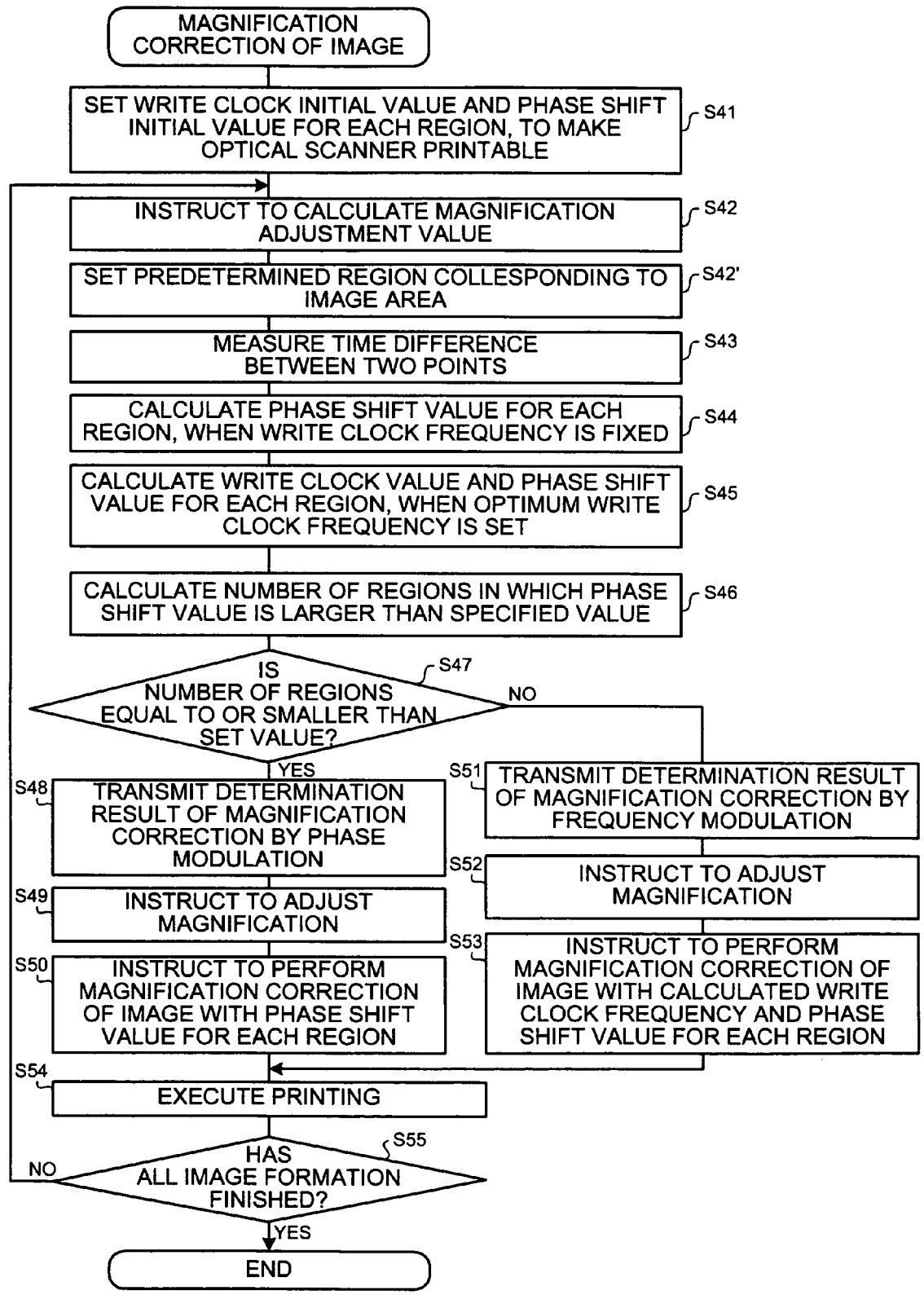
FIG. 14 is a flowchart of a routine for a magnification correction of an image performed by a control system in an image forming apparatus according to a tenth embodiment of the present invention.

FIG. 14 is a flowchart of a routine for a magnification correction of an image performed by a control system of an image forming apparatus according to a tenth embodiment of the present invention. For the brevity of explanation, like step numbers are used for like steps for performing the same processing and determination as in FIG. 11.

Also in the tenth embodiment, since the configuration of the whole image forming apparatus is the same as that of FIG. 2, the illustration thereof is omitted. The control system of the image forming apparatus is also the same as that of the fourth embodiment explained with reference to FIG. 7 (or can have the configuration shown in FIG. 5), and only the content of the control performed by the control system is different. Therefore, illustration of the control system is omitted as well.

The image forming apparatus according to the tenth embodiment is different from the seventh embodiment explained with reference to FIGS. 10A, 10B, and 11 in that a predetermined region-changing unit (the controller functions as this unit like the controller 50" in FIG. 7) that changes a predetermined region in the horizontal scanning direction corresponding to the image area in the horizontal scanning direction is provided.

For example, in each of 1 to 10 regions shown in FIGS. 10A and 10B, the predetermined region in the horizontal scanning direction is changed corresponding to the image area in which image formation is performed.

That is, the image forming apparatus according to the tenth embodiment starts the routine for a magnification correction of an image shown in FIG. 14 at a predetermined timing.

The processing at steps S41 and S42 in FIG. 11 is then performed, and at the next step S42', setting is performed by changing the predetermined region in the horizontal scanning direction corresponding to the image area. For example, as shown in Table 4, the predetermined region in the horizontal scanning direction is changed corresponding to five image areas A to E divided according to an imaging size in the horizontal scanning direction in which image formation is performed.

In Table 4, an example in which the image area is divided according to an image size by length is shown, but the image area can be divided by time or by the number of pixels.

After the predetermined region is set, the processing and determination similar to those at step S43 and following steps in FIG. 11 are performed. Accordingly, the predetermined region in the horizontal scanning direction selected corresponding to the image area in Table 4 (in this example, a plurality of selected areas of from the first to the tenth regions, but it can be one area) is compared with corresponding respective specified values in Table 1. When the number of regions in which the phase shift value is larger than the specified value is equal to or smaller than the preset value, magnification correction of an image is executed by phase modulation that can perform magnification correction of the image without expanding the interval between sheets even during continuous printing.

When the number of regions exceeds the preset value, magnification correction of the image is executed by frequency modulation, in which magnification correction of the image is performed by changing the write clock frequency (frequency of an image signal) in the unit of a line or in the unit of a plurality of lines.

According to the tenth embodiment, since the predetermined region in the horizontal scanning direction to be monitored can be optimized according to the image area (imaging range), it can be avoided that a phase shift value in an unnecessary area is calculated, and that the frequency is changed according to the phase shift value in the unnecessary area. Accordingly, the timing at which the magnification correction of the image is performed by frequency modulation can be accurately controlled, thereby improving the printing speed (the number of image formation per unit time).

Figure 15:
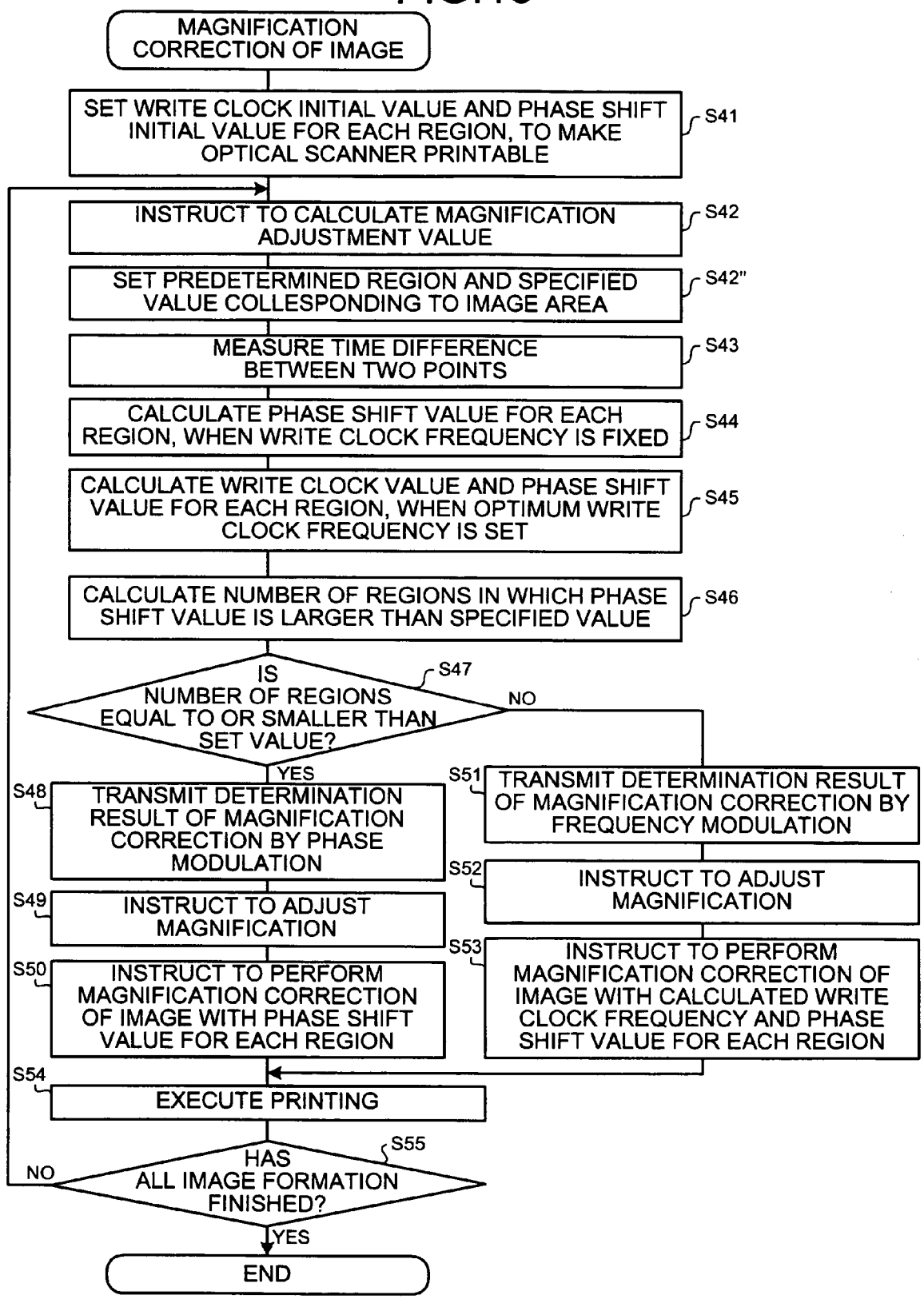
FIG. 15 is a flowchart of a routine for a magnification correction of an image performed by a control system in an image forming apparatus according to an eleventh embodiment of the present invention.

FIG. 15 is a flowchart of a routine for a magnification correction of an image performed by a control system in an image forming apparatus according to an eleventh embodiment of the present invention. For the brevity of explanation, like step numbers are used for like steps for performing the same processing and determination as in FIG. 14.

The configuration of the image forming apparatus according to the eleventh embodiment is the same as that shown in FIG. 2. Moreover, the control system is the same as that of the fourth embodiment explained with reference to FIG. 7 (or can have the configuration shown in FIG. 5), and only the content of the control performed by the control system is different. Therefore, illustration of the control system is omitted as well.

The image forming apparatus according to the eleventh embodiment is different from the tenth embodiment in that a specified value-changing unit that changes the specified value is provided. A controller having the same configuration as that of the controller 50" in FIG. 7 functions as the specified value-changing unit. However, since only the content of the control performed by the controller is different from that of the controller 50", the illustration thereof is omitted. In the eleventh embodiment, the specified value is changed according to the image area in which image formation is performed.

That is, in the eleventh embodiment, when a routine for a magnification correction of an image shown in FIG. 15 is started at a predetermined timing, the processing at steps S41 and S42 in FIG. 14 is performed, and at the next step S42", the predetermined region in the horizontal scanning direction is changed according to the image area (imaging size) in which the image formation is to be performed, and the specified value is also set according to the image area.

For example, as shown in Table 4, the predetermined region in the horizontal scanning direction is changed according to the image areas A to E in the horizontal scanning direction, and the specified values corresponding to the image areas A to E are set as shown in Table 5.

Thereafter, the same processing and determination as those at step S43 and following steps in FIG. 14 are performed. The predetermined region in the horizontal scanning direction selected corresponding to the image area in Table 5 (respective selected areas of from the first to the tenth regions) is compared with corresponding respective specified value. When the number of regions in which the phase shift value is larger than the specified value is equal to or smaller than a preset value, magnification correction of an image is executed by phase modulation that can perform magnification correction of the image without expanding the interval between sheets even during continuous printing.

TABLE 4

| Image area | Imaging size in the horizontal scanning direction | Specified region |
|---|---|---|
| A | <120 | 5, 6 |
| B | 120≦, <150 | 4, 5, 6, 7 |
| C | 150≦, <210 | 3, 4, 5, 6, 7, 8 |
| D | 210≦, <270 | 2, 3, 4, 5, 6, 7, 8, 9 |
| E | 270≦ | 1, 2, 3, 4, 5, 6, 7, 8, 9, 10 |

TABLE 5

| Region | Specified value | | | | | Phase shift |
|---|---|---|---|---|---|---|
| | A | B | C | D | E | |
| 1 | A I | B I | C I | D I | E I | I |
| 2 | A II | B II | C II | D II | E II | II |
| 3 | A III | B III | C III | D III | E III | III |
| 4 | A IV | B IV | C IV | D IV | E IV | IV |
| 5 | A V | B V | C V | D V | E V | V |
| 6 | A VI | B VI | C VI | D VI | E VI | VI |
| 7 | A VII | B VII | C VII | D VII | E VII | VII |
| 8 | A VIII | B VIII | C VIII | D VIII | E VIII | VIII |
| 9 | A IX | B IX | C IX | D IX | E IX | IX |
| 10 | A X | B X | C X | D X | E X | X |

When the number of the areas exceeds the preset value, magnification correction of the image is executed by frequency modulation, in which magnification correction of the image is performed by changing the write clock frequency (frequency of an image signal) in the unit of a line or in the unit of a plurality of lines.

According to the eleventh embodiment, since an optimum monitoring area and an optimum specified value can be selected according to the image area (imaging range), the timing at which the shift to the magnification correction of an image by frequency modulation can be accurately controlled. Accordingly, the printing speed (the number of image formation per unit time) can be improved.

Five image areas A to E shown in Table 5 correspond to the predetermined regions in the horizontal scanning direction (respective selected areas of from the first to the tenth regions) as shown in Table 4, but as shown in Table 6, the imaging size in the horizontal scanning direction can be divided into new divided areas i to iii, and the specified values can be provided, as shown in Table 7, corresponding to the respective regions i to iii.

TABLE 6

| Imaging size in the horizontal scanning direction | Divided areas |
|---|---|
| <130 | i |
| 130≦, <250 | ii |
| 250≦ | iii |

TABLE 7

| Region | Specified value | | | Phase shift |
|---|---|---|---|---|
| | i | ii | iii | |
| 1 | i I | ii I | iii I | I |
| 2 | i II | ii II | iii II | II |
| 3 | i III | ii III | iii III | III |
| 4 | i IV | ii IV | iii IV | IV |
| 5 | i V | ii V | iii V | V |
| 6 | i VI | ii VI | iii VI | VI |
| 7 | i VII | ii VII | iii VII | VII |
| 8 | i VIII | ii VIII | iii VIII | VIII |
| 9 | i IX | ii IX | iii IX | IX |
| 10 | i X | ii X | iii X | X |

Figure 16:
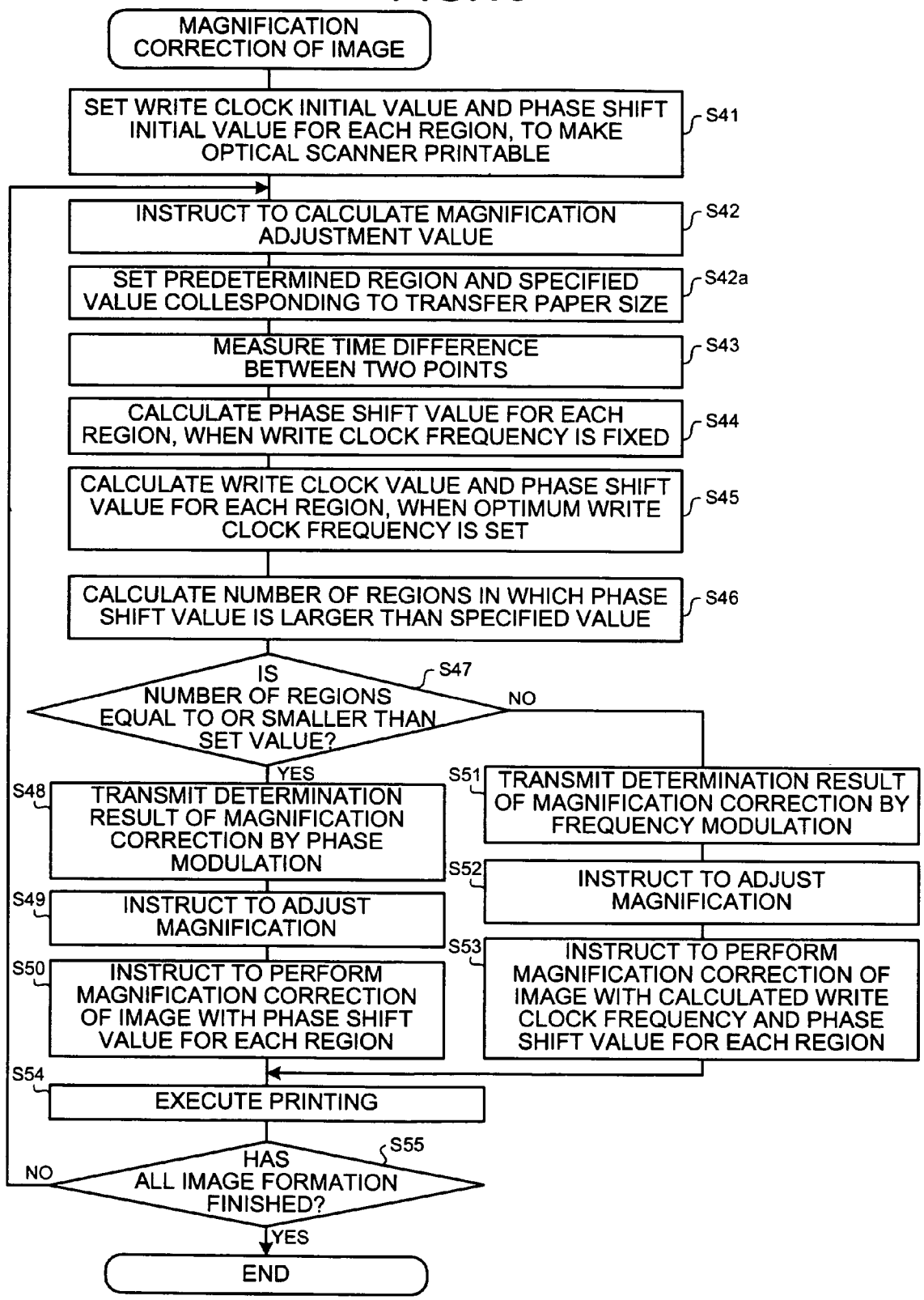
FIG. 16 is a flowchart of a routine for a magnification correction of an image performed by a control system in an image forming apparatus according to a twelfth embodiment of the present invention.

FIG. 16 is a flowchart of a routine for a magnification correction of an image performed by a control system in an image forming apparatus according to a twelfth embodiment of the present invention. For the brevity of explanation, like step numbers are used for like steps for performing the same processing and determination as in FIG. 15.

The configuration of the image forming apparatus according to the twelfth embodiment is the same as that shown in FIG. 2. Moreover, the control system of is the same as that of the fourth embodiment explained with reference to FIG. 7 (or can have the configuration shown in FIG. 5), and only the content of the control performed by the control system is different. Therefore, illustration of the control system is omitted as well.

The image forming apparatus according to the twelfth embodiment is different from the eleventh embodiment in that a specified value-changing unit (a controller having the same configuration as that of the controller 50" in FIG. 7 functions as the specified value-changing unit) that changes the specified value corresponding to type, size, or orientation of the transfer paper is provided.

When the routine for a magnification correction of an image shown in FIG. 16 is started, the image forming apparatus performs the processing at steps S41 and S42 in FIG. 15, and at the next step S42a, the image forming apparatus changes the predetermined region in the horizontal scanning direction according to a selected type, size, or orientation of the transfer paper, and sets the specified value corresponding to the image area determined corresponding to the type, size, or orientation of the transfer paper.

For example, since the image areas A to E shown in Table 5 respectively correspond to the type, size, or orientation of the transfer paper as shown in Table 8, a specified value corresponding to the selected type, size, or orientation of the transfer paper is selected and set by using the Table 5.

TABLE 8

| Image area | Type, size, or orientation of transfer paper | Specified area |
|---|---|---|
| A | Business card | 5, 6 |
| B | A6 vertical | 4, 5, 6, 7 |
| C | A6 horizontal, A5 vertical | 3, 4, 5, 6, 7, 8 |
| D | A5 horizontal, A4 vertical | 2, 3, 4, 5, 6, 7, 8, 9 |
| E | A4 horizontal, A3 vertical | 1, 2, 3, 4, 5, 6, 7, 8, 9, 10 |

Thereafter, the same processing and determination as those at step S43 and following steps in FIG. 15 are performed. The predetermined region in the horizontal scanning direction selected corresponding to the image area in Table 5 (respective selected areas of from the first to the tenth regions) is then compared with corresponding respective specified value.

When the number of regions in which the phase shift value is larger than the specified value is equal to or smaller than a preset value, magnification correction of an image is executed by phase modulation that can perform magnification correction of the image without expanding the interval between sheets even during continuous printing.

When the number of the areas exceeds the preset value, magnification correction of the image is executed by frequency modulation, in which magnification correction of the image is performed by changing the write clock frequency (frequency of an image signal) in the unit of a line or in the unit of a plurality of lines.

According to the twelfth embodiment, a region in which it is desired to prevent image degradation can be changed corresponding to the type, size, or orientation of the transfer paper.

Thus, an example in which the specified value changed by the specified value-changing unit is changed according to the image area in which the image formation is performed has been explained in the eleventh embodiment, and an example in which the specified value changed by the specified value-changing unit is changed according to the type, size, or orientation of the transfer paper to be used has been explained in the twelfth embodiment. However, the specified value can be changed according to cumulative time of the image forming operation, the number of image formation, or the temperature in the image forming apparatus.

Accordingly, an optimum specified value agreeing with the use condition can be set, and hence, the shift from the magnification correction of an image by phase modulation to the magnification correction of the image by frequency modulation can be executed at optimum timing.

Figure 17:
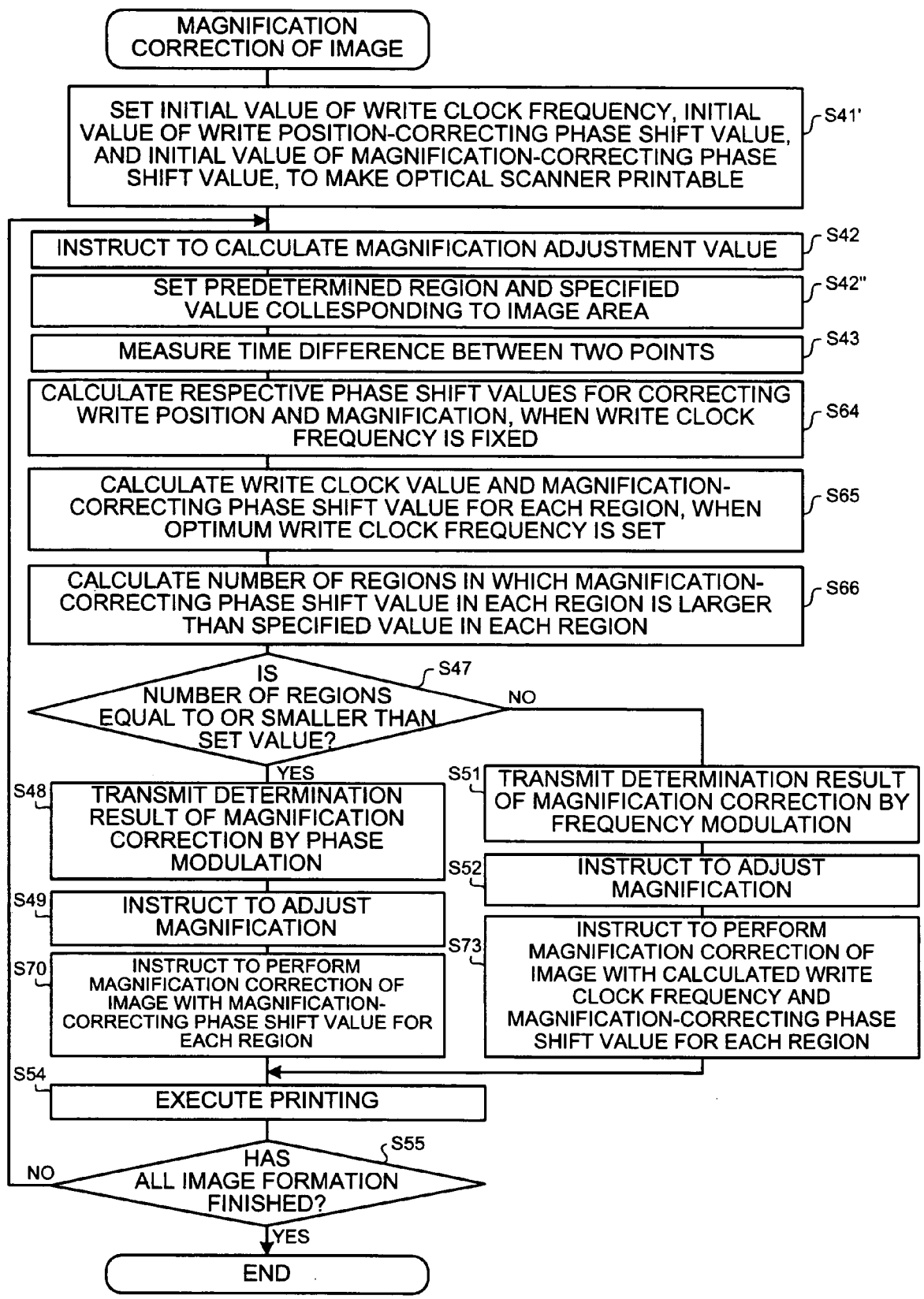
FIG. 17 is a flowchart of a routine for a magnification correction of an image performed by a control system in an image forming apparatus according to a thirteenth embodiment of the present invention.

FIG. 17 is a flowchart of a routine for a magnification correction of an image performed by a control system in an image forming apparatus according to a thirteenth embodiment of the present invention. For the brevity of explanation, like step numbers are used for like steps for performing the same processing and determination as in FIGS. 12 and 15.

The configuration of the image forming apparatus according to the thirteenth embodiment is the same as that shown in FIG. 2. Moreover, the control system is the same as that of the fourth embodiment explained with reference to FIG. 7 (or can have the configuration shown in FIG. 5), and only the content of the control performed by the control system is different. Therefore, illustration of the control system is omitted as well.

The phase modulator (though not shown, a phase controller similar to the phase controller 58b in FIG. 7 functions as the phase modulator) in the image forming apparatus according to the thirteenth embodiment can respectively correct the write start position in the horizontal scanning direction by a write start position-correcting phase adjustment amount by phase modulation, and magnification in the horizontal scanning direction by a magnification-correcting phase adjustment amount in the horizontal scanning direction by phase modulation, and the phase adjustment amount-determining unit (though not shown, a magnification correction controller similar to the magnification correction controller 61 in FIG. 7 functions as the phase adjustment amount-determining unit) determines the magnitude correlation between the magnification-correcting phase adjustment amount in a predetermined region in the horizontal scanning direction (ten regions shown in FIGS. 10A and 10B) and the set specified value.

The predetermined region in the horizontal scanning direction (In FIG. 17, due to the limitation of space, described as the predetermined region) and the specified value are changed corresponding to the image area as in the eleventh embodiment.

In the thirteenth embodiment, when the routine for a magnification correction of an image shown in FIG. 17 is started at a predetermined timing, the controller performs the processing at steps S41' and S42 in FIG. 12, and thereafter at step S42", performs the same processing as explained with reference to FIG. 15, to set the predetermined region in the horizontal scanning direction corresponding to the image area (imaging size) as well as the specified value corresponding to the image area.

Thereafter, the controller performs the processing and determination at step S43 and following steps in FIG. 12. Accordingly, comparison is made between the magnification-correcting phase shift value (a value calculated with the write clock frequency being fixed) in the horizontal scanning predetermined region set corresponding to the image area (area region selected from 1 to 10 regions shown in Table 5) and the specified value set corresponding to the image area, to calculate the number of regions in which the magnification-correcting phase shift value in each area is larger than the specified value in each area.

When the calculated number of regions is equal to or smaller than the preset value, magnification correction of an image is executed by phase modulation that can perform magnification correction of the image without expanding the interval between sheets even during continuous printing. When the number of the areas exceeds the preset value, magnification correction of the image is executed by frequency modulation, in which magnification correction of the image is performed by changing the write clock frequency (frequency of an image signal) in the unit of a line or in the unit of a plurality of lines.

According to the thirteenth embodiment, the phase shift amount (phase adjustment amount) in the horizontal scanning predetermined region set corresponding to the image area becomes an accurate phase shift amount without being affected by the correction of the write start position, and this amount is compared with an optimum specified value set corresponding to the image area, to control the changeover timing to the magnification correction of an image by the frequency modulation. Accordingly, the magnification correction of the image can be changed over to the frequency modulation at accurate timing, thereby further improving the printing speed (the number of image formation per unit time).

Figure 18:
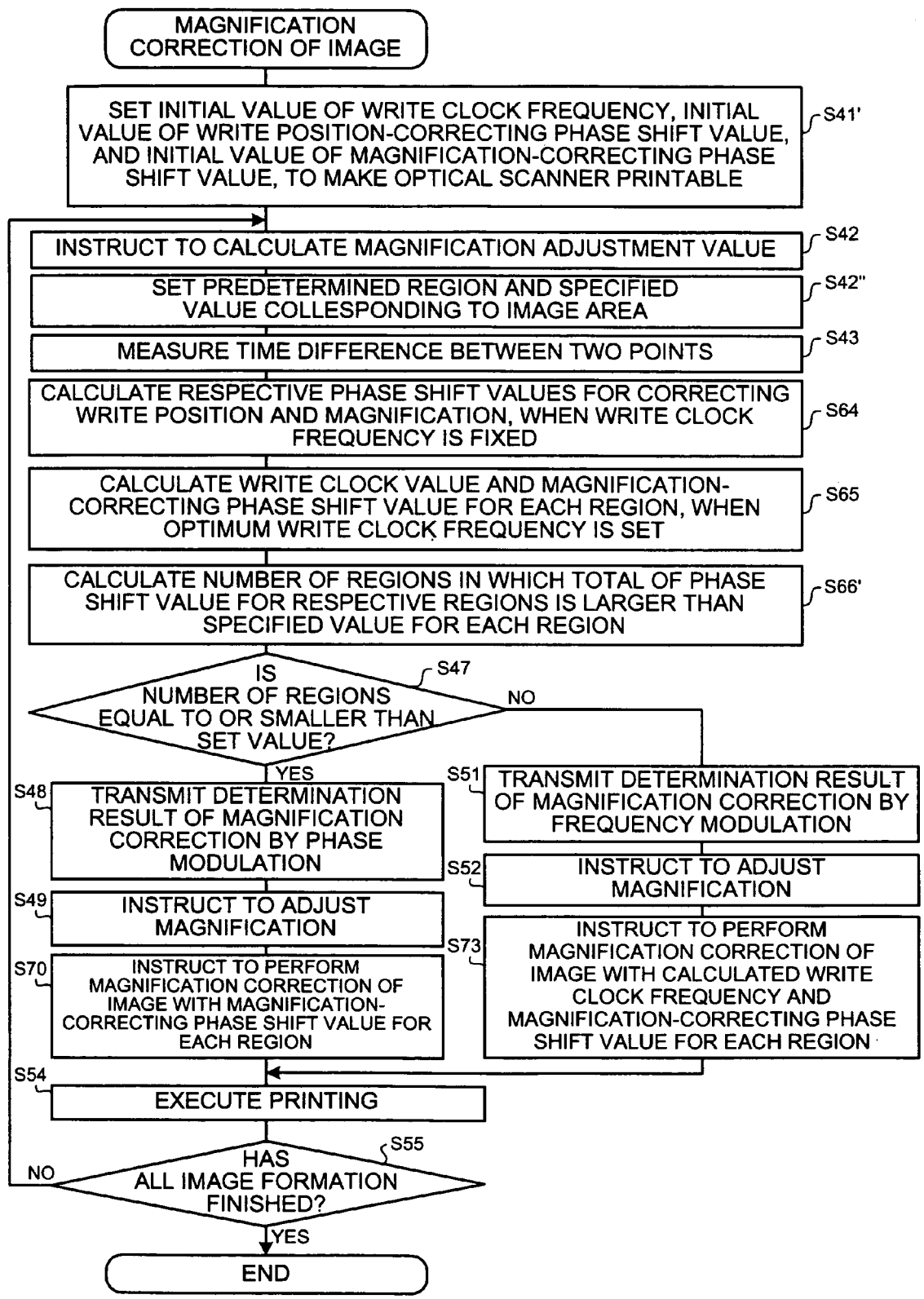
FIG. 18 is a flowchart of a routine for a magnification correction of an image performed by the control system in the image forming apparatus according to a fourteenth embodiment of the present invention.

FIG. 18 is a flowchart of a routine for a magnification correction of an image performed by a control system in an image forming apparatus according to a fourteenth embodiment of the present invention. For the brevity of explanation, like step numbers are used for like steps for performing the same processing and determination as in FIGS. 9 and 15.

The configuration of the image forming apparatus according to the fourteenth embodiment is the same as that shown in FIG. 2. Moreover, the control system is the same as that of the fourth embodiment explained with reference to FIG. 7 (or can have the configuration shown in FIG. 5), and only the content of the control performed by the control system is different. Therefore, illustration of the control system is omitted as well.

The phase modulator (though not shown, a phase controller similar to the phase controller 58b in FIG. 7 functions as the phase modulator) in the image forming apparatus according to the fourteenth embodiment can respectively correct the write start position in the horizontal scanning direction by a write start position-correcting phase adjustment amount by phase modulation, and magnification in the horizontal scanning direction by a magnification-correcting phase adjustment amount in the horizontal scanning direction by phase modulation, and the phase adjustment amount-determining unit (though not shown, a magnification correction controller similar to the magnification correction controller 61 in FIG. 7 functions as the phase adjustment amount-determining unit) determines the magnitude correlation between a phase adjustment amount obtained by adding up the write start position-correcting phase adjustment amount and the magnification-correcting phase adjustment amount in the horizontal scanning direction in a predetermined region in the horizontal scanning direction (ten regions shown in FIGS. 10A and 10B), and the set specified value.

The predetermined region in the horizontal scanning direction (In FIG. 18, due to the limitation of space, described as the predetermined region) and the specified value are changed corresponding to the image area.

In the fourteenth embodiment, when the routine for a magnification correction of an image shown in FIG. 18 is started at a predetermined timing, the controller performs the processing at steps S41' and S42 in FIG. 13, and thereafter at step S42", performs the same processing as explained with reference to FIG. 15, to set the predetermined region in the horizontal scanning direction corresponding to the image area (imaging size) as well as the specified value corresponding to the image area.

Thereafter, the controller performs the processing and determination at step S43 and following steps in FIG. 13. As a result, comparison is made between the phase shift value (phase adjustment amount) obtained by adding up the write start position-correcting phase shift value and the magnification-correcting phase shift value (a value calculated with the write clock frequency being fixed) calculated for each region shown in Table 3, and the specified values I to X corresponding to each area, to calculate the number of regions in which the total of the phase shift values in respective regions is larger than the specified value in the respective regions.

When the calculated number of regions is equal to or smaller than the preset value, magnification correction of an image is executed by phase modulation that can perform magnification correction of the image without expanding the interval between sheets even during continuous printing. When the number of the areas exceeds the preset value, magnification correction of the image is executed by frequency modulation, in which magnification correction of the image is performed by changing the write clock frequency (frequency of an image signal) in the unit of a line or in the unit of a plurality of lines.

According to the fourteenth embodiment, the determination whether to change over magnification correction of an image from the one by phase modulation to the one by frequency modulation is performed by comparing the total of the write start position-correcting phase shift value and the magnification-correcting phase shift value with the specified value. The magnification-correcting phase shift value is calculated based on the optimum predetermined region in the horizontal scanning direction set corresponding to the image area, and the specified value is also set to an optimum value corresponding to the image area. Accordingly, image degradation can be prevented more reliably.

Figure 19:
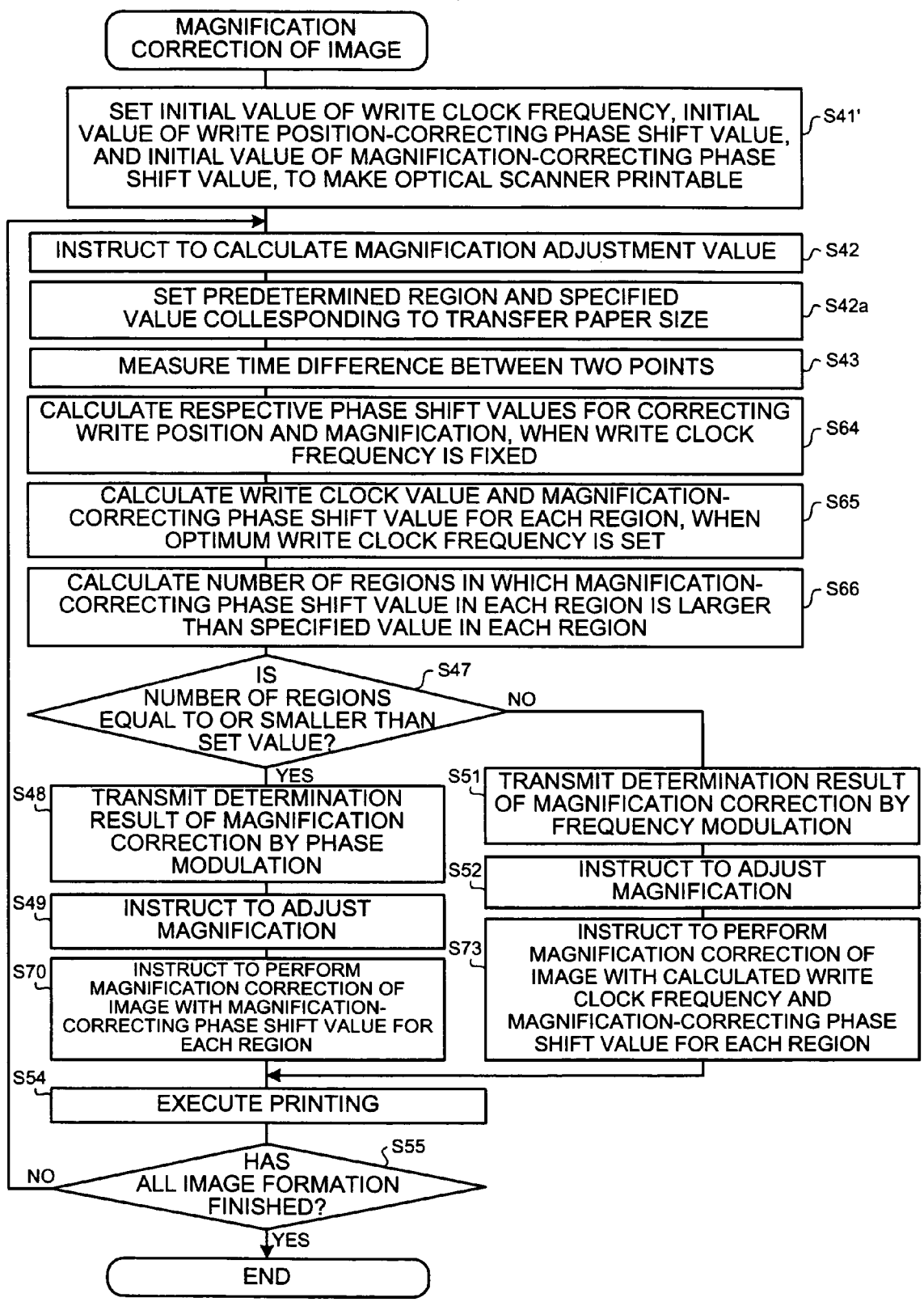
FIG. 19 is a flowchart of a routine for a magnification correction of an image performed by a control system in an image forming apparatus according to a fifteenth embodiment of the present invention.

FIG. 19 is a flowchart of a routine for a magnification correction of an image performed by a control system in an image forming apparatus according to a fifteenth embodiment of the present invention. For the brevity of explanation, like step numbers are used for like steps for performing the same processing and determination as in FIGS. 16 and 17.

The configuration of the image forming apparatus according to the fifteenth embodiment is the same as that shown in FIG. 2. Moreover, the control system is the same as that of the fourth embodiment explained with reference to FIG. 7 (or can have the configuration shown in FIG. 5), and only the content of the control performed by the control system is different. Therefore, illustration of the control system is omitted as well.

The phase modulator (though not shown, a phase controller similar to the phase controller 58b in FIG. 7 functions as the phase modulator) in the image forming apparatus according to the fifteenth embodiment can respectively correct the write start position in the horizontal scanning direction by a write start position-correcting phase adjustment amount in the horizontal scanning predetermined region (ten regions shown in FIGS. 10A and 10B), and magnification in the horizontal scanning direction by a magnification-correcting phase adjustment amount in the horizontal scanning direction in the horizontal scanning predetermined region, and the phase adjustment amount-determining unit (though not shown, a magnification correction controller similar to the magnification correction controller 61 in FIG. 7 functions as the phase adjustment amount-determining unit) determines the magnitude correlation between the magnification-correcting phase adjustment amount in the horizontal scanning direction and the set specified value.

The predetermined region in the horizontal scanning direction (In FIG. 19, due to the limitation of space, described as the predetermined region) and the specified value are changed corresponding to the type, size, or orientation of the transfer paper as in the twelfth embodiment.

In the fifteenth embodiment, when the routine for a magnification correction of an image shown in FIG. 19 is started at a predetermined timing, the controller performs the processing at steps S41' and S42 in FIG. 13, and thereafter at step S42a, performs the same processing as explained with reference to FIG. 16, to set the predetermined in the horizontal scanning direction corresponding to the type, size, or orientation of the transfer paper, as well as the specified value corresponding to the type, size, or orientation of the transfer paper.

Thereafter, the controller performs the processing and determination at step S43 and following steps in FIG. 17. Accordingly, comparison is made between the magnification-correcting phase shift value (a value calculated with the write clock frequency being fixed) in the horizontal scanning predetermined region (a region selected from 1 to 10 regions shown in Table 5) set corresponding to the image area, and the specified value set corresponding to the image area, to calculate the number of regions in which the magnification-correcting phase shift value in each area is larger than the specified value in each area.

When the calculated number of regions is equal to or smaller than the preset value, magnification correction of an image is executed by phase modulation that can perform magnification correction of the image without expanding the interval between sheets even during continuous printing. When the number of the areas exceeds the preset value, magnification correction of the image is executed by frequency modulation, in which magnification correction of the image is performed by changing the write clock frequency (frequency of an image signal) in the unit of a line or in the unit of a plurality of lines.

The relation between the type, size, or orientation of the transfer paper and the predetermined region in the horizontal scanning direction is, for example, the relation shown in Table 8. In the example of Table 8, the five image areas A to E respectively correspond to the predetermined regions in the horizontal scanning direction (selected areas from the first to the tenth regions), and the image areas A to E correspond to the respective specified values as shown in Table 5. However, the type, size, or orientation of the transfer paper can be independently classified as shown in Table 9, and specified values respectively corresponding to the classified portions can be set as shown in Table 7.

According to the fifteenth embodiment, a phase shift amount in the selected area that is not affected by correction of the write start position can be obtained, and an optimum monitoring area and specified value can be selected. Accordingly, changeover from the magnification correction of an image by phase modulation to the magnification correction of the image by frequency modulation can be performed at optimum timing, thereby improving the printing speed and the productivity in image formation.

Figure 20:
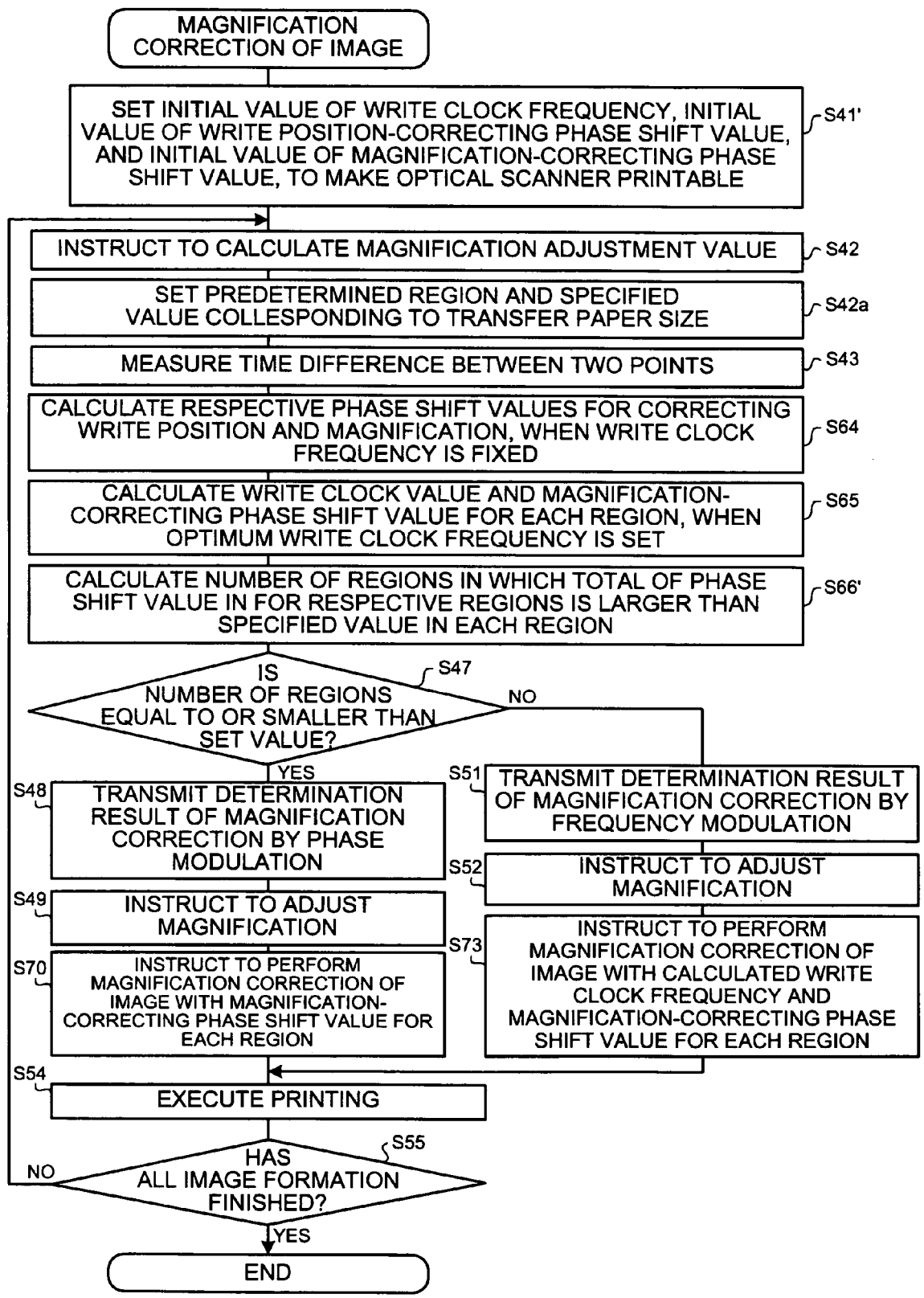
FIG. 20 is a flowchart of a routine for a magnification correction of an image performed by a control system in an image forming apparatus according to a sixteenth embodiment of the present invention.

FIG. 20 is a flowchart of a routine for a magnification correction of an image performed by a control system in an image forming apparatus according to a sixteenth embodiment of the present invention. For the brevity of explanation, like step numbers are used for like steps for performing the same processing and determination as in FIGS. 16 and 18.

The configuration of the image forming apparatus according to the sixteenth embodiment is the same as that shown in FIG. 2. Moreover, the control system is the same as that of the fourth embodiment explained with reference to FIG. 7 (or can have the configuration shown in FIG. 5), and only the content of the control performed by the control system is different. Therefore, illustration of the control system is omitted as well.

The phase modulator (though not shown, a phase controller similar to the phase controller 58b in FIG. 7 functions as the phase modulator) in the image forming apparatus according to the sixteenth embodiment can respectively correct the write start position in the horizontal scanning direction by a write start position-correcting phase adjustment amount in the horizontal scanning predetermined region (ten regions shown in FIGS. 10A and 10B), and magnification in the horizontal scanning direction by a magnification-correcting phase adjustment amount in the horizontal scanning direction in the horizontal scanning predetermined region, and the phase adjustment amount-determining unit (though not shown, a magnification correction controller similar to the magnification correction controller 61 in FIG. 7 functions as the phase adjustment amount-determining unit) determines the magnitude correlation between a phase adjustment amount obtained by adding up the write start position-correcting phase adjustment amount and the magnification-correcting phase adjustment amount in the horizontal scanning direction in a predetermined region, and the set specified value.

The predetermined region in the horizontal scanning direction (In FIG. 20, due to the limitation of space, described as the predetermined region) and the specified value are changed corresponding to the type, size, or an orientation of the transfer paper as in the twelfth and fifteenth embodiments.

In the sixteenth embodiment, when the routine for a magnification correction of an image shown in FIG. 20 is started at a predetermined timing, the controller performs the processing at steps S41' and S42 in FIG. 13, and thereafter at step S42a, performs the same processing as explained with reference to FIG. 16, to set the predetermined in the horizontal scanning direction corresponding to the type, size, or orientation of the transfer paper to be used, as well as the specified value corresponding to the type, size, or orientation of the transfer paper.

Thereafter, the controller performs the processing and determination at step S43 and following steps in FIG. 13. Accordingly, comparison is made between the phase shift value (phase adjustment amount) obtained by adding up the write start position-correcting phase shift value and the magnification-correcting phase shift value (a value calculated with the write clock frequency being fixed) calculated for each region shown in Table 3, and the specified values I to X corresponding to each area, to calculate the number of regions in which the total of the phase shift values in respective regions is larger than the specified value in the respective regions.

When the calculated number of regions is equal to or smaller than the preset value, magnification correction of an image is executed by phase modulation that can perform magnification correction of the image without expanding the interval between sheets even during continuous printing. When the number of the areas exceeds the preset value, magnification correction of the image is executed by frequency modulation, in which magnification correction of the image is performed by changing the write clock frequency (frequency of an image signal) in the unit of a line or in the unit of a plurality of lines.

According to the sixteenth embodiment, the determination whether to change over magnification correction of an image from the magnification correction by phase modulation to the magnification correction by frequency modulation is performed by comparing the phase shift value obtained by adding up the write start position-correcting phase shift value and the magnification-correcting phase shift value with the specified value. The magnification-correcting phase shift value is calculated according to the optimum predetermined region in the horizontal scanning direction set corresponding to the type, size, or orientation of the transfer paper, and the specified value is also set to an optimum value corresponding to the type, size, or orientation of the transfer paper. Accordingly, image degradation can be prevented more reliably.

Since the magnification correction of an image is changed over from magnification correction by phase modulation to magnification correction by frequency modulation at optimum timing, the execution timing of magnification correction of the image by the frequency modulation in which the image forming operation needs to be suspended can be delayed until at the very limit at which image degradation is not acceptable anymore. Accordingly, the productivity in image formation (the printing speed) can be improved.

Figure 21:
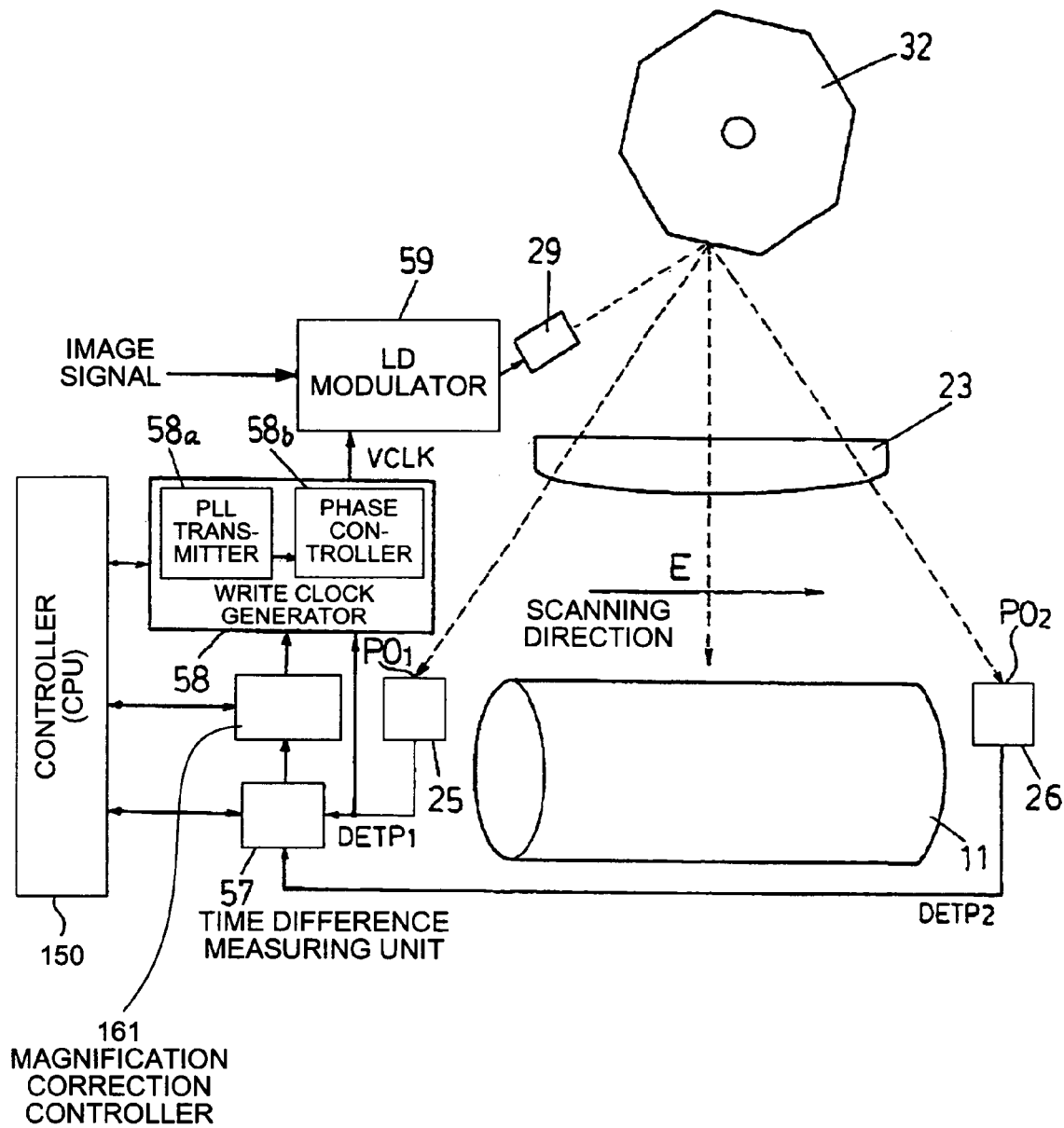
FIG. 21 is a schematic block diagram of relevant parts of an optical scanner and a photoconductor together with an associated control system of an image forming apparatus according to a seventeenth embodiment of the present invention.
Figure 22:
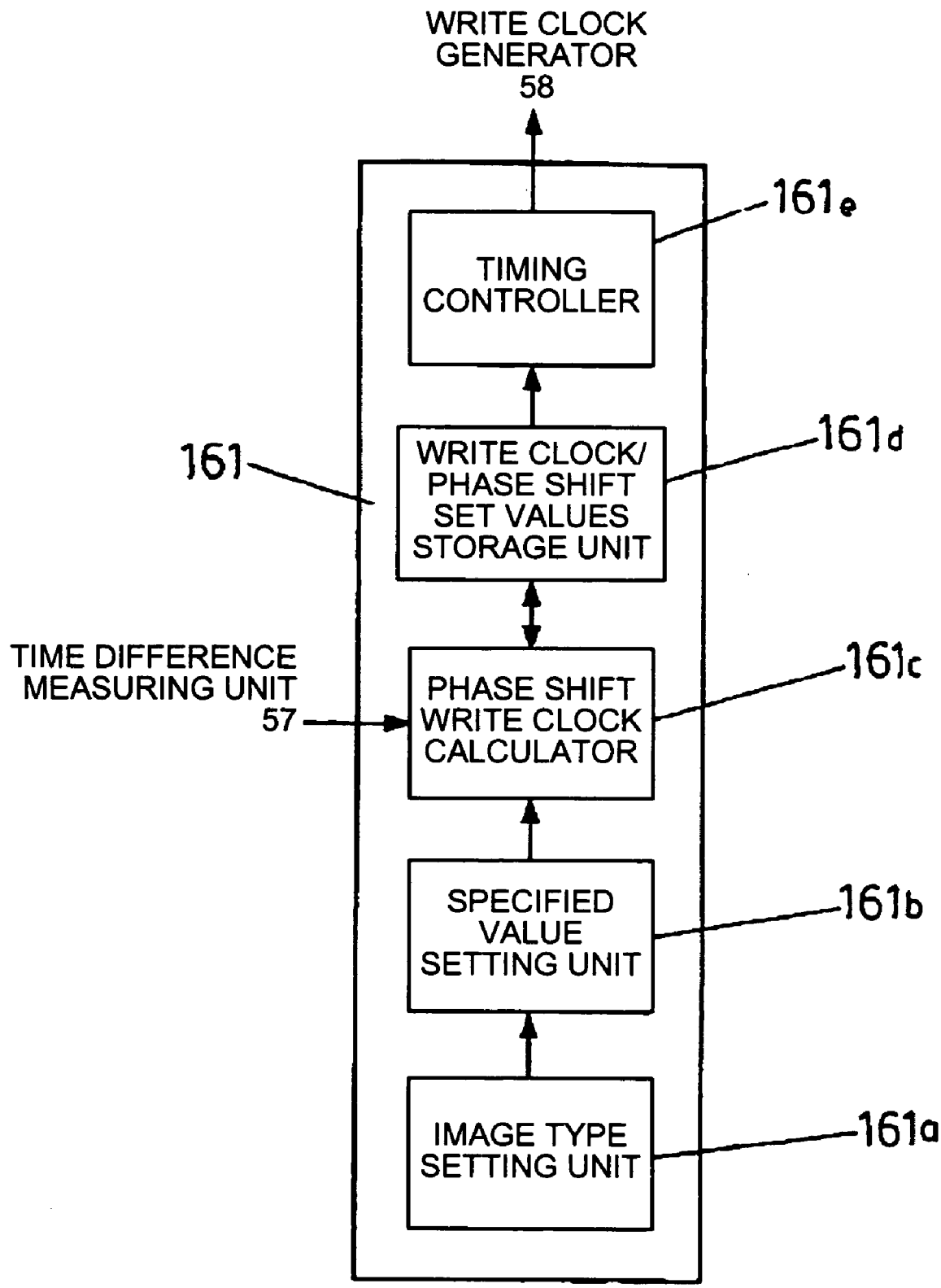
FIG. 22 is a block diagram of a magnification correction controller of the control system in the image forming apparatus according to the seventeenth embodiment.
Figure 23:
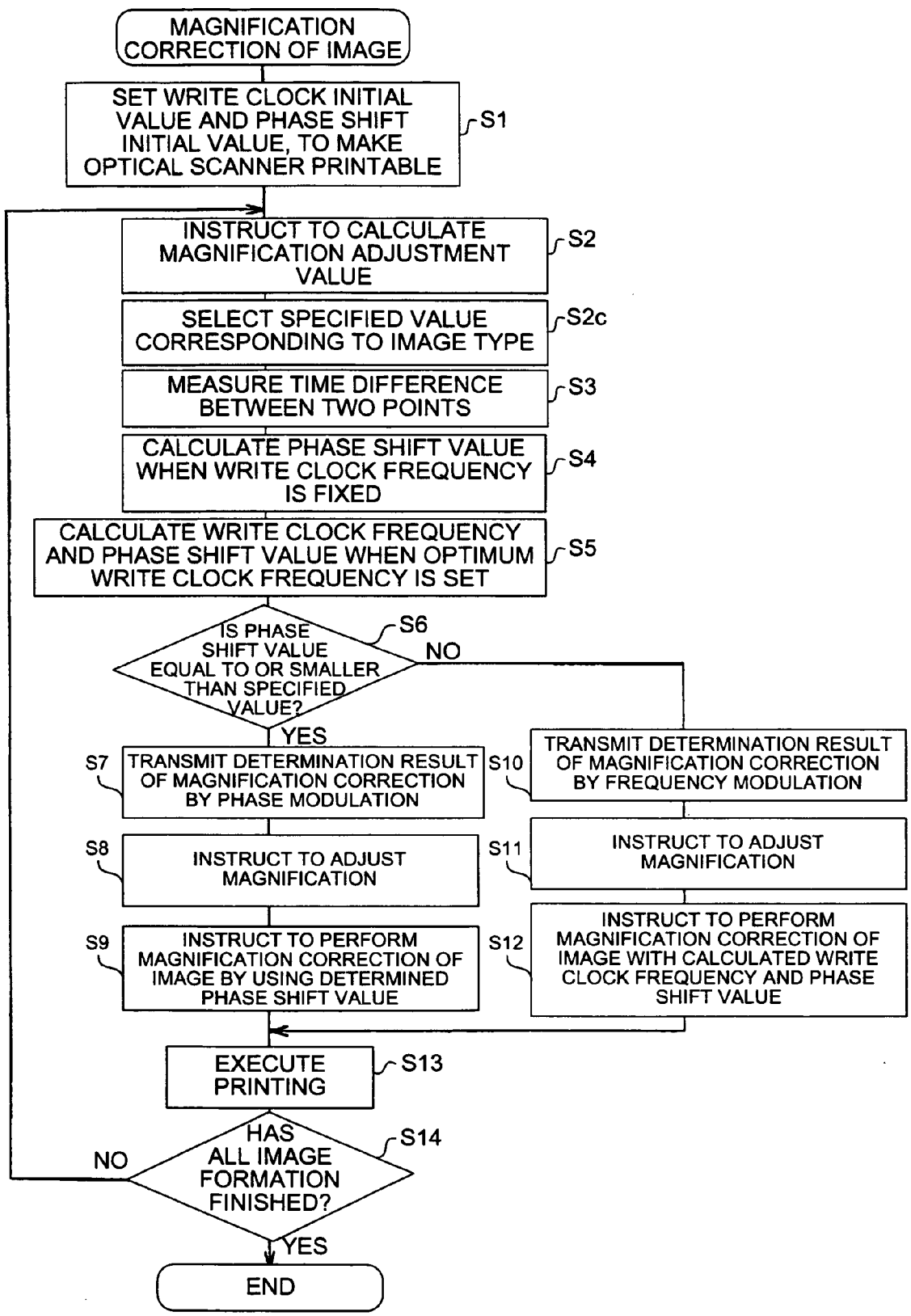
FIG. 23 is a flowchart of a routine for a magnification correction of an image performed by the control system in the image forming apparatus according to the seventeenth embodiment.

FIG. 21 is a schematic block diagram of relevant parts of an optical scanner and a photoconductor together with an associated control system of an image forming apparatus according to a seventeenth embodiment of the present invention; FIG. 22 is a block diagram of the configuration of a magnification correction controller of the control system; and FIG. 23 is a flowchart of a routine for a magnification correction of an image performed by the control system.

In FIG. 21, like reference signs are designated with like parts in FIG. 1. The configuration of the image forming apparatus according to the seventeenth embodiment is the same as that shown in FIG. 2. In FIG. 23, like step numbers are used for like steps of performing the same processing and determination as in FIG. 3, for the brevity of explanation.

The image forming apparatus according to the seventeenth embodiment is different from the image forming apparatus according to the first embodiment in that a magnification correction controller 161 is provided instead of the magnification correction controller 61 shown in FIG. 1. This magnification correction controller 161 functions as a specified value-changing unit that changes the specified value corresponding to the image type.

The magnification correction controller 161 includes an image type setting unit 161a, a specified value setting unit 161b, a phase shift/write clock calculator 161c, a write clock/phase shift set value storage unit 161d, and a timing controller 161e.

The specified value setting unit 161b in the magnification correction controller 161 selects a specified value according to a lookup table, as shown in Table 10, corresponding to a signal corresponding to the image type transmitted from the image type setting unit 161a, and sets the specified value.

In the seventeenth embodiment, when the routine for a magnification correction of an image shown in FIG. 23 is started at a predetermined timing, the same processing as explained with reference to FIG. 3 is performed at steps S1 and S2.

At next step S2c, a specified value corresponding to the image type is selected. Accordingly, a specified value corresponding to any one of text, photograph, and text and photograph is selected from the lookup table, as shown in Table 9. The image type is preset by a controller 150 at timing before instructing to calculate a magnification adjustment value.

At step S3 and following steps, the same processing and determination as those at step S3 and following steps in FIG. 3 are performed.

According to the image forming apparatus according to the seventeenth embodiment, an optimum specified value is selected according to the image type, and until a phase adjustment amount (phase shift value) exceeds the specified value, magnification correction of an image is performed without changing the frequency, but changing the cycle time of an optional pixel in the unit of pixel, and when the phase adjustment amount exceeds the specified value, magnification correction of the image is performed by frequency modulation, in which magnification correction is performed while suspending continuous printing by changing the frequency of an image signal in the unit of a line or in the unit of a plurality of lines. Accordingly, since the number of execution of magnification correction of the image by frequency modulation can be reduced, the productivity in image formation can be improved.

Figure 24:
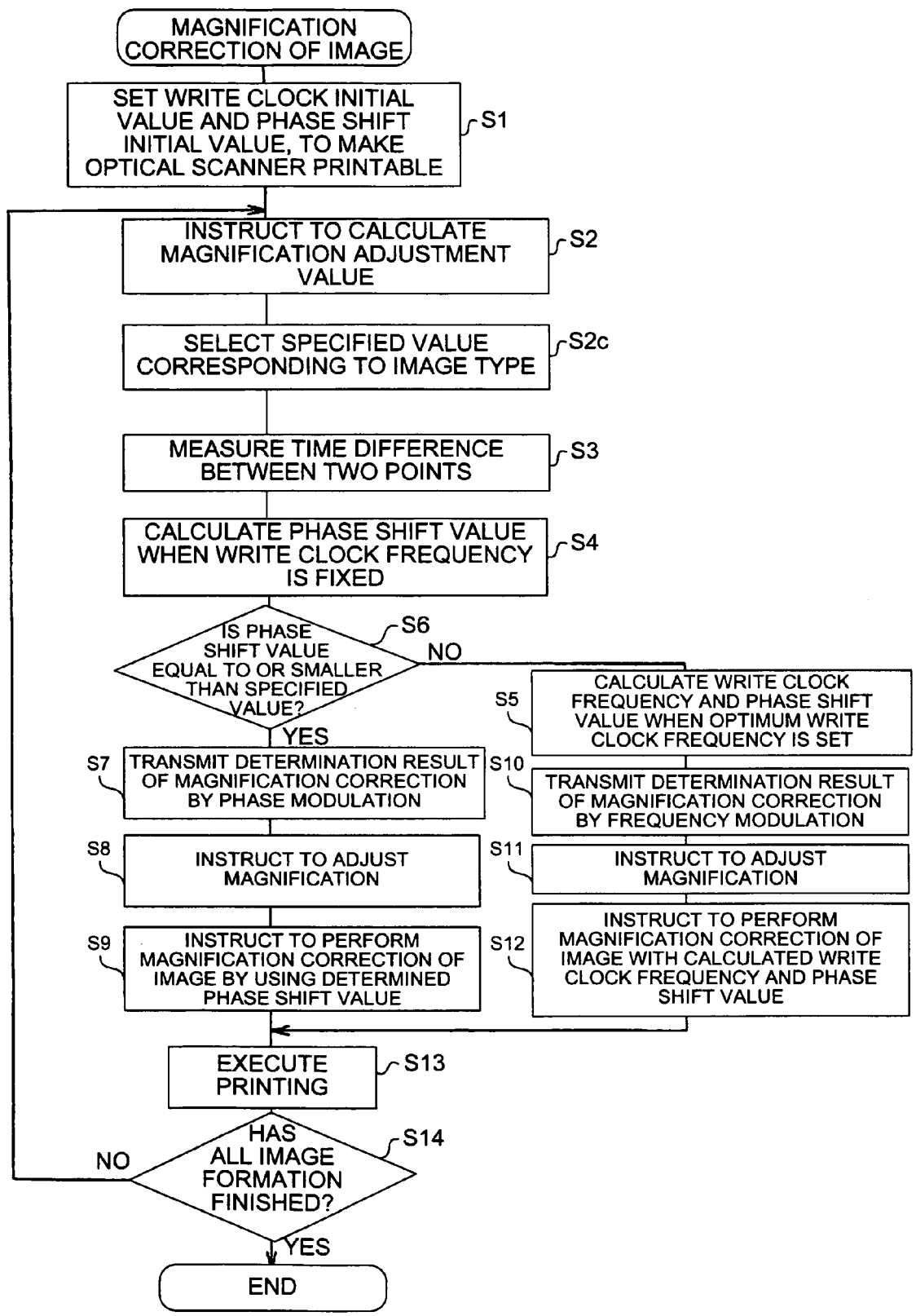
FIG. 24 is a flowchart of a routine for the magnification correction of an image performed by a control system in an image forming apparatus according to an eighteenth embodiment of the present invention.

FIG. 24 is a flowchart of a routine for a magnification correction of an image performed by a control system in an image forming apparatus according to an eighteenth embodiment of the present invention. For the brevity of explanation, like step numbers are used for like steps of performing the same processing and determination as in FIGS. 4 and 23. The configuration of the image forming apparatus according to the eighteenth embodiment is the same as that shown FIG. 2, moreover, the configuration of the control system thereof is the same as explained with reference to FIGS. 21 and 22, and the content of the control performed by the controller (CPU) is slightly different, the illustration thereof is omitted.

In the image forming apparatus according to the eighteenth embodiment, when a routine shown in FIG. 24 is started, the same processing as in FIG. 4 is performed at steps S1 and S2.

At next step S2c, a specified value corresponding to the image type is selected. Accordingly, a specified value corresponding to any one of text, photograph, and text and photograph is selected from the lookup table, as shown in Table 9.

At step S3 and following steps, the same processing and determination as those at step S3 and following steps in FIG. 3 are performed. That is, in the eighteenth embodiment, as in the second embodiment explained with reference to FIG. 4, only when the phase shift value when the write clock is fixed is larger than the specified value, calculation of the write clock value and the phase shift value when optimum write clock frequency is set is executed.

In this manner, the same effect as in the seventeenth embodiment can be obtained.

Figure 25:
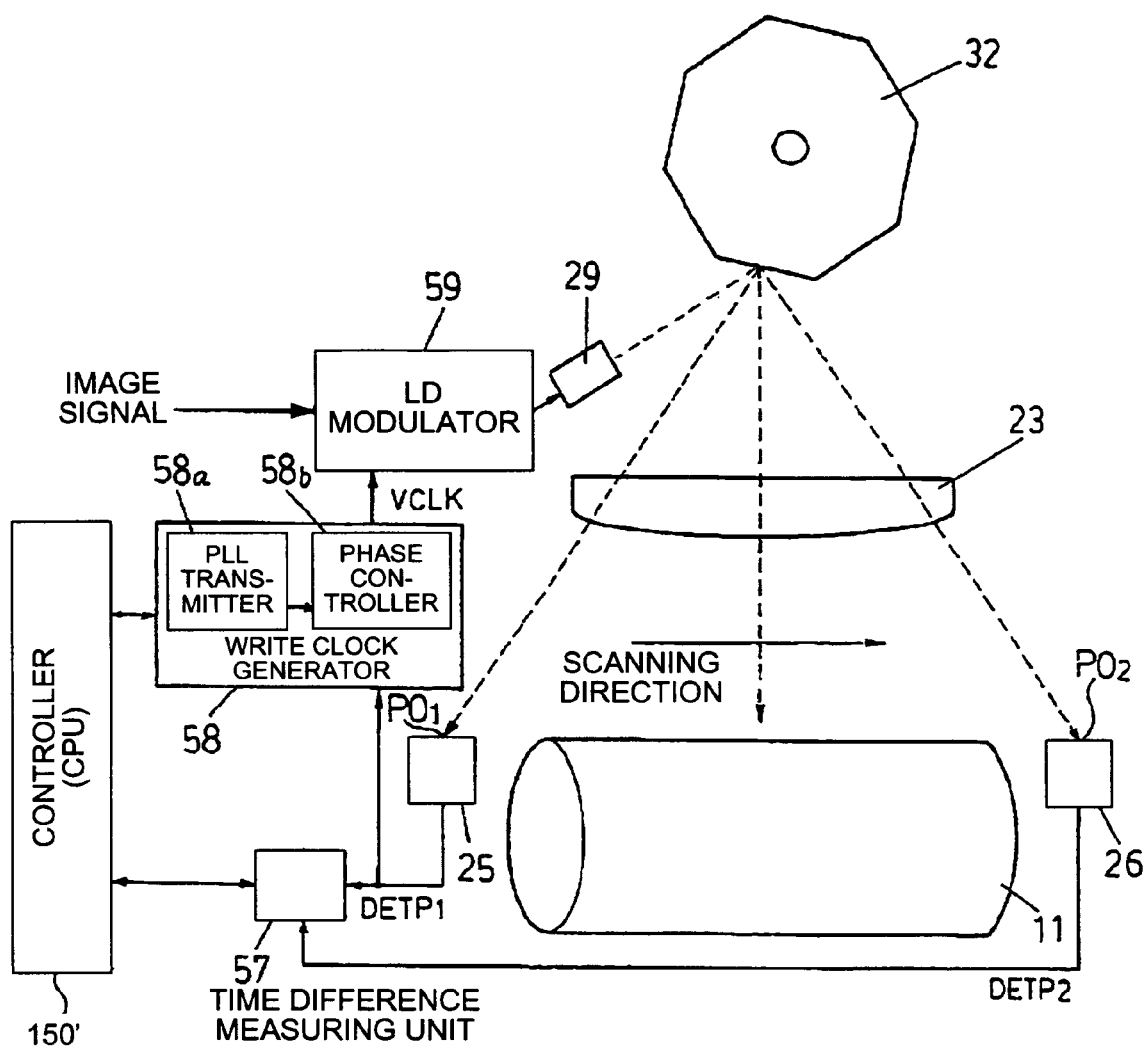
FIG. 25 is a schematic block diagram of relevant parts of an optical scanner and a photoconductor together with an associated control system of an image forming apparatus according to a nineteenth embodiment of the present invention.
Figure 26:
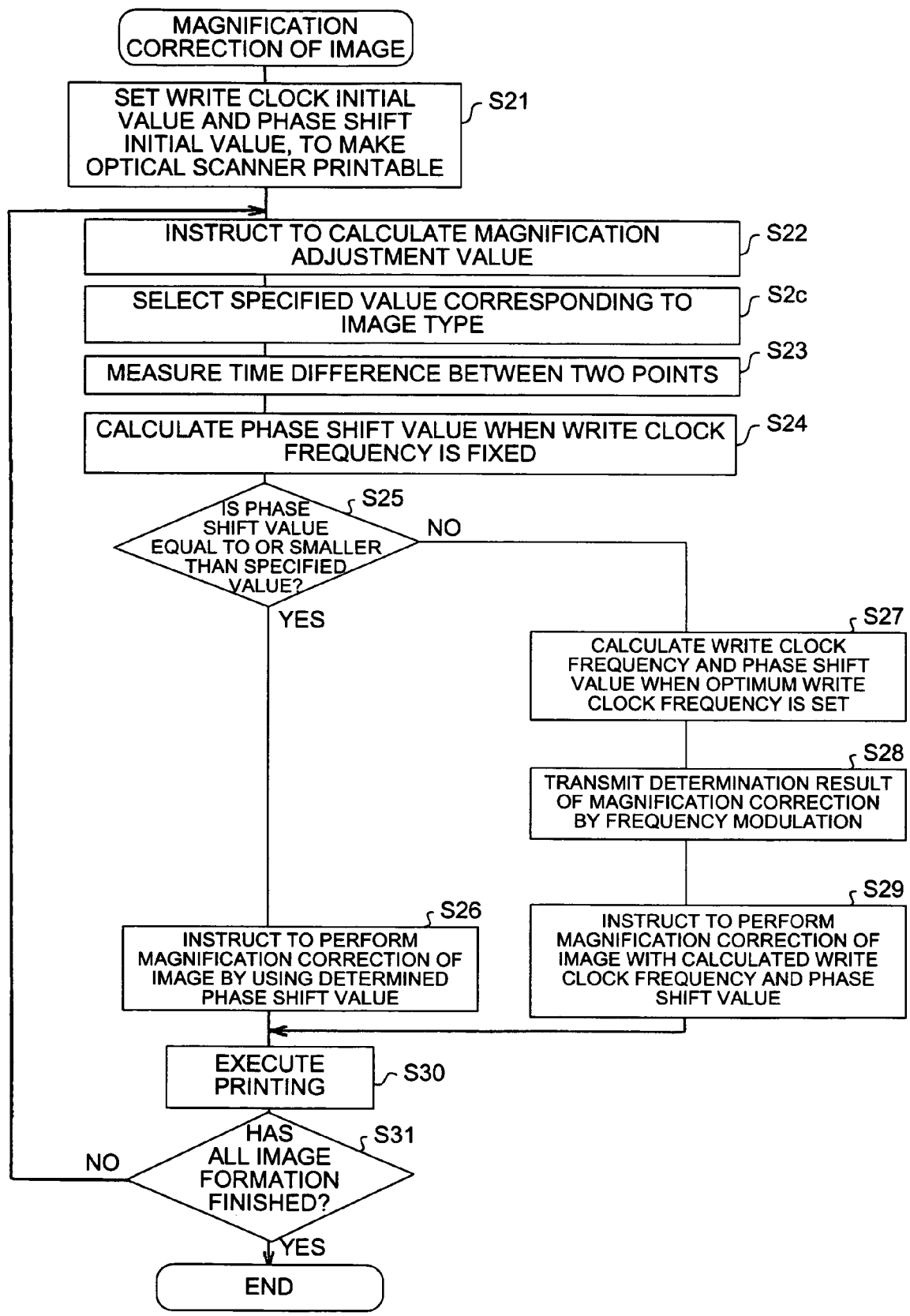
FIG. 26 is a flowchart of a routine for a magnification correction of an image performed by the control system in the image forming apparatus according to the nineteenth embodiment.

FIG. 25 is a schematic block diagram of relevant parts of an optical scanner and a photoconductor together with an associated control system of an image forming apparatus according to a nineteenth embodiment of the present invention; and FIG. 26 is a flowchart of a routine for a magnification correction of an image performed by the control system. In FIG. 25, like reference signs are designated with like parts in FIG. 21. In FIG. 26, for the brevity of explanation, like step numbers are used for like steps of performing the same processing and determination as in FIGS. 6 and 23.

The configuration of the image forming apparatus according to the nineteenth embodiment is the same as that shown in FIG. 2.

The image forming apparatus according to the nineteenth embodiment is different from the seventeenth embodiment in that a controller (CPU) 150' performs the function of the magnification correction controller 61 explained with reference to FIG. 21. The controller 150' is a microcomputer similar to the controller 150, and only the content of the control is different.

In the nineteenth embodiment, the time difference measuring unit 57 performs time difference measurement and calculation of the laser beam detection signals DETP1 and DETP2, and transmits the measurement result and the calculation result to the controller 150'. The controller 150' has a storage unit that stores initially set values and current set values of the write clock frequency and phase shift value (phase adjustment amount), and has a function of calculating an optimum write clock frequency and phase shift value, by using the fact that the image magnification in the horizontal scanning direction is changed by the frequency of the optimum write clock and by using the fact that the image magnification is changed by shifting the phase.

The controller 150' also has a function of calculating the phase shift value by fixing the write clock frequency, a function of selecting a specified value corresponding to the image type shown in the lookup table in Table 9, and a function of comparing the selected specified value with the calculated phase shift value. The controller 150' transmits a write clock setting signal and a control signal for performing the phase shift to the write clock generator 58 at a predetermined timing, respectively.

That is, in the nineteenth embodiment, the controller 150' serves as the phase adjustment amount-determining unit, and the controller 150' also serves as a modulation content changeover unit. The controller 150' also serves as the frequency modulator together with the PLL transmitter 58a and as the phase modulator together with the phase controller 58b.

In FIG. 25, an example in which the write clock generator 58 and the time difference measuring unit 57 are separate blocks is shown, but these can be combined to form a single block as the write clock generator.

The controller 150' in the nineteenth embodiment starts the routine for a magnification correction of an image shown in FIG. 26 at a predetermined timing. The controller 150' then performs the same processing as explained with reference to FIG. 6 at steps S21 and S22.

At next step S2c, a specified value corresponding to the image type is selected. Accordingly, a specified value corresponding to any one of text, photograph, and text and photograph is selected from the lookup table in Table 9.

At step S23 and following steps, the same processing and determination as those at step S23 and following steps in FIG. 6 are performed. That is, in the nineteenth embodiment, as in the third embodiment explained with reference to FIG. 6, only when the phase shift value when fixing the write clock is larger than the specified value, calculation of the write clock value and the phase shift value when optimum write clock frequency is set is executed.

In this manner, the same effect as in the eighteenth embodiment can be obtained.

Figure 27:
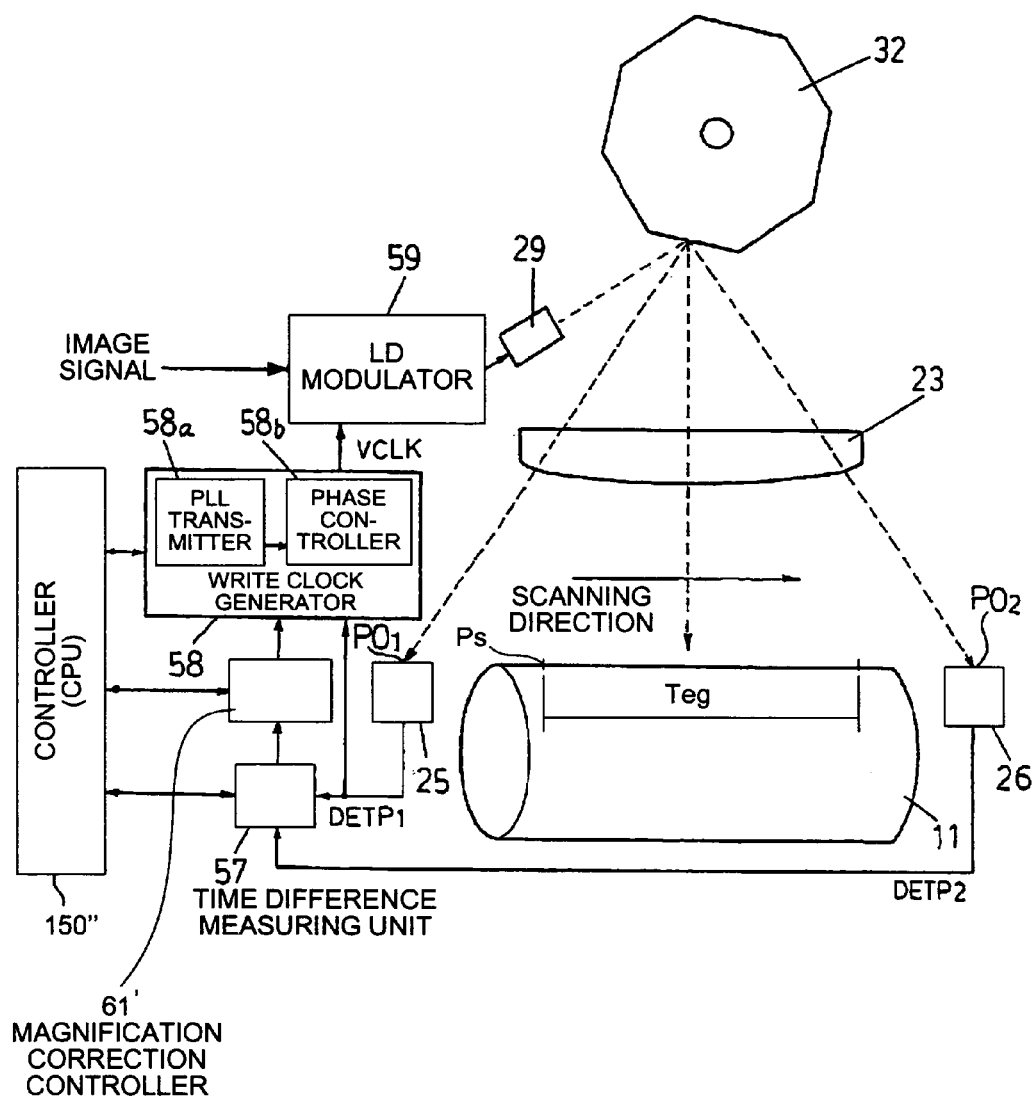
FIG. 27 is a schematic block diagram of relevant parts of an optical scanner and a photoconductor together with an associated control system of an image forming apparatus according to a twentieth embodiment of the present invention.
Figure 28:
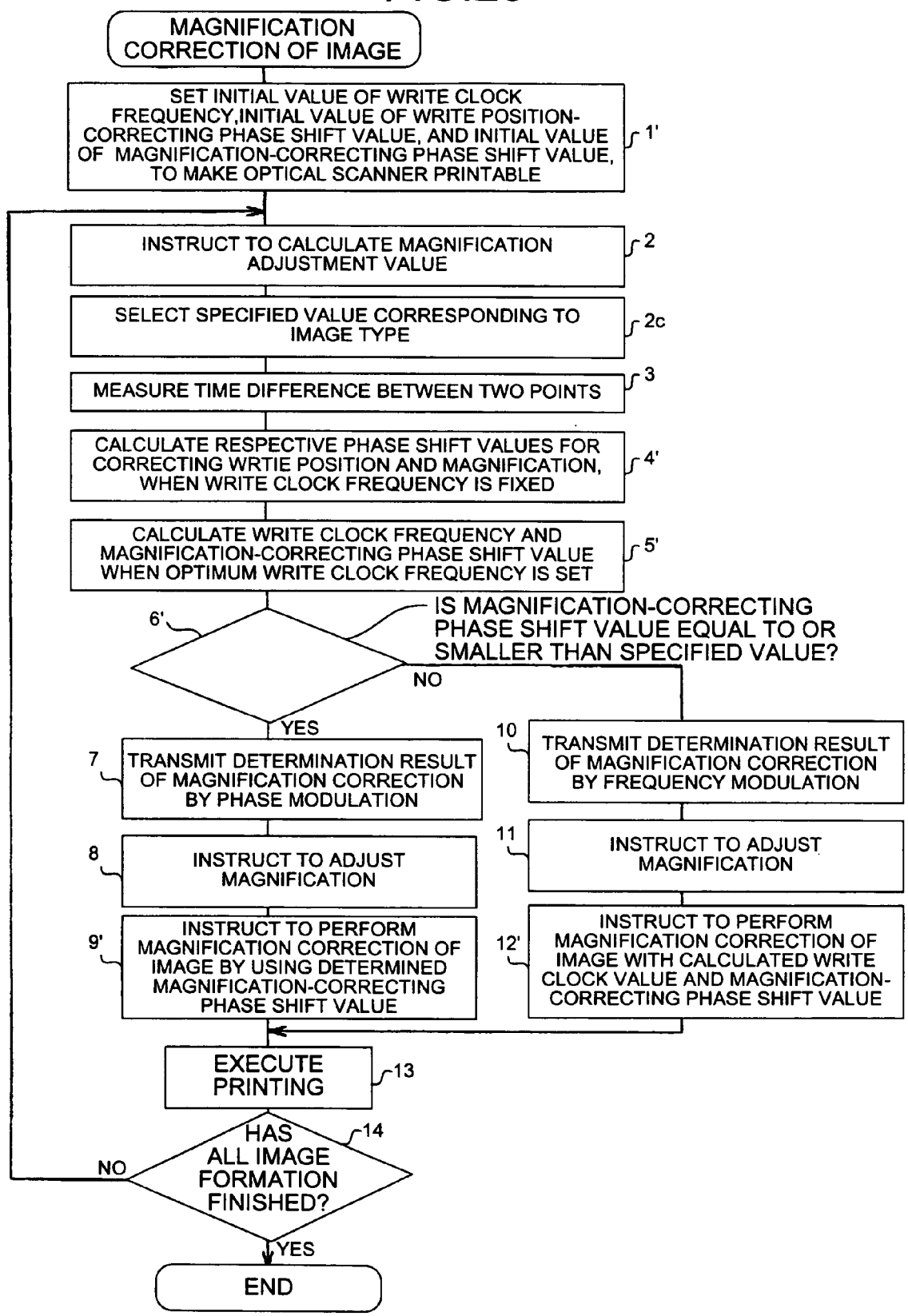
FIG. 28 is a flowchart of a routine for a magnification correction of an image performed by the control system in the image forming apparatus according to the twentieth embodiment.

FIG. 27 is a schematic block diagram of relevant parts of an optical scanner and a photoconductor together with an associated control system of an image forming apparatus according to a twentieth embodiment of the present invention; and FIG. 28 is a flowchart of a routine for a magnification correction of an image performed by the control system. In FIG. 27, like reference signs are designated with like parts in FIG. 25. In FIG. 28, for the brevity of explanation, steps for performing like processing and determination as in FIGS. 8 and 23 are designated by like step numbers.

Also in the twentieth embodiment, since the configuration of the whole image forming apparatus is the same as in FIG. 2, the illustration thereof is omitted.

The image forming apparatus according to the twentieth embodiment is different from the image forming apparatus explained with reference to FIGS. 21 and 23 in that correction of the write start position Ps in the horizontal scanning direction can be performed by a write position-correcting phase shift value (a write start position-correcting phase adjustment amount), and magnification correction in the horizontal scanning direction can be performed by a magnification-correcting phase shift value (a magnification-correcting phase adjustment amount in the horizontal scanning direction), and the magnitude correlation between the magnification-correcting phase shift value and the set specified value is determined, and based on the determination result, magnification correction of an image is performed by phase modulation calculated by fixing the frequency of an image signal until the magnification-correcting phase shift value exceeds the specified value, and after the magnification-correcting phase shift value exceeds the specified value, magnification correction of the image is performed by frequency modulation.

In this manner, when the configuration is such that optimum phase adjustment (phase shift) by changing the cycle time of an optional pixel in the unit of pixel is performed, that is, when optimum correction of the write start position Ps in the horizontal scanning direction and the magnification in the horizontal scanning direction is performed based on the write position-correcting phase shift value and the magnification-correcting phase shift value respectively calculated by fixing the write clock frequency, the magnification correction controller 61' has a storage unit that stores an initially set values and the current set values of the write clock frequency, the write position-correcting phase shift value in the horizontal scanning direction, and the magnification-correcting phase shift value, transmitted from the controller (CPU) 150".

The controller (CPU) 150" is a microcomputer, which starts the routine for a magnification correction of an image shown in FIG. 28, at a predetermined timing such as after turning the power on or restarting after having stopped the machine.

The controller 150" then performs the same processing as explained with reference to FIG. 8 at steps S1' and S2.

At next step S2c, a specified value corresponding to the image type is selected, as explained with reference to FIG. 23. Accordingly, a specified value corresponding to any one of text, photograph, and text and photograph is selected from the lookup table in Table 9.

At step S3 and following steps, the same processing and determination as those at step S3 and following steps in FIG. 8 are performed. That is, in the twentieth embodiment, as in the fourth embodiment explained with reference to FIG. 8, only when the phase shift value when fixing the write clock is larger than the specified value, calculation of the write clock value and the phase shift value when optimum write clock frequency is set is executed, thereby performing magnification correction of an image by frequency modulation.

In the image forming apparatus according to the twentieth embodiment, the changeover to the magnification correction of the image by frequency modulation is determined by comparing only the magnification-correcting phase shift value with the specified value. However, since the write position-correcting phase shift value has little influence on image degradation in the image area, no problem will occur.

Only when the magnification-correcting phase shift value exceeds the specified value, magnification correction of the image by frequency modulation in which it is necessary to suspend the image forming operation is performed, and hence, the number of execution of the magnification correction of the image by frequency modulation can be reduced, thereby improving the gross printing speed, as the whole image forming apparatus, (productivity in image formation).

Figure 29:
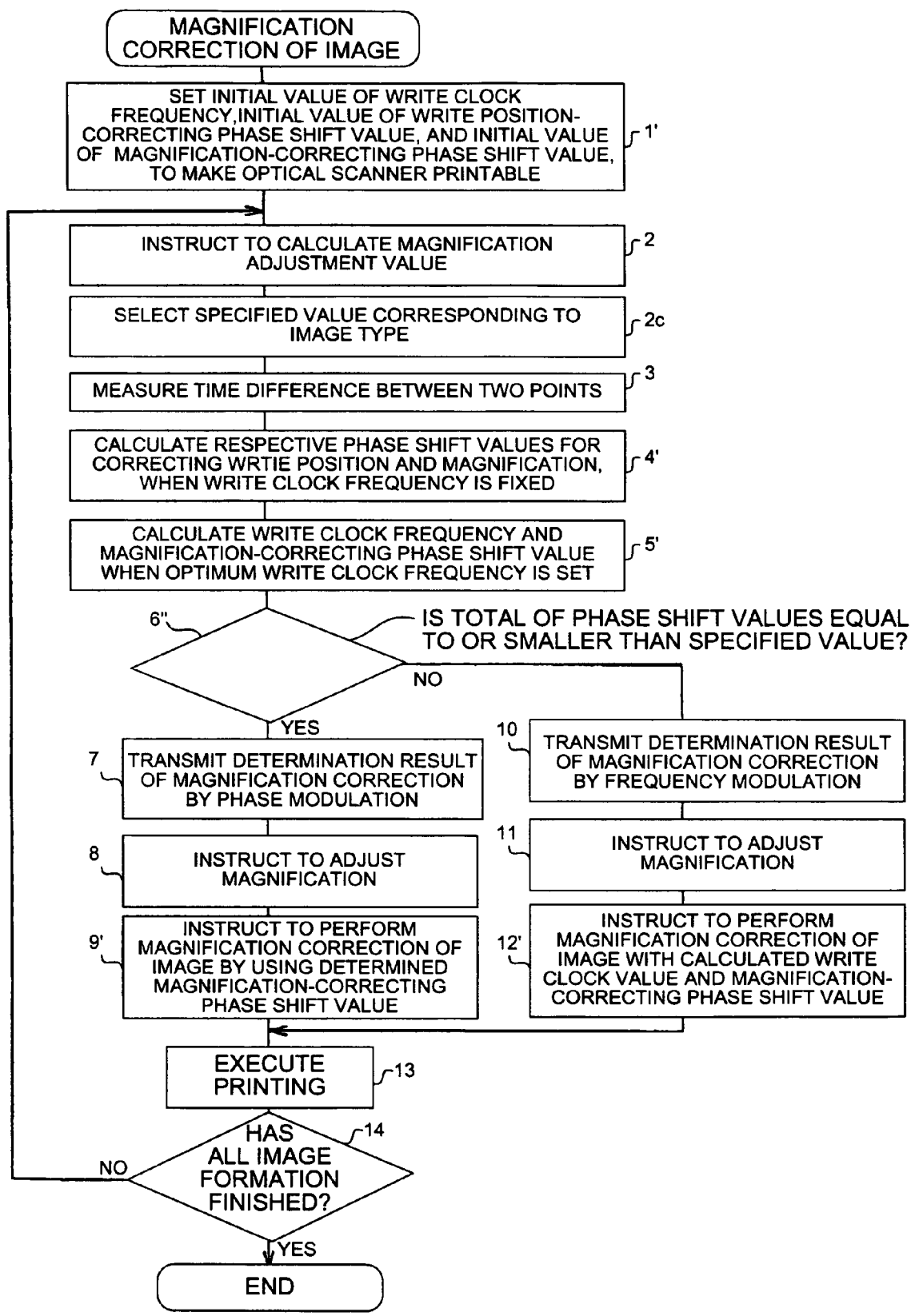
FIG. 29 is a flowchart of a routine for a magnification correction of an image performed by a control system in an image forming apparatus according to a twenty-first embodiment of the present invention.

FIG. 29 is a flowchart of a routine for a magnification correction of an image performed by a control system in an image forming apparatus according to a twenty-first embodiment of the present invention. For the brevity of explanation, like step numbers are used for like steps of performing the same processing and determination as in FIGS. 9 and 23.

The configuration of the image forming apparatus according to the twenty-first embodiment is the same as that shown in FIG. 2. Moreover, the control system of the image forming apparatus is the same as that of the twentieth embodiment explained with reference to FIG. 27, and only the content of the control performed by the control system is different. Therefore, illustration of the control system is omitted, and it will be explained by using reference signs in FIG. 21 according to need.

The phase modulator in the image forming apparatus according to the twenty-first embodiment can correct the write start position in the horizontal scanning direction by a write position-correcting phase shift value (write start position-correcting phase adjustment amount), and the magnification in the horizontal scanning direction by a magnification-correcting phase shift value (magnification-correcting phase adjustment amount in the horizontal scanning direction), respectively.

In the twenty-first embodiment, the phase adjustment amount-determining unit (corresponding to the magnification correction controller 61' in FIG. 27) determines the magnitude correlation between a phase shift value (phase adjustment amount) obtained by adding the write position-correcting phase shift value and the magnification-correcting phase shift value (similar to those explained in the twentieth embodiment), and the set specified value. The phase adjustment amount-determining unit performs magnification correction of an image in the horizontal scanning direction by phase modulation in which the write clock frequency is fixed, until the phase adjustment amount exceeds the specified value, and performs magnification correction of the image in the horizontal scanning direction by frequency modulation, in which the write clock frequency is changed to an optimum value, after the phase adjustment amount exceeds the specified value, according to the determination result.

The image forming apparatus starts the routine for a magnification correction of an image shown in FIG. 29 at a predetermined timing.

The image forming apparatus then performs the same processing as explained with reference to FIG. 9 at steps S1' and S2.

At next step S2c, a specified value corresponding to the image type is selected, as explained with reference to FIG. 23. Accordingly, a specified value corresponding to any one of text, photograph, and text and photograph is selected from the lookup table in Table 9.

At step S3 and following steps, the same processing and determination as those at step S3 and following steps in FIG. 9 are performed. That is, in the twenty-first embodiment, as in the sixth embodiment explained with reference to FIG. 9, only when the phase shift value obtained by adding up the write position-correcting phase shift value and the magnification-correcting phase shift value when the write clock frequency is fixed is larger than the specified value (Table 9) selected corresponding to the image type, changeover from magnification correction of an image by phase modulation (with frequency fixed) to magnification correction of the image by frequency modulation is performed.

TABLE 9

| Image type | Content | Reference value |
|---|---|---|
| a | Text | I |
| b | Photograph | II |
| c | Text and photograph | III |

Therefore, as compared with the twentieth embodiment explained with reference to FIGS. 27 and 28, the phase adjustment amount (phase shift amount) can be accurately determined. Accordingly, changeover to the magnification correction of the image by frequency modulation can be performed highly accurately, and hence, image degradation can be accurately prevented, and changeover timing to the magnification correction of the image by frequency modulation can be delayed until at the very limit at which image degradation is not acceptable anymore. Accordingly, the gross printing speed (the productivity in image formation), as the whole image forming apparatus, can be improved.

Figure 30:
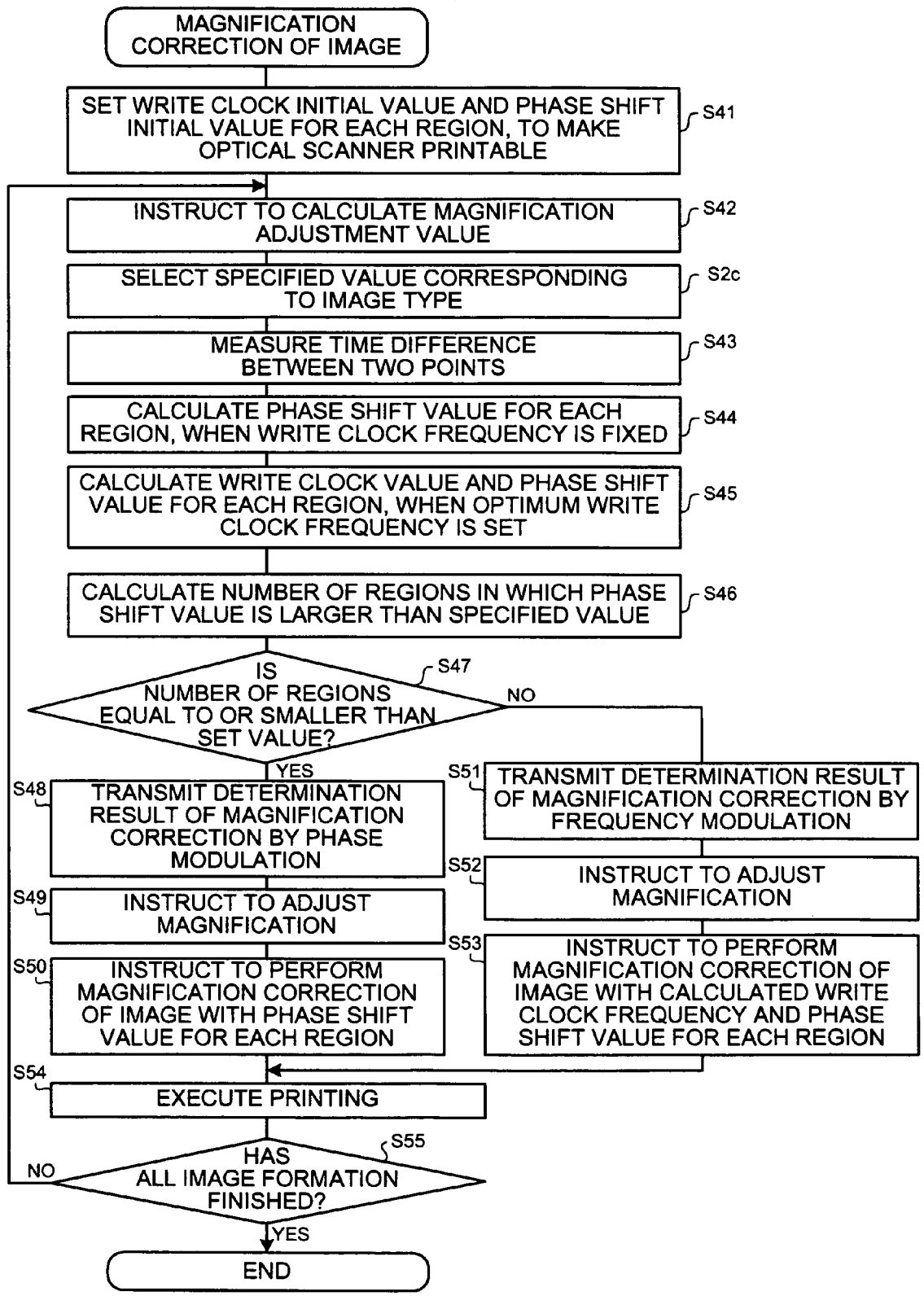
FIG. 30 is a flowchart of a routine for a magnification correction of an image performed by a control system in an image forming apparatus according to a twenty-second embodiment of the present invention.

FIG. 30 is a flowchart of a routine for a magnification correction of an image performed by a control system in an image forming apparatus according to a twenty-second embodiment of the present invention. In FIG. 30, like step numbers are used for like steps of performing the same processing and determination as in FIG. 11, for simplifying the explanation.

The configuration of the image forming apparatus according to the twenty-second embodiment is the same as that shown in FIG. 2. Moreover, the control system is the same as that of the seventeenth embodiment explained with reference to FIG. 21 (or can have the configuration shown in FIG. 25), and only the content of the control performed by the control system is different. Therefore, illustration of the control system is omitted.

The image forming apparatus according to the twenty-second embodiment is different from the image forming apparatus according to the seventeenth embodiment shown in FIG. 11 in that the specified value-changing unit that changes the specified value according to the image type is provided. The controller having the same configuration as that of the controller 150 in FIG. 21 functions as the specified value-changing unit, but only the content of the control performed by the controller is different, and hence, the illustration thereof is omitted.

The control system in the image forming apparatus starts the routine for a magnification correction of an image shown in FIG. 30 at a predetermined timing.

The control system then performs the same processing as explained with reference to FIG. 11 at steps S41 and S42, and at next step S2c, text, photograph, and text and photograph are made to correspond to image types a to c, respectively, as shown in Table 9, as in the processing explained with reference to FIG. 23. The specified value corresponding to the selected image type is selected from the lookup table.

TABLE 10

| Region | Specified value | | | Phase shift |
| | i | ii | iii | |
|---|---|---|---|---|
| 1 | a I | b I | c I | I |
| 2 | a II | b II | c II | II |
| 3 | a III | b III | c III | III |
| 4 | a IV | b IV | c IV | IV |
| 5 | a V | b V | c V | V |
| 6 | a VI | b VI | c VI | VI |
| 7 | a VII | b VII | c VII | VII |
| 8 | a VIII | b VIII | c VIII | VIII |
| 9 | a IX | b IX | c IX | IX |
| 10 | a X | b X | c X | X |

At step S3 and following steps, the same processing and determination as those at step S43 and following steps in FIG. 11 are performed.

According to the image forming apparatus according to the twenty-second embodiment, as in the seventh embodiment explained with reference to FIG. 11, the phase shift value is compared with the specified value selected from Table 10 for each region, and when the number of regions in which the phase shift value is larger than the specified value is equal to or smaller than the preset value, magnification correction of an image is executed by phase modulation that can perform magnification correction of the image without expanding the interval between sheets even during continuous printing.

When the number of regions exceeds the preset value, magnification correction of the image is executed by frequency modulation, in which magnification correction of the image is performed by changing the write clock frequency (frequency of an image signal) in the unit of a line or in the unit of a plurality of lines.

According to the twenty-second embodiment, the phase shift value in the horizontal scanning predetermined region is compared with the specified value selected according to the image type, to control the changeover timing to the magnification correction of an image by the frequency modulation. Since the predetermined region in the horizontal scanning direction can be selected, even when the phase shift value in an unselected region other than the predetermined region in the horizontal scanning direction increases, it is not necessary to change over to the magnification correction of an image by frequency modulation. Accordingly, the timing to perform the frequency modulation can be delayed, and hence, the printing speed (the number of image formation per unit time) can be improved.

The predetermined region in the horizontal scanning direction can be positioned in the horizontal scanning image area as 2 to 9 regions shown in FIG. 10B.

The phase shift amount (phase adjustment amount) in the image area can be monitored, thereby preventing image degradation in the image area.

As shown in Table 11, a plurality of regions can be unified, and one specified value can be made to correspond thereto.

Figure 31:
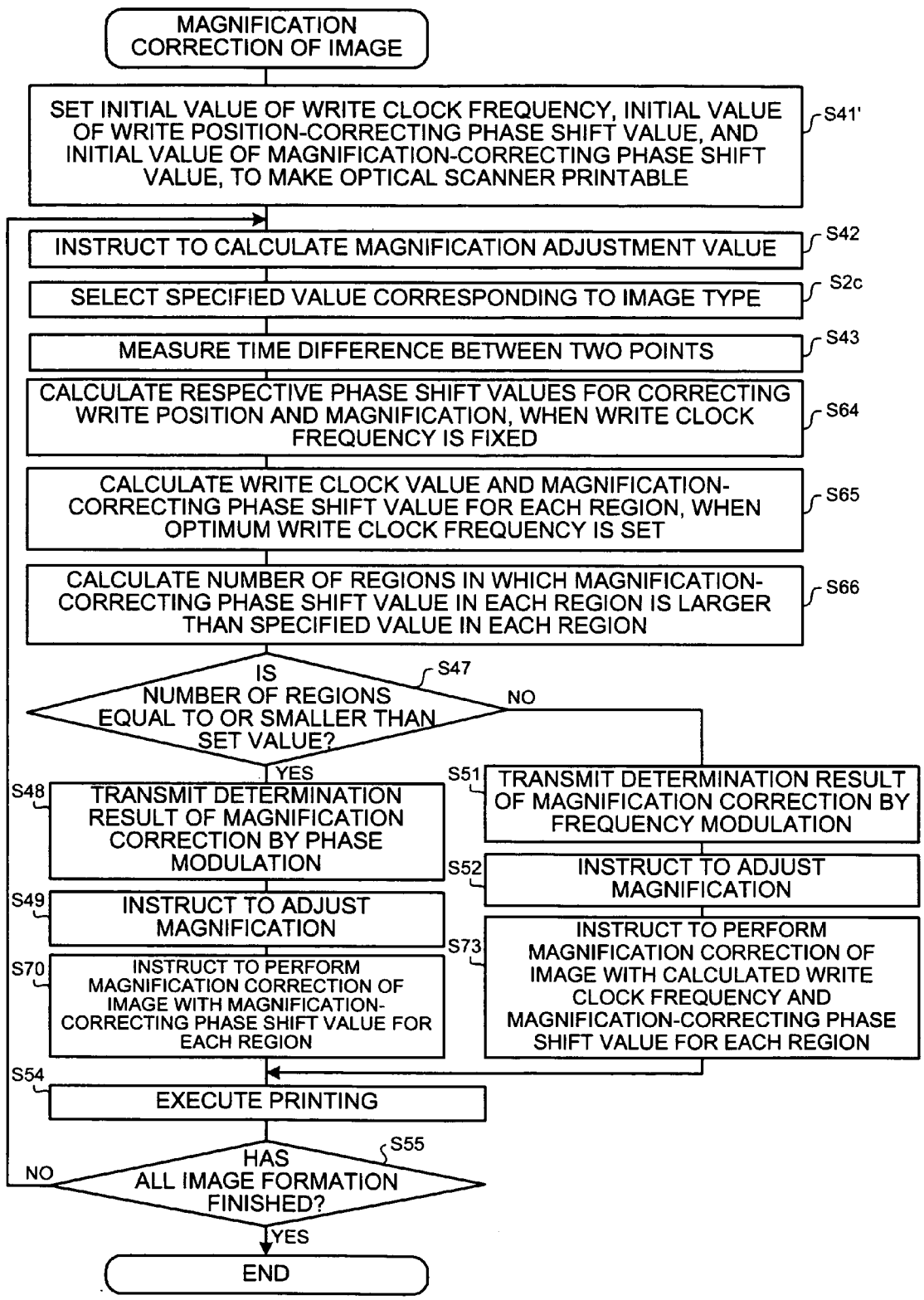
FIG. 31 is a flowchart of a routine for a magnification correction of an image performed by a control system in an image forming apparatus according to a twenty-third embodiment of the present invention.

FIG. 31 is a flowchart of a routine for a magnification correction of an image performed by a control system in an image forming apparatus according to a twenty-third embodiment of the present invention. In FIG. 31, like step numbers are used for like steps of performing the same processing and determination as in FIG. 12, for simplifying the explanation.

The configuration of the image forming apparatus according to the twenty-third embodiment is the same as that shown in FIG. 2. Moreover, the control system of the image forming apparatus is the same as that of the seventeenth embodiment explained with reference to FIG. 21 (or can have the configuration shown in FIG. 25), and only the content of the control performed by the control system is different. Therefore, illustration of the control system is omitted.

The image forming apparatus according to the twenty-third embodiment is different from the image forming apparatus according to the eighth embodiment shown in FIG. 12 in that a specified value-changing unit that changes the specified value according to the image type is provided. The controller having the same configuration as that of the controller 150 in FIG. 21 functions as the specified value-changing unit, but only the content of the control performed by the controller is different, the illustration thereof is omitted.

The control system in the image forming apparatus starts the routine for a magnification correction of an image shown in FIG. 31 at a predetermined timing.

The control system performs the same processing as explained with reference to FIG. 12 at steps S41' and S42, and at next step S2c, as shown in Table 12, a corresponding specified value is selected from respective specified values set corresponding to the image types a to c (see Table 9). Accordingly, a specified value corresponding to any one of text, photograph, and text and photograph is selected for each region.

TABLE 11

| Area | Specified value | | | Phase shift |
|---|---|---|---|---|
| | i | ii | iii | |
| 1 | i I | ii I | iii I | I |
| 2 | i II | ii II | iii II | II |
| 3 | | | | |
| 4 | | | | |
| 5 | i III | ii III | e iii III | III |
| 6 | | | | |
| 7 | i IV | ii IV | iii IV | IV |
| 8 | | | | |
| 9 | | | | |
| 10 | i V | ii V | iii V | V |

TABLE 12

| | Specified value | | | Phase shift value | |
|---|---|---|---|---|---|
| | | | | Write position-correcting | Magnification-correcting |
| Area | i | ii | iii | phase shift value | phase shift value |
| 1 | a I | b I | c I | I | I |
| 2 | a II | b II | c II | II | II |
| 3 | a III | b III | c III | III | III |

TABLE 12-continued

| | Specified value | | | Phase shift value | |
|---|---|---|---|---|---|
| | | | | Write position-correcting | Magnification-correcting |
| Area | i | ii | iii | phase shift value | phase shift value |
| 4 | a IV | b IV | c IV | IV | IV |
| 5 | a V | b V | c V | V | V |
| 6 | a VI | b VI | c VI | VI | VI |
| 7 | a VII | b VII | c VII | VII | VII |
| 8 | a VIII | b VIII | c VIII | VIII | VIII |
| 9 | a IX | b IX | c IX | IX | IX |
| 10 | a X | b X | c X | X | X |

At step S3 and following steps, the same processing and determination as those at step S43 and following steps in FIG. 12 are performed. Accordingly, the magnification-correcting phase shift value (a value calculated by fixing the write clock frequency) in the set predetermined region in the horizontal scanning direction (a region selected from 1 to 10 regions shown in Table 12) is compared with the specified value selected corresponding to the image type, to calculate the number of regions in which the magnification-correcting phase shift value in each area is larger than the specified value in each area.

When the calculated number of regions is equal to or smaller than the preset value, magnification correction of an image is executed by phase modulation that can perform magnification correction of the image without expanding the interval between sheets even during continuous printing. When the number of regions exceeds the preset value, magnification correction of the image is executed by frequency modulation, in which magnification correction of the image is performed by changing the write clock frequency (frequency of an image signal) in the unit of a line or in the unit of a plurality of lines.

According to the twenty-third embodiment, the phase shift amount (phase adjustment amount) in the horizontal scanning predetermined region becomes the phase shift amount in the region in which prevention of image degradation is desired. Accordingly, the phase shift amount in the region in which prevention of image degradation is desired can be determined.

Figure 32:
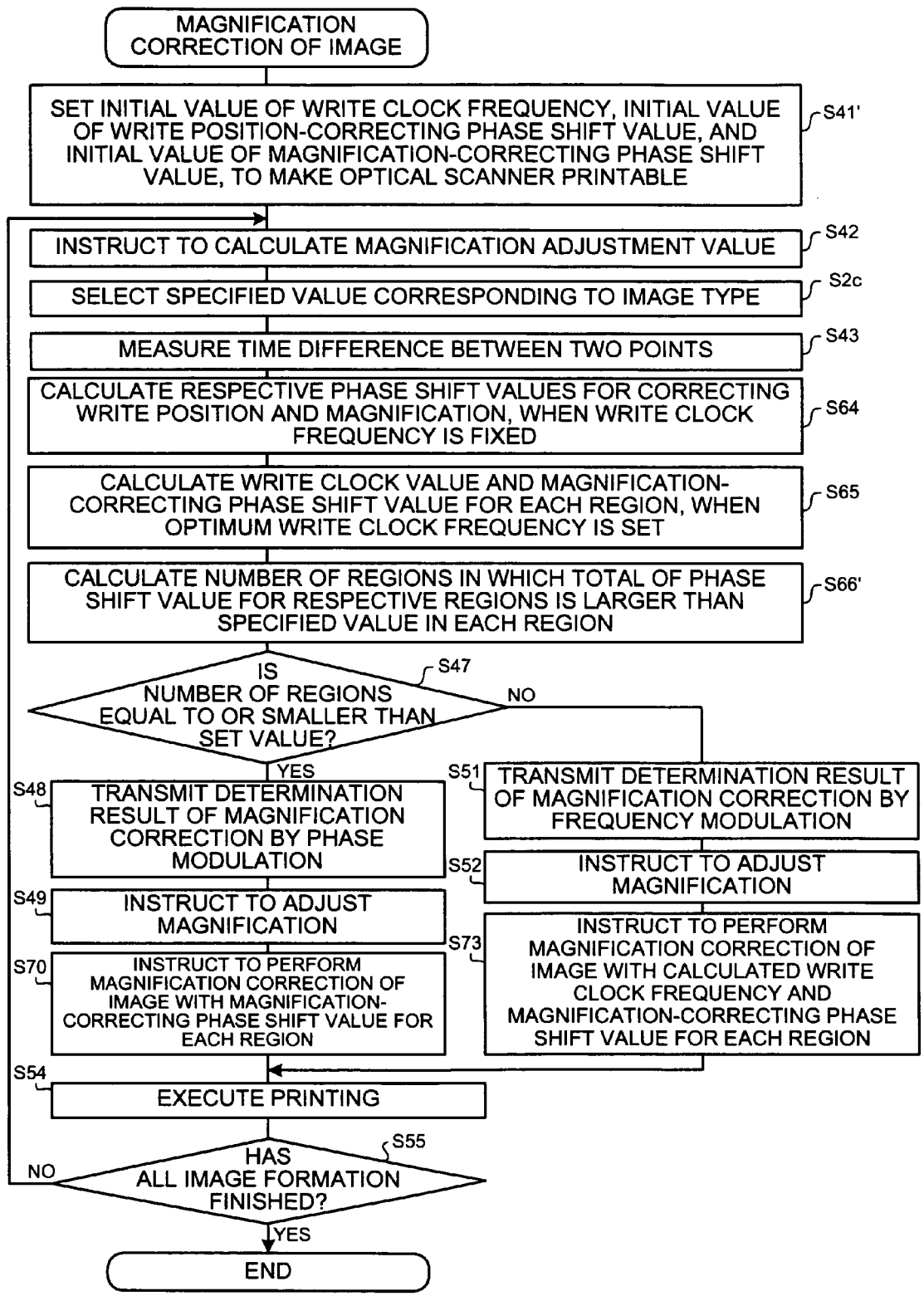
FIG. 32 is a flowchart of a routine for a magnification correction of an image performed by a control system in an image forming apparatus according to a twenty-fourth embodiment of the present invention.

FIG. 32 is a flowchart of a routine for a magnification correction of an image performed by a control system in an image forming apparatus according to a twenty-fourth embodiment of the present invention. In FIG. 32, like step numbers are used for like steps of performing the same processing and determination as in FIG. 13, for simplifying the explanation.

The configuration of the image forming apparatus according to the twenty-fourth embodiment is the same as that shown in FIG. 2. Moreover, the control system is the same as that of the seventeenth embodiment or the nineteenth embodiment, and only the content of the control performed by the control system is different.

The image forming apparatus according to the twenty-fourth embodiment is different from the image forming apparatus according to the ninth embodiment shown in FIG. 13 in that a specified value-changing unit that changes the specified value according to the image type is provided. The controller having the same configuration as that of the controller 150 in FIG. 21 functions as the specified value-changing unit, but only the content of the control performed by the controller is different, and hence, the illustration thereof is omitted.

The control system in the image forming apparatus starts the routine for a magnification correction of an image shown in FIG. 32 at a predetermined timing.

The control system then performs the same processing as explained with reference to FIG. 13 at steps S41' and S42, and at next step S2c, as shown in the lookup table shown in Table 12, a corresponding specified value is selected from respective specified values set corresponding to the image types. Accordingly, a specified value corresponding to any one of text, photograph, and text and photograph is selected for each region.

At step S3 and following steps, the same processing and determination as those at step S43 and following steps in FIG. 13 are performed.

Accordingly, a phase shift value obtained by adding up the write position-correcting phase shift value and the magnification-correcting phase shift value (a value calculated by fixing the write clock frequency) calculated for each region shown in Table 12 is compared with the corresponding specified value for each region (a specified value selected according to the image type), to calculate the number of regions in which the total of the phase shift values in each area is larger than the specified value in each area.

When the calculated number of regions is equal to or smaller than the preset value, magnification correction of an image is executed by phase modulation that can perform magnification correction of the image without expanding the interval between sheets even during continuous printing. When the number of regions exceeds the preset value, magnification correction of the image is executed by frequency modulation, in which magnification correction of the image is performed by changing the write clock frequency (frequency of an image signal) in the unit of a line or in the unit of a plurality of lines.

According to the twenty-fourth embodiment, the determination whether to change over from the magnification correction of an image by phase modulation to the magnification correction of the image by frequency modulation is performed by comparing the phase shift value obtained by adding up the write position-correcting phase shift value and the magnification-correcting phase shift value with the specified value selected according to the image type. Accordingly, image degradation can be prevented more reliably.

Further, since the changeover from the magnification correction of the image by phase modulation to the magnification correction of the image by frequency modulation can be performed at optimum timing, the changeover timing to the magnification correction of the image by frequency modulation can be delayed until at the very limit at which image degradation is not acceptable anymore. Accordingly, the printing speed (the number of image formation per unit time) can be improved.

A plurality of areas divided as shown in Table 11 can be unified, specified values and phase shift values corresponding thereto can be set, and the specified values and phase shift values can be compared with each other.

Figure 33:
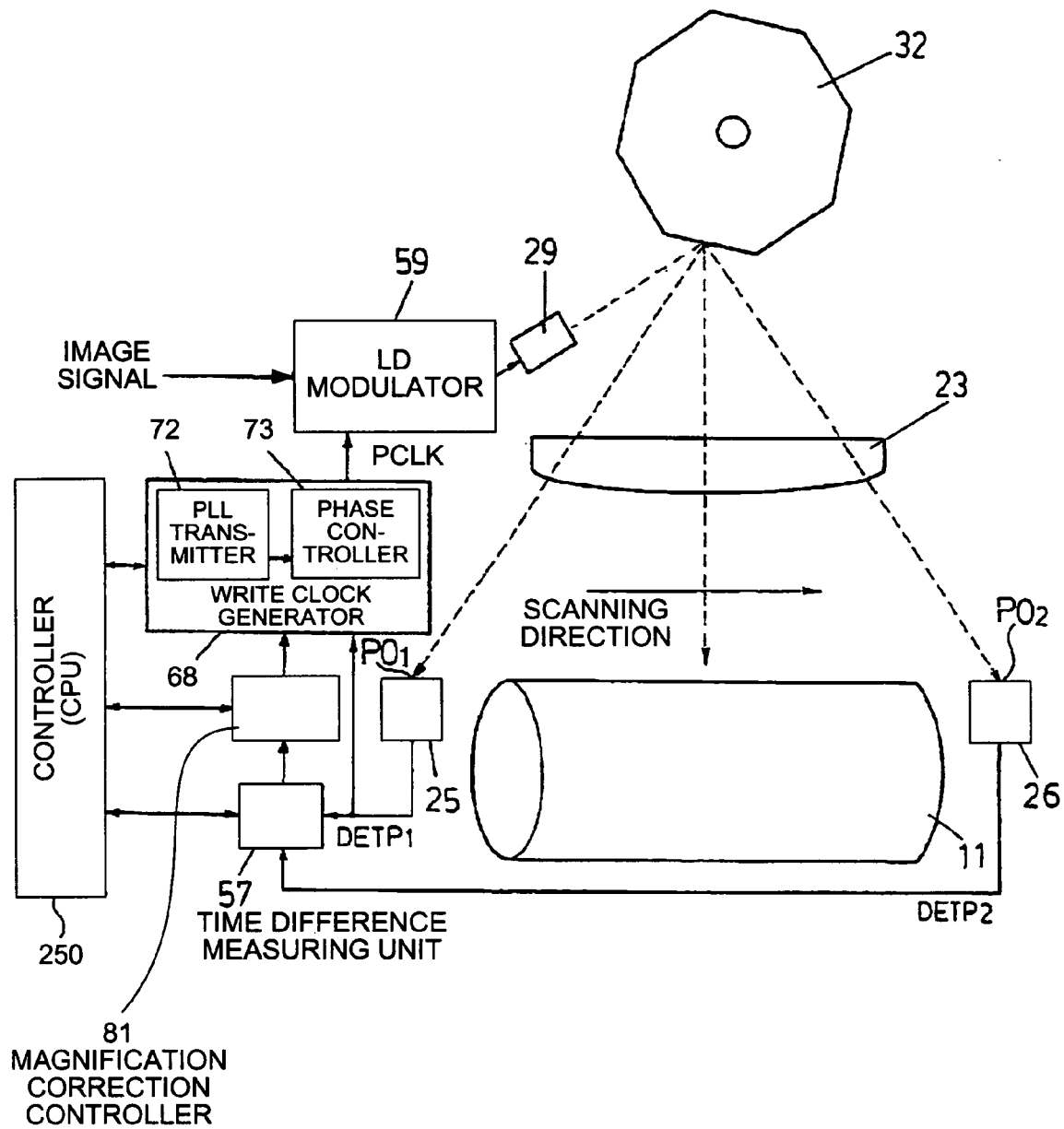
FIG. 33 is a schematic block diagram of relevant parts of an optical scanner and a photoconductor together with an associated control system of an image forming apparatus according to a twenty-fifth embodiment.

FIG. 33 is a schematic block diagram of relevant parts of an optical scanner and a photoconductor together with an associated control system of an image forming apparatus according to a twenty-fifth embodiment. The configuration of the image forming apparatus is the same as that shown in FIG. 2.

The optical scanner in the laser printer, being the image forming apparatus according to the twenty-fifth embodiment, includes the polygon mirror 32, being a deflection unit that deflects to scan optical beams modulated corresponding to an image signal in the horizontal scanning direction to form an image on the photoconductor 11, being an image carrier; sensors 25 and 26, being two optical beam detectors that respectively detect optical beams deflected by the polygon mirror 32 at two positions $PO_1$ and $PO_2$ on a horizontal scanning line; the time difference measuring unit 57 that measures the time difference since one sensor 25, of two sensors 25 and 26, has detected the optical beam until the other sensor 26 detects the optical beam; the magnification correction controller 81 that functions as a magnification correction unit that corrects the magnification of an image in the horizontal scanning direction on the photoconductor 11 corresponding to the time difference measured by the time difference measuring unit 57; and a write clock generator 68.

The write clock generator 68 includes two units, that is, a frequency modulator 72, being a frequency modulator that performs magnification correction of an image in the horizontal scanning direction, by changing the frequency of the image signal in the unit of a line or in the unit of a plurality of lines, and a phase adjusting unit 73 that functions as a phase modulator that performs magnification correction of the image in the horizontal scanning direction by fixing the frequency and changing the cycle time of an optional pixel in the unit of pixel. Event in twenty-fifth embodiment the magnification correction controller 81 functions as the frequency modulator and the phase modulator.

The magnification correction controller 81 also functions a frequency adjustment amount converter that converts a phase adjustment amount set by the phase modulator to a frequency adjustment amount by the frequency modulator.

The optical scanner of the laser printer emits optical beams (laser beams), as shown in FIG. 33, from the laser diode (LD) 29, being the optical beam generator that lights up according to an image signal. The optical beams are turned into parallel beams by a collimate lens, passes through a cylindrical lens, is deflected by the polygon mirror 32, passes through the fθ lens 23 and the toroidal lens (hereinafter, "BTL"), and scans the photoconductor 11. The BTL performs focusing mainly in the vertical scanning direction, that is, performs condensing function and position correction (cross-scan error compensation and the like) in the vertical scanning direction.

In FIG. 33, only one of the four photoconductors 11 is shown. The other three photoconductors and corresponding optical scanners have the same configuration, with only the color of an image to be formed being different, and hence the illustration thereof is omitted.

The polygon mirror 32 is rotated by a polygon motor as a driving unit, and the fθ lens mainly performs velocity transformation so that the laser beams scanning at an isometric velocity by the polygon mirror 32 is converted so as to scan on the photoconductor 11 at a constant velocity.

Scanning light by the laser beams reflected by the polygon mirror 32 and transmitted through the fθ lens 23 (shown in FIG. 33 as a representative of a plurality of lenses) is respectively detected with the time difference by the sensors 25 and 26. The sensor 25 also serves as a synchronism detection sensor for detecting a laser beam-scanning synchronization signal, which becomes a synchronism detection signal.

When the sensors 25 and 26 respectively detect the scanning light, the sensor 25 outputs the laser beam detection signal DETP1, and the sensor 26 outputs the laser beam detection signal DETP2, and the laser beam detection signals DETP1 and DETP2 are transmitted to the time difference measuring unit 57. The time difference measuring unit 57 has a calculation function of measuring the time difference between the time when the laser beam detection signals DETP1 and DETP2 are output, and averaging the time difference, and the time difference measuring unit 57 performs measurement and calculation of the time difference between the laser beam detection signals DETP1 and DETP2, according to the set timing from a controller (CPU) 250, and transmits the measurement result and the calculation result to the magnification correction controller 81.

The magnification correction controller 81 has a storage unit that stores initially set values and current set values of the set write clock frequency and phase shift value (phase adjustment amount) transmitted from the controller 250 having a microcomputer, and has a function of calculating the phase shift value (phase adjustment amount) when an optimum write clock frequency is set, by using the fact that the image magnification in the horizontal scanning direction is changed by the frequency of the write clock and by using the fact that the image magnification is changed by shifting the phase.

The magnification correction controller 81 has a function of calculating the optimum phase shift value (phase adjustment amount) by fixing the write clock frequency, and also has a function of comparing the calculated phase shift value with the specified value set by the controller 250, thereby transmitting a write clock setting signal and a control signal for executing the phase shift to the write clock generator 68 at a predetermined timing, respectively.

The write clock generator 68 includes the frequency modulator 72 that generates a clock n times as large as a write clock VCLK upon reception of a clock from an oscillator (not shown), and the phase adjusting unit 73 that outputs a write clock PCLK upon reception of a signal from the frequency modulator 72, and the write clock generator 58 executes generation of the write clock and phase shift under control of the magnification correction controller 81.

The write clock PCLK subjected to the image magnification correction in the horizontal scanning due to changeability of the write clock frequency and the phase shift value by the write clock generator 68 is transmitted to the LD modulator 59 that functions as an optical beam generator actuator.

The LD modulator 59 controls lighting of the laser diode 29 in the LD unit according to the image signal synchronized with the write clock PCLK from the write clock generator 68. Accordingly, laser beams modulated according to the image signal are emitted from the laser diode 29, and the laser beams are deflected by the rotating polygon mirror 32 to scan the photoconductor 11 via the fθ lens 23 in the direction of the arrow E in FIG. 33.

In FIG. 33, an example in which the write clock generator 68, the time difference measuring unit 57, and the magnification correction controller 81 are formed respectively in separate blocks has been explained, but the configuration can be such that these constitute a write clock generator as a single block.

Figure 34:
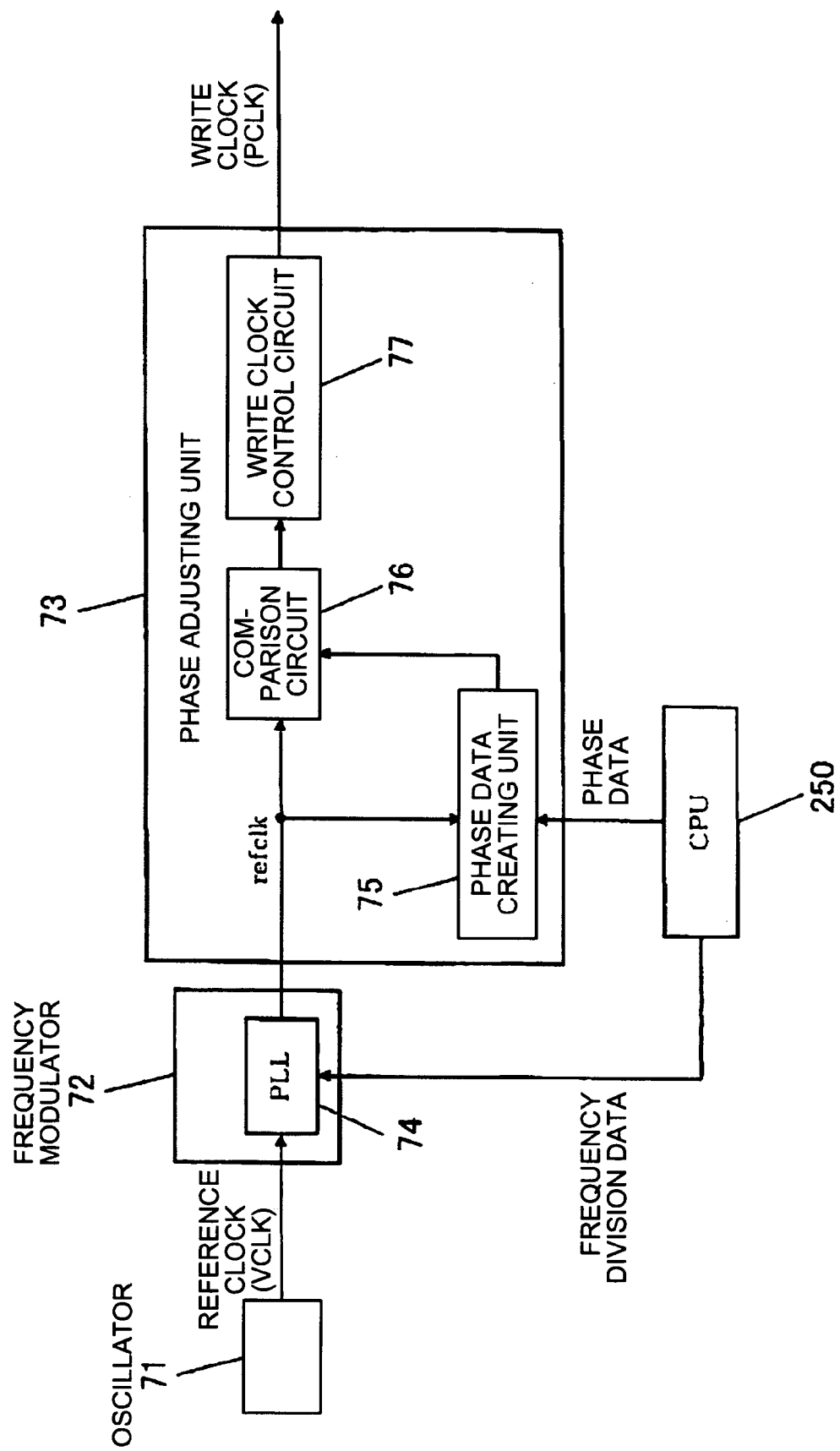
FIG. 34 is a block diagram of a write clock generation circuit of the image forming apparatus according to the twenty-fifth embodiment.

The write clock generation circuit will be explained next with reference to FIG. 34.

The write clock generation circuit (pixel clock generation circuit) includes an oscillator 71, the frequency modulator 72, the phase adjusting unit 73, and the controller (CPU) 250. The frequency modulator 72 includes a PLL 74, and the phase adjusting unit 73 includes a phase data creating unit 75, a comparison circuit 76, and a write clock control circuit 77.

The principle for changing the frequency of the pixel clock based on the phase data for instructing the transition timing of the pixel clock will be explained below.

Figure 35:
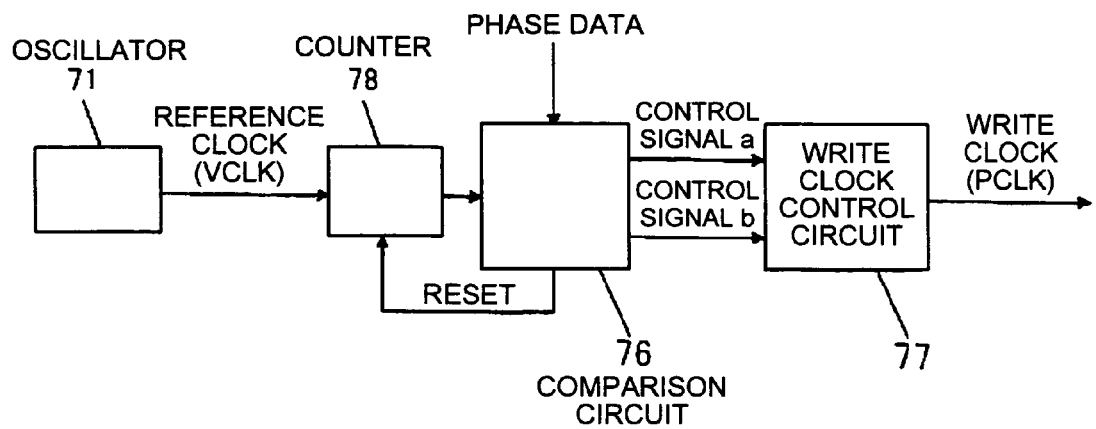
FIG. 35 is a block diagram for explaining the write clock generation circuit according to the twenty-fifth embodiment in more detail.

The write clock generation circuit includes a counter 78 as shown in FIG. 35, and the counter 78 inputs a high frequency VCLK (reference clock) (hereinafter, simply as VCLK) from an oscillator (a high frequency clock generation circuit) that generates the VCLK, which becomes a reference of a pixel clock PCLK (hereinafter, simply as PCLK).

The counter 78 operates at a rise of the VCLK to count the VCLK.

The comparison circuit 76 compares the value of the counter 78 with a preset value and the phase data for indicating the phase adjustment amount as the transition timing of the pixel clock provided from external equipment, and based on the comparison result, outputs a control signal a and a control signal b to the write clock control circuit (pixel clock control circuit) 77. The write clock control circuit 77 controls the transition timing of the pixel clock (write clock) PCLK based on the control signals a and b.

The phase data input by the comparison circuit 76 is data for indicating the phase shift amount of the pixel clock for correcting nonuniform scanning caused by the characteristic of the scanning lens, correcting a dot misregistration due to nonuniform rotation of the polygon mirror, or correcting a dot misregistration due to chromatic aberration of the laser beams, and generally is given in a digital value of several bits.

The operation of the write clock generation circuit explained with reference to FIG. 35 will be explained next, with reference to the timing chart in FIGS. 36 to 39.

The pixel clock PCLK corresponds to eight frequency divisions of the high frequency clock (reference clock) VCLK, and normally has a duty ratio of 50%.

Figure 36:
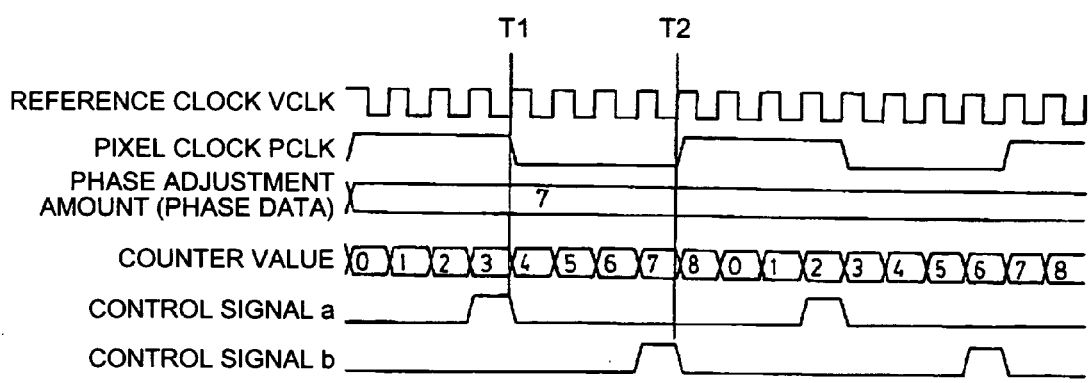
FIG. 36 is a timing chart for explaining the operation of the write clock generation circuit when a digital value "7" is provided as phase data.
Figure 37:
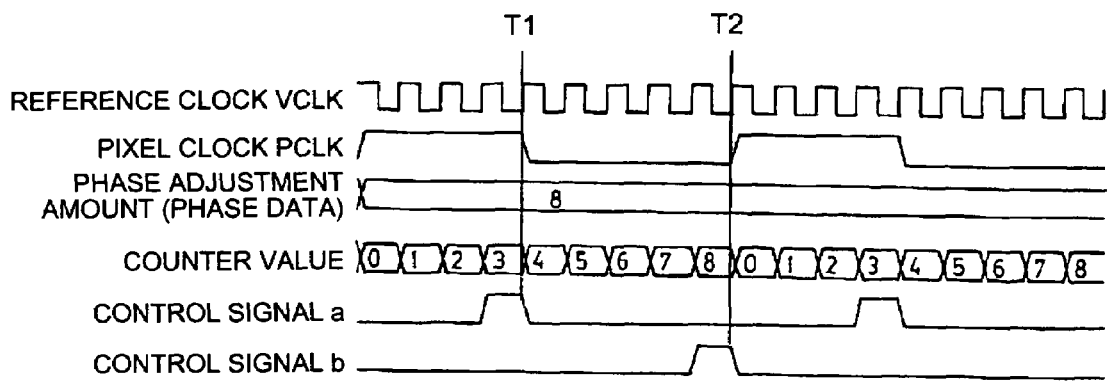
FIG. 37 is a timing chart for explaining the operation of the write clock generation circuit when a digital value "8" is provided as phase data.
Figure 38:
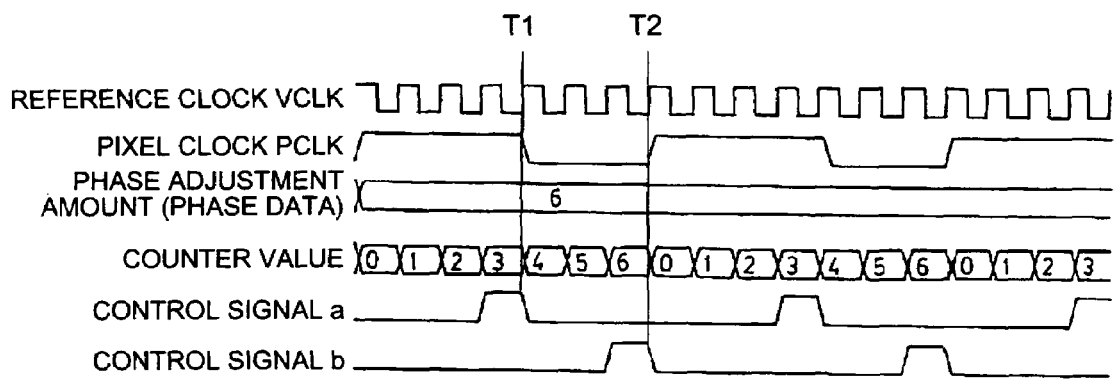
FIG. 38 is a timing chart for explaining the operation of the write clock generation circuit when a digital value "6" is provided as phase data.

FIG. 36 is a timing chart of the situation of generating a standard pixel clock PCLK having the duty ratio of 50%, corresponding to the eight frequency divisions of the VCLK. FIG. 37 is a timing chart of the situation of generating a PCLK, whose phase is advanced by ⅛ clock with respect to the eight frequency-divided clock of the VCLK. FIG. 38 is a timing chart of the situation of generating a PCLK, whose phase is delayed by ⅛ clock with respect to the eight frequency-divided clock of the VCLK.

FIG. 36 is an example in which a digital value "7" is provided as the phase data, and "3" is preset in the comparison circuit 76. The counter 78 operates at a rise of the VCLK to start counting. When the value of the counter 78 becomes "3", the comparison circuit 76 outputs a control signal a to the write clock control circuit 77.

Since the control signal a becomes "H", the write clock control circuit 77 makes the pixel clock PCLK shift from "H" to "L" at the clock timing T1 in FIG. 36. The comparison circuit 76 then compares the provided phase data with the counter value, and when these agree with each other, outputs a control signal b to the write clock control circuit 77. That is, in the example shown in FIG. 36, when the value of the counter 78 becomes "7", the comparison circuit 76 outputs the control signal b to the write clock control circuit 77.

Since the control signal b becomes "H", the write clock control circuit 77 makes the pixel clock PCLK shift from "L" to "H" at the clock timing T2 in FIG. 36. At this time, the comparison circuit 76 resets the counter, to count from 0 again. Accordingly, as shown in FIG. 36, a pixel clock PCLK having the duty ratio of 50%, corresponding to the eight frequency divisions of the VCLK, can be generated. If the set value in the comparison circuit 76 is changed, the duty ratio changes.

FIG. 37 is an example in which a digital value "8" is provided as the phase data. The counter 78 counts the VCLK. When the value of the counter 78 becomes "3", the comparison circuit 76 outputs the control signal a to the write clock control circuit 77. Since the control signal a becomes "H", the write clock control circuit 77 makes the PCLK shift from "H" to "L" at the clock timing T1 in FIG. 37.

When the value of the counter 78 agrees with the provided phase data (here, 8), the comparison circuit 76 outputs the control signal b to the write clock control circuit 77. Since the control signal b becomes "H", the write clock control circuit 77 makes the pixel clock PCLK shift from "L" to "H" at the clock timing T2 in FIG. 37.

At this time, the comparison circuit 76 resets the counter, to count from 0 again. Accordingly, as shown in FIG. 37, a pixel clock PCLK whose phase is advanced by ⅛ clock with respect to the eight frequency-divided clocks of the high frequency clock VCLK can be generated.

FIG. 38 is an example in which a digital value "6" is provided as the phase data. The counter 78 counts the VCLK. When the value of the counter 78 becomes "3", the comparison circuit 76 outputs the control signal a to the write clock control circuit 77. Since the control signal a becomes "H", the write clock control circuit 77 makes the PCLK shift from "H" to "L" at the clock timing T1 shown in FIG. 38.

When the value of the counter 78 agrees with the provided phase data (6), the comparison circuit 76 outputs the control signal b to the write clock control circuit 77. Since the control signal b becomes "H", the write clock control circuit 77 makes the PCLK shift from "L" to "H" at the clock timing T2 in FIG. 38.

At this time, the comparison circuit 76 resets the counter, to count from 0 again. Accordingly, as shown in FIG. 38, a pixel clock PCLK whose phase is delayed by ⅛ clock with respect to the eight frequency-divided clocks of the high frequency clock VCLK can be generated.

Figure 39:
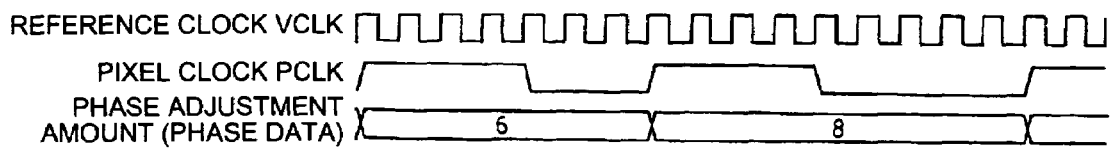
FIG. 39 is a timing chart of a situation in which the phase data is synchronized with a rise pf a pixel clock PCLK to change the phase of the pixel clock PCLK for each clock.

By providing the phase data, for example, synchronized with a rise of the pixel clock PCLK, the phase of the pixel clock PCLK can be changed for every one clock. FIG. 39 is a timing chart of this.

When forming an image, the laser printer uses a polygon scanner to form the image for each line. Further, counting is started by a counter (different from the counter 78) since when light enters into the sensor at the forefront, and the laser printer adjusts the horizontal scanning magnification so that the same counting number is obtained in the image forming area, that is, adjusts the horizontal scanning magnification by using the frequency modulator 72 shown in FIG. 33. Further, the laser printer adjusts the horizontal scanning magnification completely or partially by using the phase adjusting unit 73.

When the phase adjusting unit (phase modulator) 73 has the configuration as explained with reference to FIG. 35, to generate a pixel clock as explained with reference to FIGS. 36 to 39, one clock of the pixel (write) clock corresponds to phase adjustment amounts for about 8 times, and satisfies the following relation:

1 pixel (write clock)/8×phase adjustment amount.

Generally, it is the PLL that is often used for the frequency adjusting unit, and the frequency modulator 72 in the embodiment shown in FIG. 33 uses the PLL. In setting the PLL, the intended magnification is often shown in a lookup table. And, in the lookup table are often assembled 200 to 500 tables for 0.5 to 1.0 pixel unit, in a range of 1 to 2% of the image width of the target (central) magnification adjustment amount.

For example, when tables in the unit of one pixel are assembled, and when there is phase adjustment in the unit of 80 on the side extending the magnification, 80/8=10 in order to make the phase adjustment amount zero, and hence, the frequency needs to be adjusted in a direction of reducing the horizontal scanning magnification for 10 pixels.

That is, it is only necessary to change the set value of the table to a position shifted by 10 in a desired direction. This means that the phase adjustment amount set by the phase modulator is converted to the frequency adjustment amount by the frequency modulator, and this processing is performed by the magnification correction controller 81 shown in FIG. 33. Therefore, in the twenty-fifth embodiment, the magnification correction controller 81 functions as a frequency adjustment amount converter that converts the phase adjustment amount set by the phase modulator to the frequency adjustment amount by the frequency modulator.

In order to convert the phase adjustment amount to the frequency adjustment amount, division can be used, or subtraction can be used.

In the twenty-fifth embodiment, horizontal scanning control by two-point synchronous control has been explained, but it is not limited to the two-point synchronous control, so long as the horizontal scanning magnification can be corrected.

According to the twenty-fifth embodiment, in the case of the normal magnification correction by frequency modulation, since magnification correction cannot be performed at the timing during image formation, it is necessary to perform magnification correction at a convenient timing by suspending continuous printing, and hence, the printing speed decreases. However, since the phase adjustment amount set by the phase adjusting unit (phase modulator) 73 is directly converted to the frequency adjustment amount by the frequency modulator 72, the magnification correction of an image can be corrected and controlled only based on calculation (no measurement) without suspending the continuous printing. Therefore, a decrease in the printing speed as the image forming apparatus can be prevented. Further, the frequency of performing the frequency correction of the image signal can be reduced.

Figure 40:
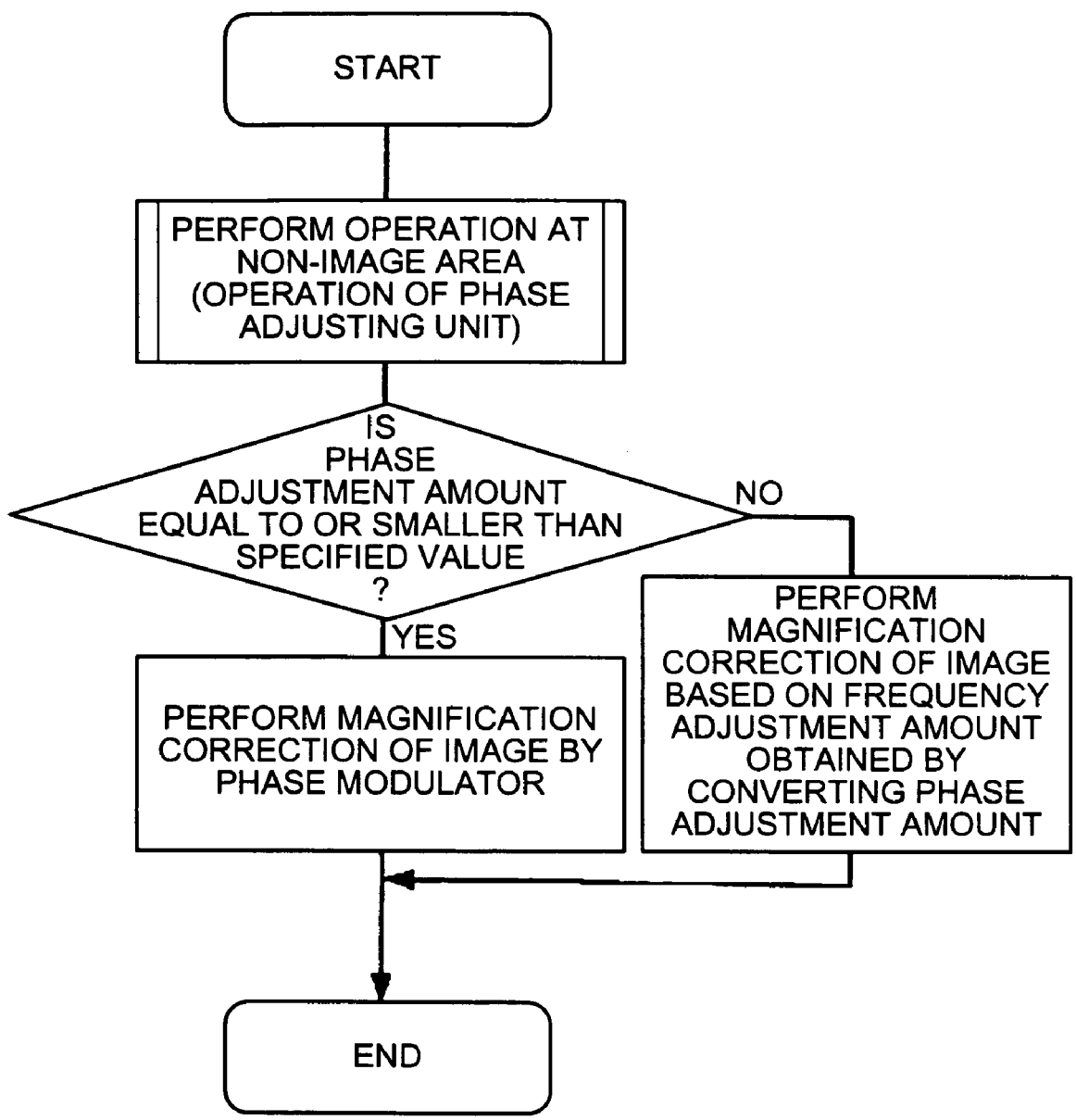
FIG. 40 is a flowchart relating to the magnification correction of an image performed by a control system in an image forming apparatus according to a twenty-sixth embodiment of the present invention.

FIG. 40 is a flowchart relating to a magnification correction of an image performed by a control system in an image forming apparatus according to a twenty-sixth embodiment of the present invention. In the twenty-sixth embodiment, a part of the content of the control performed by the control system is different from that of the laser printer explained with reference to FIG. 33, and hence, illustration of the configuration and explanation of each part will be omitted, and as required, the reference signs used in FIG. 33 will be used for explanation.

The laser printer, being the image forming apparatus explained in the twenty-sixth embodiment, is provided with a phase adjustment amount-determining unit (the magnification correction controller 81 shown in FIG. 33 functions as the phase adjustment amount-determining unit) that determines the magnitude correlation between the phase adjustment amount set (calculated) by the phase modulator and the preset specified value. When the phase adjustment amount-determining unit determines that the phase adjustment amount does not exceed the specified value (equal to or smaller than the specified value), the phase modulator performs magnification correction of an image, and when it is determined that the phase adjustment amount exceeds the specified value, the phase adjustment amount set by the phase modulator is converted to a frequency adjustment amount by the frequency adjustment amount converter to perform magnification correction of the image based on the frequency adjustment amount.

In the twenty-sixth embodiment, as in the twenty-fifth embodiment shown in FIG. 33, the phase adjusting unit 73 and the magnification correction controller 81 serve as the phase modulator, and the magnification correction controller 81 also serves as the frequency adjustment amount converter.

The magnification correction of an image is performed by a microcomputer in the controller of the laser printer. The microcomputer starts the routine shown in FIG. 40 at a predetermined timing.

At the first step, the routine for the operation of the phase modulator is performed at the timing of a non-image portion, to calculate the phase adjustment amount (phase adjustment value). At the next step, it is determined whether the calculated phase adjustment amount is equal to or smaller than the preset specified value, thereby determining the magnitude correlation between the calculated phase adjustment amount and the specified value.

Based on the determination, when the calculated phase adjustment amount is equal to or smaller than the specified value, magnification correction of an image is performed by the phase modulator. When the calculated phase adjustment amount exceeds the specified value, the phase adjustment amount set by the phase modulator is converted to a frequency adjustment amount by the frequency adjustment amount converter to perform magnification correction of the image based on the frequency adjustment amount.

Thus, in the twenty-sixth embodiment, the phase adjustment amount set by the phase adjusting unit is directly converted to the frequency adjustment amount by the frequency modulator, to perform the magnification correction of an image only based on calculation without performing measurement. The control thereof is basically performed in a non-image portion, that is, during the timing between prints.

The timing between prints has recently been controlled in various manners, and it is advantageous as the system that the number of controls is as small as possible.

According to the twenty-sixth embodiment, until the calculated phase adjustment amount exceeds the specified value, conversion from the phase adjustment amount to the frequency adjustment amount is not carried out. Accordingly, the number of conversion from the phase adjustment amount to the frequency adjustment amount can be reduced.

Figure 41:
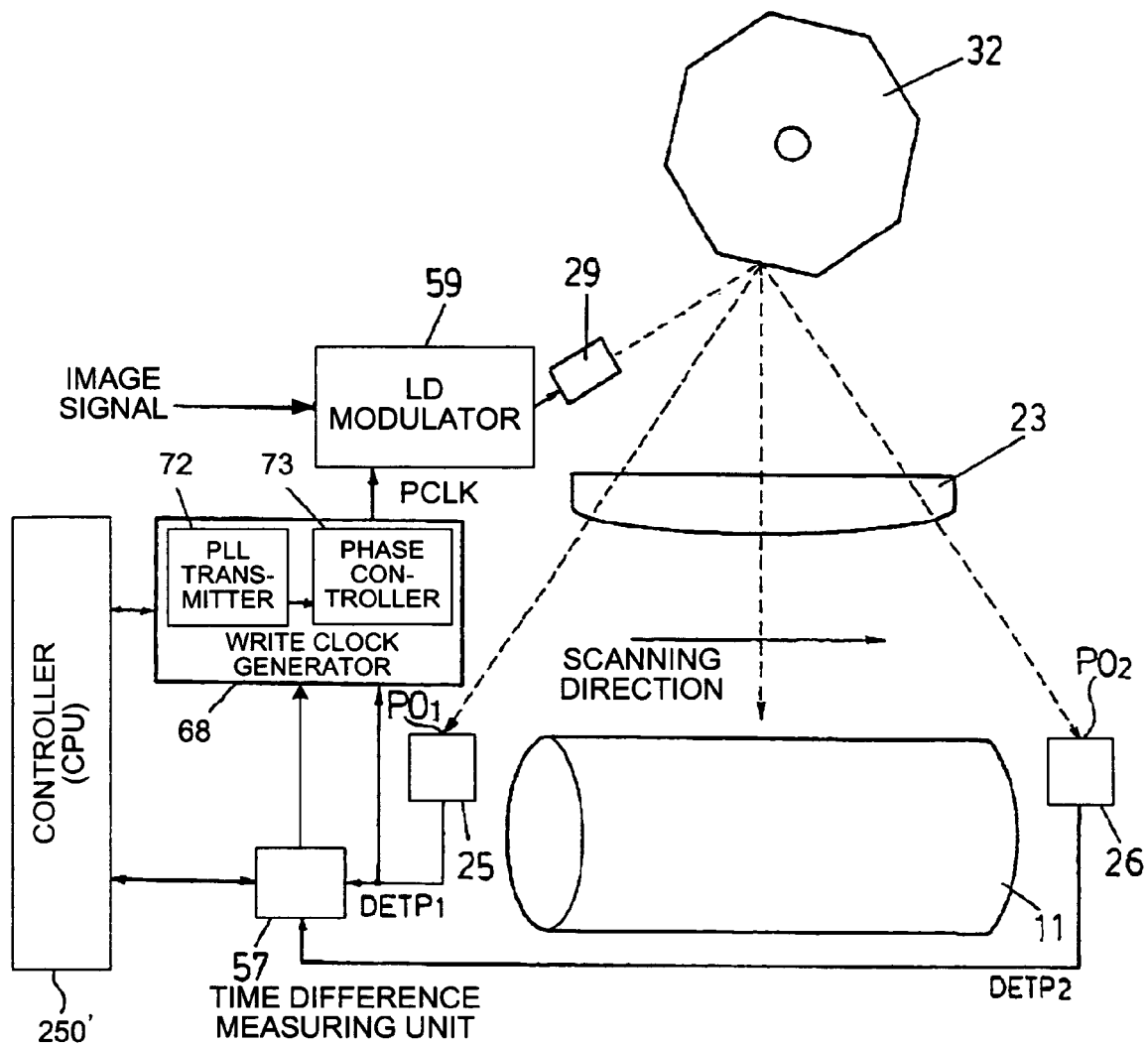
FIG. 41 is a schematic block diagram of relevant parts of an optical scanner and a photoconductor together with an associated control system of an image forming apparatus according to a twenty-seventh embodiment of the present invention.

FIG. 41 is a schematic block diagram of relevant parts of an optical scanner and a photoconductor together with an associated control system of an image forming apparatus according to a twenty-seventh embodiment of the present invention.

The configuration of the image forming apparatus according to the twenty-seventh embodiment is the same as that shown in FIG. 2.

The image forming apparatus according to the twenty-seventh embodiment is different from the image forming apparatus according to the twenty-fifth embodiment in that a controller (CPU) 250' performs the function of the magnification correction controller 81 explained with reference to FIG. 33. The controller 250' includes a microcomputer similar to that of the controller 250, and only the content of the control is different from the controller 250.

In the twenty-seventh embodiment, the time difference measuring unit 57 performs time difference measurement and calculation between the laser beam detection signals DETP1 and DETP2, and transmits the measurement result and the calculation result to the controller 250'. The controller 250' has a storage unit that stores the initially set values and the current set values of the write clock frequency and the phase shift value (phase adjustment amount), and has a function of calculating the optimum write clock frequency and the phase shift value by using the fact that the image magnification in the horizontal scanning direction is changed by the frequency of the optimum write clock, and by using the fact that the image magnification is changed by shifting the phase.

The controller 250' has a function of calculating the optimum phase shift value (phase adjustment amount) by fixing the write clock frequency, and also has a function of comparing the calculated phase shift value with the preset specified value. When it is determined that the calculated phase adjustment amount does not exceed the specified value, magnification correction of an image is performed by the phase modulator, and when it is determined that the phase adjustment amount exceeds the specified value, the phase adjustment amount set by the phase modulator is converted to a frequency adjustment amount by the frequency adjustment amount converter to perform magnification correction of the image based on the frequency adjustment amount.

That is, in the twenty-seventh embodiment, the controller 250' functions as the phase adjustment amount-determining unit. The controller 250' also functions as the frequency modulating unit together with the frequency modulator 72, and as the phase modulating unit together with the phase adjusting unit 73. The controller 250' also functions as the frequency adjustment amount converter.

In FIG. 41, an example in which the write clock generator 68 and the time difference measuring unit 57 are formed respectively in separate blocks has been explained, but the configuration can be such that these constitute a write clock generator as a single block.

Figure 42:
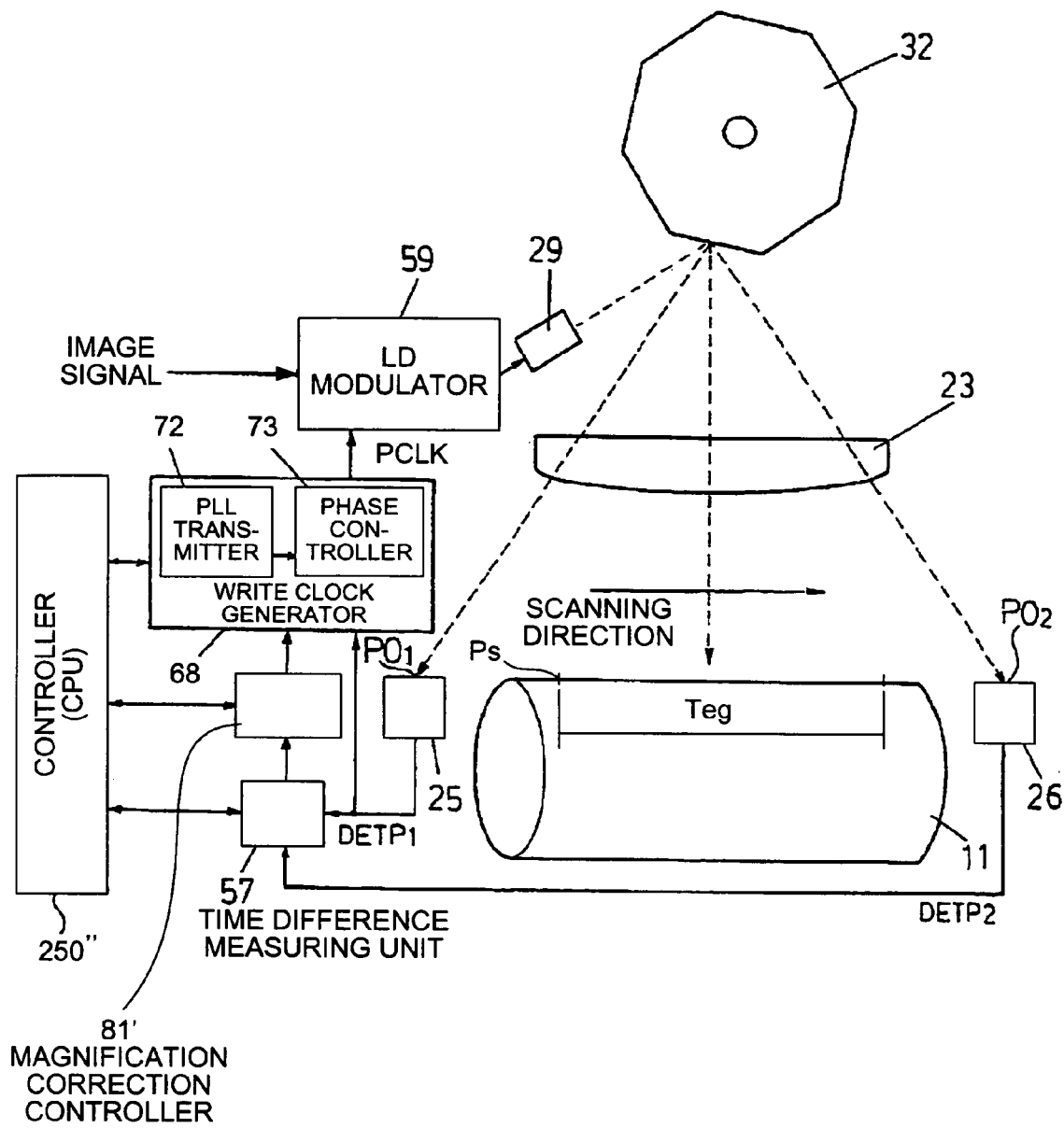
FIG. 42 is a schematic block diagram of relevant parts of an optical scanner and a photoconductor together with an associated control system of an image forming apparatus according to a twenty-eighth embodiment of the present invention.
Figure 43:
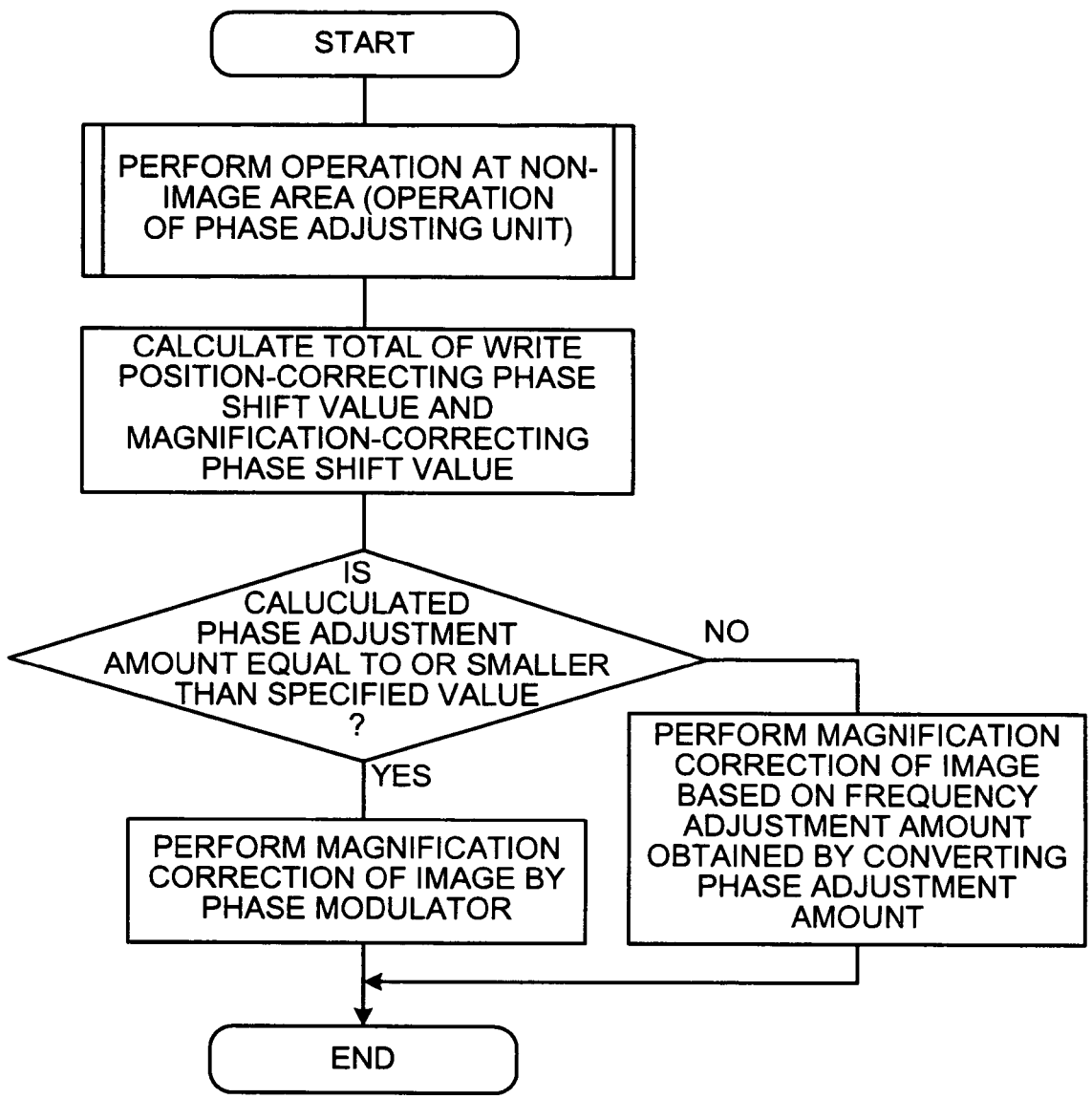
FIG. 43 is a flowchart of a routine for a magnification correction of an image performed by the control system in the image forming apparatus according to the twenty-eighth embodiment.

FIG. 42 is a schematic block diagram of relevant parts of an optical scanner and a photoconductor together with an associated control system of an image forming apparatus according to a twenty-eighth embodiment of the present invention; and FIG. 43 is a flowchart of a routine for a magnification correction of an image performed by the control system. In FIG. 42, like reference signs are designated with like parts in FIG. 33.

The configuration of the image forming apparatus according to the twenty-eighth embodiment is the same as that shown in FIG. 2.

The image forming apparatus according to the twenty-eighth embodiment is different from the image forming apparatus explained in the twenty-sixth embodiment in that, in a phase modulator (the phase adjusting unit 73 functions as the phase modulator), correction of the write start position Ps in the horizontal scanning direction shown in FIG. 42 can be performed by a write start position-correcting phase adjustment amount (hereinafter, also as a write position-correcting phase shift value), and magnification correction in the horizontal scanning direction can be performed by a magnification-correcting phase adjustment amount in the horizontal scanning direction (hereinafter, also as a magnification-correcting phase shift value), and that there is provided a phase adjustment amount-determining unit (magnification correction controller 81' functions as the phase adjustment amount-determining unit) that determines the magnitude correlation between the phase adjustment amount obtained by adding up the write start position-correcting phase adjustment amount and the magnification-correcting phase adjustment amount in the horizontal scanning direction, and the set specified value.

It is also different from the image forming apparatus according to the twenty-sixth embodiment explained with reference to FIG. 40, in that when the phase adjustment amount-determining unit determines that the added phase shift value does not exceeds the specified value, magnification correction of an image is performed by the phase modulator, and when it is determined that the added phase adjustment amount exceeds the specified value, the phase adjustment amount set by the phase modulator is converted to a frequency adjustment amount by the frequency adjustment amount converter (the magnification correction controller 81' functions as the frequency adjustment amount converter) to perform magnification correction of the image based on the frequency adjustment amount.

Thus, in the configuration in which optimum phase adjustment (phase shift) is performed by changing the cycle time of an optional pixel per unit of pixel, that is, when correction of the optimum write start position Ps in the horizontal scanning direction and correction of the magnification in the horizontal scanning direction are respectively performed based on the write start position-correcting phase adjustment amount and the horizontal scanning magnification-correcting phase adjustment amount calculated by fixing the write clock frequency, the magnification correction controller 81' has a configuration including a storage unit that stores the initially set values of the write clock frequency transmitted from a controller (CPU) 250", the write position-correcting phase shift value in the horizontal scanning direction, and the magnification-correcting phase shift value, as well as the current set values thereof.

The controller (CPU) 250" in this image forming apparatus is a microcomputer similar to the controller 250 in FIG. 33, which starts the routine for a magnification correction of an image shown in FIG. 43, at a predetermined timing such as after turning the power on or restarting after having stopped the machine.

At the first step, the controller 250" performs the routine for the operation of the phase modulator at the timing in a non-image portion to calculate the phase adjustment amount (phase adjustment value), at a predetermined timing such as after turning the power on or restarting after having stopped the machine. At the next step, the controller 250" calculates a phase adjustment amount by adding up the write position-correcting phase shift value and the magnification-correcting phase shift value.

At the next step, the controller 250" determines the magnitude correlation between the calculated and added phase adjustment amount and the specified value, by determining whether the calculated and added phase adjustment amount is equal to or smaller than the preset specified value.

Based on the determination, when the added phase adjustment amount is equal to or smaller than the specified value, magnification correction of an image is performed by the phase modulator. When it is determined that the added phase adjustment amount exceeds the specified value, the phase adjustment amount set by the phase modulator is converted to a frequency adjustment amount by the frequency adjustment amount converter (the magnification correction controller 81' functions as the frequency adjustment amount converter) to perform magnification correction of the image based on the frequency adjustment amount.

Thus in the twenty-eighth embodiment, since the phase adjustment amount is accurately determined by adding up the write position-correcting phase shift value and the magnification-correcting phase shift value, magnification correction of an image can be performed highly accurately.

Further, until the added phase adjustment amount exceeds the specified value, conversion from the phase adjustment amount to the frequency adjustment amount is not carried out. Accordingly, the number of conversion from the phase adjustment amount to the frequency adjustment amount can be reduced.

Even when the added phase adjustment amount exceeds the specified value, magnification correction of the image is performed based on only calculation without performing measurement, and the control thereof is basically performed in a non-image portion, that is, during the timing between prints.

Figure 44:
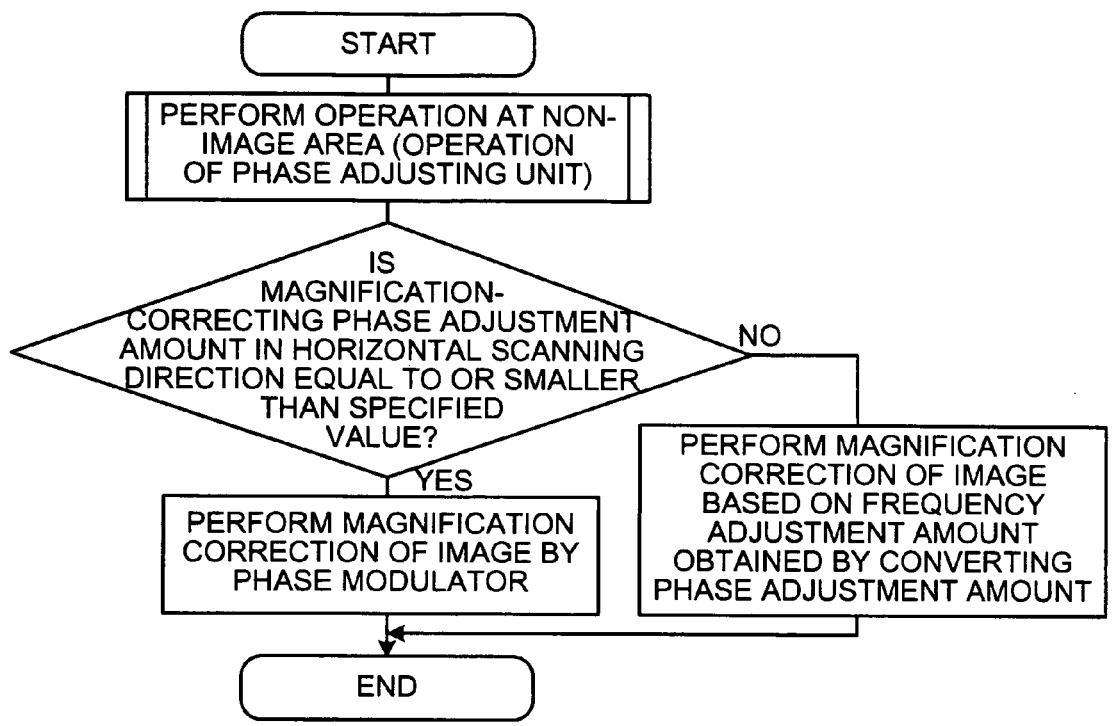
FIG. 44 is a flowchart of a routine for a magnification correction of an image performed by a control system in an image forming apparatus according to a twenty-ninth embodiment of the present invention.

FIG. 44 is a flowchart of a routine for a magnification correction of an image performed by a control system in an image forming apparatus according to a twenty-ninth embodiment of the present invention.

The configuration of the image forming apparatus according to the twenty-ninth embodiment is the same as that shown in FIG. 2. Moreover, the control system is the same as that in the twenty-eighth embodiment explained with reference to FIG. 42 (or can have the configuration shown in FIG. 41), but only the content of the control performed by the controller is different.

The image forming apparatus according to the twenty-ninth embodiment has the phase modulator that performs magnification correction of an image by changing the cycle time of an optional pixel in the unit of pixel by fixing the frequency, as in the phase modulator explained with reference to FIG. 33. The phase modulator can correct the write start position in the horizontal scanning direction by a write start position-correcting phase adjustment amount, and the magnification in the horizontal scanning direction by a magnification-correcting phase adjustment amount in the horizontal scanning direction, respectively.

In the image forming apparatus, the phase adjustment amount-determining unit (the magnification correction controller 81' in FIG. 42 functions as the phase adjustment amount-determining unit) that determines the magnitude correlation between the magnification-correcting phase adjustment amount in the horizontal scanning direction and the set specified value is provided. When the phase adjustment amount-determining unit determines that the magnification-correcting phase adjustment amount in the horizontal scanning direction does not exceed the specified value, the phase modulator performs magnification correction of an image, and when it is determined that the magnification-correcting phase adjustment amount in the horizontal scanning direction exceeds the specified value, the phase adjustment amount set by the phase modulator is converted to a frequency adjustment amount by the frequency adjustment amount converter (the magnification correction controller 81' in FIG. 42 functions as the frequency adjustment amount converter) to perform magnification correction of the image based on the frequency adjustment amount.

That is, the microcomputer of the control system in the image forming apparatus starts the routine for a magnification correction of an image shown in FIG. 44 at a predetermined timing.

At the first step, the routine for the operation of the phase modulator is performed at the timing in a non-image portion to calculate the magnification-correcting phase adjustment amount in the horizontal scanning direction, at a predetermined timing such as after turning the power on or restarting after having stopped the machine. At the next step, it is determined whether the magnification-correcting phase adjustment amount in the horizontal scanning direction is equal to or smaller than the preset specified value, thereby determining the magnitude correlation between the magnification-correcting phase adjustment amount in the horizontal scanning direction and the specified value.

Based on the determination, when the magnification-correcting phase adjustment amount in the horizontal scanning direction is equal to or smaller than the preset specified value, magnification correction of an image is performed by the phase modulator. When it is determined that the magnification-correcting phase adjustment amount in the horizontal scanning direction exceeds the specified value, the phase adjustment amount set by the phase modulator is converted to a frequency adjustment amount by the frequency adjustment amount converter to perform magnification correction of the image based on the frequency adjustment amount.

According to the twenty-ninth embodiment, the phase adjustment amount is divided into the magnification-correcting phase adjustment amount in the horizontal scanning direction and the write start position-correcting phase adjustment amount, and it is determined whether the magnification-correcting phase adjustment amount in the horizontal scanning direction exceeds the specified value. Only when the magnification-correcting phase adjustment amount in the horizontal scanning direction exceeds the specified value, the phase adjustment amount set by the phase modulator is converted to a frequency adjustment amount by the frequency adjustment amount converter to perform magnification correction of the image based on the frequency adjustment amount, thereby reducing the influence thereof on image degradation in the image area. Further, the influence of the write start position correction is removed, and the size of the phase adjustment amount in the image area can be substantially determined.

Figure 45:
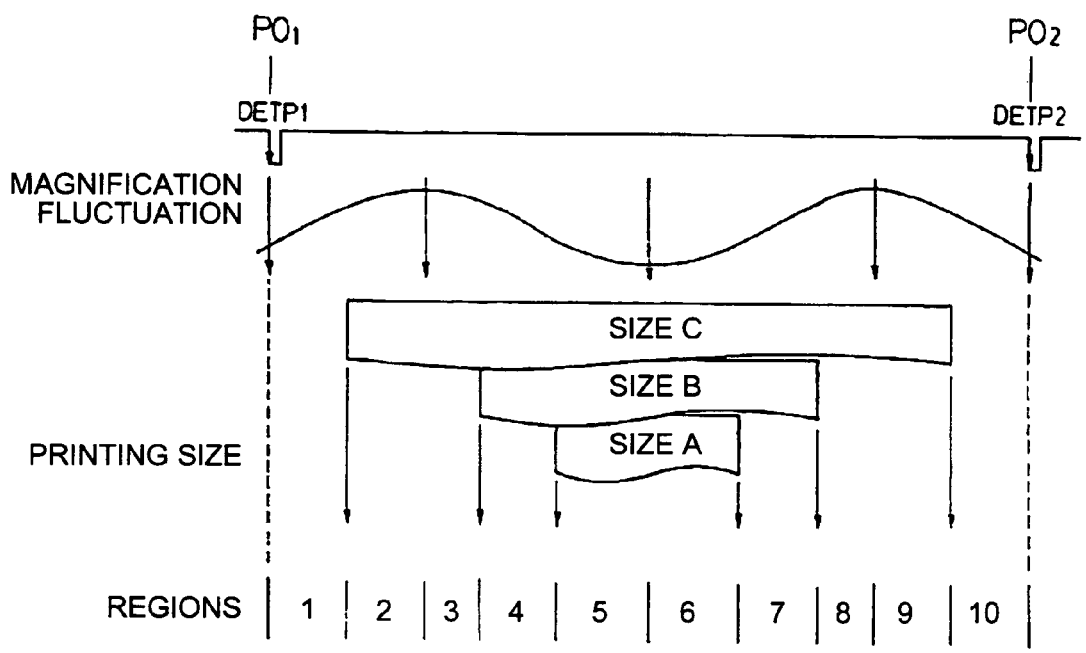
FIG. 45 is a schematic to explain how the horizontal scanning direction is divided into regions by an image forming apparatus according to a thirtieth embodiment of the present invention.
Figure 46:
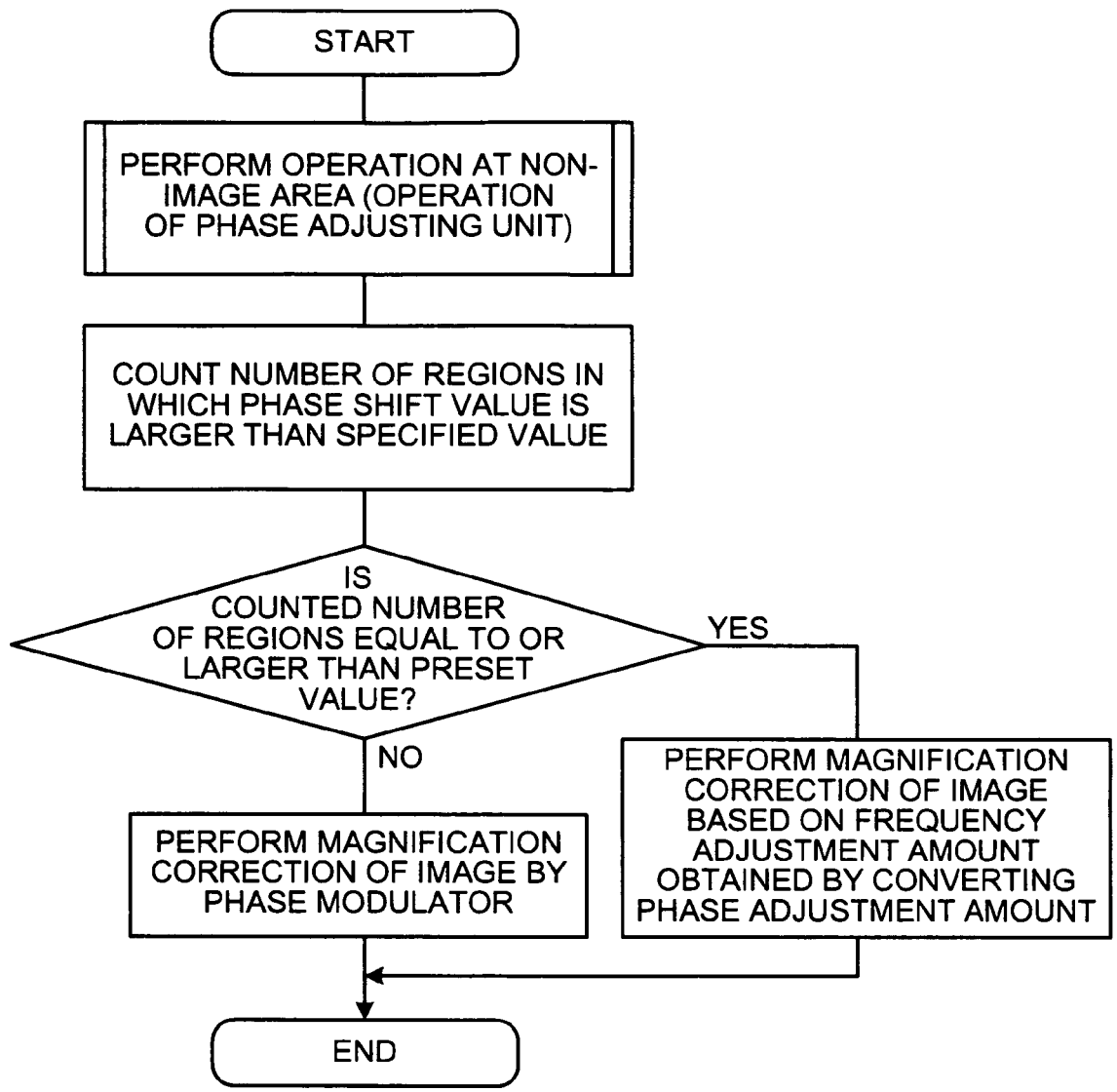
FIG. 46 is a flowchart of a routine for a magnification correction of an image performed by a control system in the image forming apparatus according to the thirtieth embodiment.

FIG. 45 explains region dividing in the horizontal scanning direction performed by an image forming apparatus according to a thirtieth embodiment of the present invention; and FIG. 46 is a flowchart of a routine for a magnification correction of an image performed by a control system in the image forming apparatus according to the thirtieth embodiment.

The configuration of the image forming apparatus according to the thirtieth embodiment is the same as that shown in FIG. 2. Moreover, the control system is the same as that in the twenty-eighth embodiment explained with reference to FIG. 42 (or can have the configuration shown in FIG. 41), but only the content of the control performed by the controller is different. Therefore, illustration of the control system is omitted, and as required, the reference signs used in FIG. 42 will be used for explanation.

The image forming apparatus according to the thirtieth embodiment is different from that in the twenty-eighth embodiment explained with reference to FIG. 42 in that the phase adjustment amount-determining unit (magnification correction controller 81' in FIG. 42) determines the magnitude correlation between the phase adjustment amount in a predetermined region in the horizontal scanning direction and the specified value.

In the image forming apparatus, the predetermined region in the horizontal scanning direction, that is, the region between the detection positions $PO_1$ and $PO_2$ of the sensors 25 and 26, as shown in FIG. 45 (also see FIG. 42), is divided into a plurality of regions, that is, into ten (1 to 10) regions in the horizontal scanning direction, corresponding to the magnification fluctuation characteristic of the fθ lens or a printing size width corresponding to the assumed type, size, or orientation of the transfer paper, and a phase shift value for each of the divided regions, that is, a phase shift value (phase adjustment amount) calculated respectively by fixing the write clock frequency is set for each region as shown in Table 1.

Further, the magnification correction controller 81' and the controller 250" (see FIG. 42) determine the magnitude correlation between the phase shift value and the specified value, only for the specified region (predetermined region) out of the ten regions, not for all regions in the horizontal scanning direction.

The specified predetermined region is then divided into a region in which the phase shift value is equal to or smaller than the specified value, and a region in which the phase shift value is larger than the specified value, and when the number of regions in which the phase shift value is larger than the specified value becomes equal to or larger than a preset number, the phase adjustment amount set by the phase modulator is converted to a frequency adjustment amount by the frequency adjustment amount converter to perform magnification correction of the image based on the frequency adjustment amount.

When the number of regions in which the phase shift value is larger than the specified value does not reach the preset number, magnification correction of the image is performed by the phase modulator.

Although the regions 1 to 10 have been shown to have unequal widths, all the regions can have equal widths.

FIG. 46 is a routine for a magnification correction of an image. When the routine is started, at the first step, a phase shift value of respective divided regions is calculated by performing the routine for the operation of the phase modulator at the timing in a non-image portion, at a predetermined timing such as after turning the power on or restarting after having stopped the machine. At the next step, the specified predetermined regions of from the first to the tenth regions are divided into a region in which the phase shift value is equal to or smaller than the specified value, and a region in which the phase shift value is larger than the specified value, to count the number of regions in which the phase shift value is larger than the specified value.

At the next step, it is determined whether the counted number of regions in which the phase shift value is larger than the specified value is equal to or larger than a preset number, and if the number of regions is equal to or larger than the preset number, the phase adjustment amount set by the phase modulator is converted to a frequency adjustment amount by the frequency adjustment amount converter to perform magnification correction of the image based on the frequency adjustment amount. If the number of regions does not reach the preset number, magnification correction of the image is performed by the phase modulator.

According to the image forming apparatus, only the region in which it is desired to prevent image degradation can be monitored. Therefore, even when the phase adjustment amount in the regions other than the regions specified as the predetermined regions increases, it is determined whether the number of regions exceeds the specified value only for the predetermined regions, thereby determining whether to convert the phase adjustment amount to the frequency adjustment amount. Accordingly, the conversion to the frequency adjustment amount can be suspended for regions other than the predetermined regions.

The predetermined regions in the horizontal scanning direction, which becomes the specified predetermined regions, can be in the image areas in the horizontal scanning direction. The phase adjustment amount in the specified predetermined regions in an image forming area can be monitored, thereby enabling effective prevention of image degradation in the image forming area.

Figure 47:
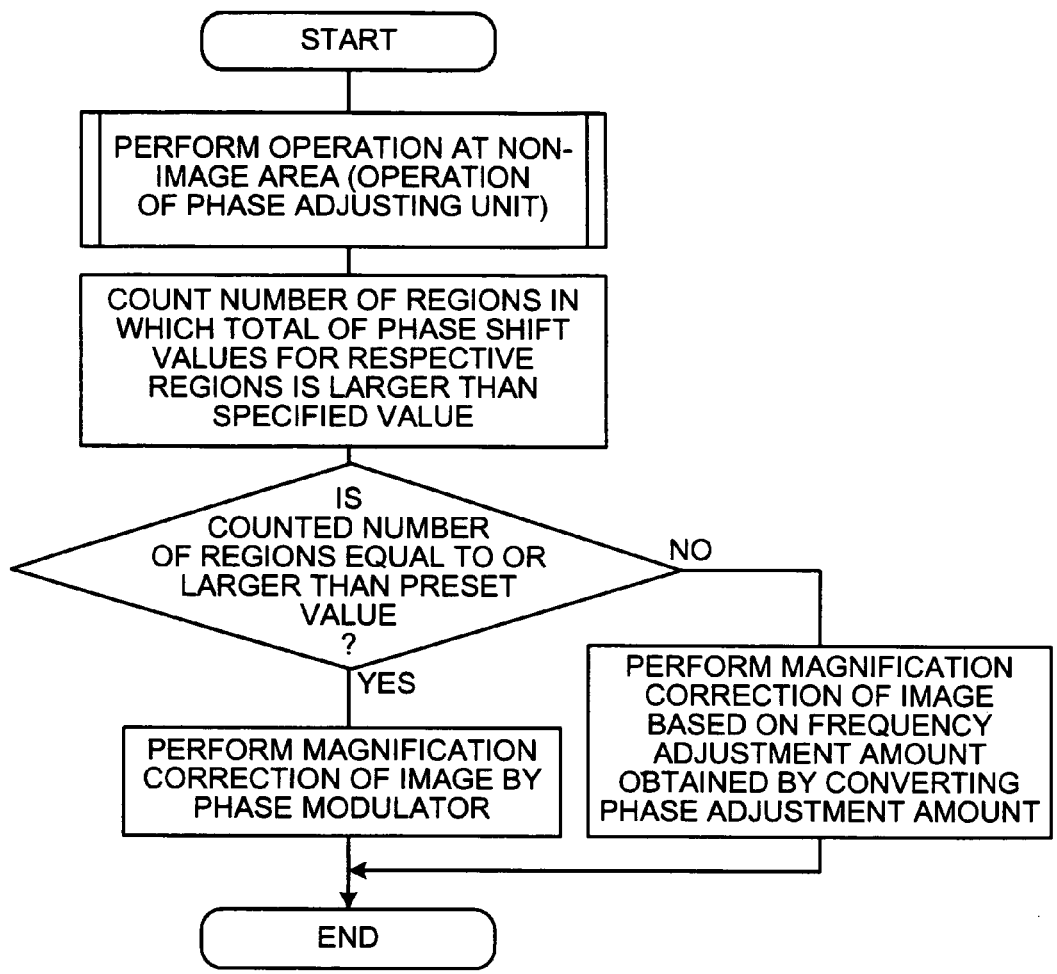
FIG. 47 is a flowchart of a routine for a magnification correction of an image performed by a control system in an image forming apparatus according to a thirty-first embodiment of the present invention.

FIG. 47 is a flowchart of a routine for a magnification correction of an image performed by a control system in an image forming apparatus according to a thirty-first embodiment of the present invention.

The configuration of the image forming apparatus according to the thirty-first embodiment is the same as that shown in FIG. 2. Moreover, the control system is the same as that in the twenty-eighth embodiment explained with reference to FIG. 42 (or can have the configuration shown in FIG. 41), but only the content of the control performed by the controller is different.

The phase modulator in the image forming apparatus according to the thirty-first embodiment is different from that of the twenty-eighth embodiment explained with reference to FIGS. 42 and 43 in that the phase adjustment amount-determining unit determines the magnitude correlation between the phase adjustment amount obtained by adding up the write position-correcting phase shift value (write start position phase adjustment amount) in a predetermined region in the horizontal scanning direction and the magnification-correcting phase shift value (magnification-correcting phase adjustment amount in the horizontal scanning direction), and the set specified value.

When the routine in FIG. 47 is started, at the first step, the controller (a microcomputer similar to the controller 250" in FIG. 42) of the image forming apparatus according to the thirty-first embodiment performs the routine for the operation of the phase adjusting unit at the timing in a non-image portion to calculate the phase shift value in the respective divided regions, at a predetermined timing such as after turning the power on or restarting after having stopped the machine.

At the next step, a phase shift value (phase adjustment amount) obtained by adding up the write position-correcting phase shift value and the magnification-correcting phase shift value (a value calculated with the write clock frequency being fixed) calculated for each of 1 to 10 regions shown in Table 3 is compared with the corresponding specified values I to X for each region, and the number of regions in which the total of phase shift values for respective regions is larger than the specified value for each region is calculated.

At the next step, it is determined whether the total of phase shift values for respective regions is larger than the specified value for respective regions. If the number of regions exceeds the specified value, the phase adjustment amount set by the phase modulator is converted to a frequency adjustment amount by the frequency adjustment amount converter to perform magnification correction of the image based on the frequency adjustment amount.

Thus, in the thirty-first embodiment, since the phase adjustment amount is accurately determined based on a phase adjustment amount obtained by adding up the write position-correcting phase shift value and the magnification-correcting phase shift value in the horizontal scanning predetermined region, the phase shift value in a region in which it is desired to prevent degradation of the image can be accurately determined, thereby enabling magnification correction of the image highly accurately.

Further, until the added phase adjustment amount exceeds the specified value, conversion from the phase adjustment amount to the frequency adjustment amount is not carried out. Accordingly, the number of conversion from the phase adjustment amount to the frequency adjustment amount can be reduced.

Figure 48:
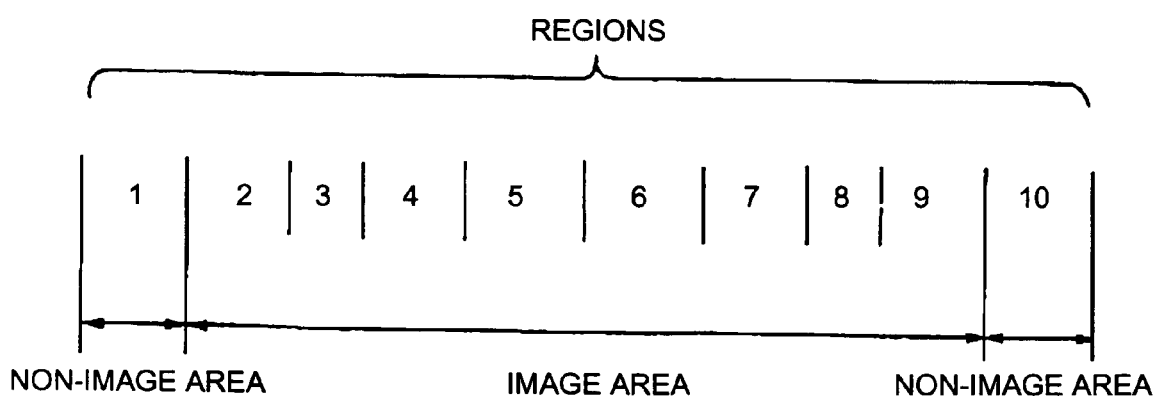
FIG. 48 is a schematic for explaining how the horizontal scanning direction can be divided into image and non-image areas.

The predetermined region in the horizontal scanning direction can be positioned in the image forming area of from 2 to 9 regions shown in FIG. 48 as an example, in which image formation is carried out (other regions are non-image areas), thereby preventing image degradation in the image area.

As shown in Table 2, the comparison between the phase shift value and the specified value can be performed by providing a specified value for a plurality of divided regions, and comparing it with a phase shift value unified in the same manner. For example, even when a phase shift value is set for each region of from the first to the tenth regions, the regions can be unified as from the second region to the fourth region, the fifth and the sixth region, and from the seventh to the ninth regions, as in the example shown in Table 2, and totals II, III, and IV of phase shift values are respectively set corresponding thereto, and these phase shift values can be compared with the respective specified values II, III, and IV.

These regions are then unified as one region, and the number of regions in which the phase shift value exceeds the corresponding specified value is calculated, and when the number exceeds a preset value, the phase adjustment amount set by the phase modulator is converted to a frequency adjustment amount by the frequency adjustment amount converter to perform magnification correction of the image based on the frequency adjustment amount.

The comparison of the magnitude correlation between the phase adjustment amount and the specified value can be performed in such a manner that the magnitude correlation between the write start position-correcting phase adjustment amount in the horizontal scanning predetermined region (write position-correcting phase shift value), and the set specified value in the horizontal scanning predetermined region is determined, without using the total of phase adjustment amounts.

An image forming apparatus according to a thirty-second embodiment has the similar overall configuration to that of FIG. 2, moreover, the configuration of a control system is the same as that in the twenty-eighth embodiment explained with reference to FIG. 42 (or can have the configuration of FIG. 41), and hence, the illustration thereof is omitted. The image forming apparatus according to the thirty-second embodiment includes the frequency adjustment amount converter that converts the phase adjustment amount set by the phase modulator similar to the one explained in the respective embodiments to the frequency adjustment amount by the frequency modulator, and the phase adjustment amount-determining unit that determines the magnitude correlation between the phase adjustment amount in the horizontal scanning predetermined region and the set specified value. The image forming apparatus also includes a region changing unit (the controller 250" in FIG. 42 functions as this unit) that changes the predetermined region in the horizontal scanning direction corresponding to the horizontal scanning imaging range.

When the phase adjustment amount-determining unit determines that the phase adjustment amount does not exceed the specified value, the phase modulator performs magnification correction of an image, and when the phase adjustment amount-determining unit determines that the phase adjustment amount has exceeded the specified value, the phase adjustment amount set by the phase modulator is converted to a frequency adjustment amount by the frequency adjustment amount converter to perform magnification correction of the image based on the frequency adjustment amount.

According to the thirty-second embodiment, since the monitoring region can be optimized corresponding to the imaging range, it is not necessary to perform conversion (calculation) of the phase adjustment amount in an unnecessary portion. Accordingly, unnecessary control is not performed.

As a thirty-third embodiment, in the image forming apparatus according to the thirty-second embodiment, the specified value-changing unit (the controller 250" shown in FIG. 42 functions as this unit) that changes the specified value corresponding to the imaging range in the horizontal scanning direction is provided.

Optimum monitoring region is set corresponding to the imaging range in the horizontal scanning direction, and an optimum specified value corresponding to the imaging range can be obtained. Accordingly, the frequency of converting the phase adjustment amount set by the phase modulator to the frequency adjustment amount by the frequency modulator can be reduced.

As a thirty-fourth embodiment, in the image forming apparatus according to the thirty-second or the thirty-third embodiment, the phase modulator can be made to correct the write start position in the horizontal scanning direction by a write start position-correcting phase adjustment amount, and the magnification in the horizontal scanning direction by a magnification-correcting phase adjustment amount in the horizontal scanning direction, respectively, and the phase adjustment amount-determining unit determines the magnitude correlation between the phase adjustment amount obtained by adding up the write start position-correcting phase adjustment amount and the magnification-correcting phase adjustment amount in the horizontal scanning direction and the set specified value.

An accurate phase adjustment amount in the selected region can be determined, and an optimum monitoring region and an optimum specified value can be selected, thereby enabling prevention of image degradation. Further, the frequency of converting the phase adjustment amount set by the phase modulator to the frequency adjustment amount by the frequency modulator can be reduced.

As a thirty-fifth embodiment, in the image forming apparatus according to the thirty-second or the thirty-third embodiment, the phase modulator can be made to correct the write start position in the horizontal scanning direction by a write start position-correcting phase adjustment amount, and the magnification in the horizontal scanning direction by a magnification-correcting phase adjustment amount in the horizontal scanning direction, respectively, and the phase modulator determines the magnitude correlation between the horizontal scanning magnification-correcting phase adjustment amount in the horizontal scanning predetermined region and the set specified value in the horizontal scanning predetermined region.

Accordingly, an accurate phase adjustment amount in the selected region can be determined, and an optimum monitoring region and an optimum specified value can be selected, thereby enabling prevention of image degradation. As a result, the frequency of converting the phase adjustment amount set by the phase modulator to the frequency adjustment amount by the frequency modulator can be reduced.

An image forming apparatus according to a thirty-sixth embodiment has the same overall configuration as that of FIG. 2, moreover, the configuration of a control system is the same as that in the twenty-eighth embodiment explained with reference to FIG. 42 (or can have the configuration of FIG. 41). The image forming apparatus according to the thirty-sixth embodiment includes the frequency adjustment amount converter that converts the phase adjustment amount set by the phase modulator similar to the one explained in the thirty-second embodiment to the frequency adjustment amount by the frequency modulator, and the phase adjustment amount-determining unit that determines the magnitude correlation between the phase adjustment amount in the horizontal scanning predetermined region and the set specified value. The image forming apparatus also includes the region changing unit (the controller 250" in FIG. 42 functions as this unit) that changes the predetermined region in the horizontal scanning direction corresponding to the type, size, or orientation of the transfer paper.

When the phase adjustment amount-determining unit determines that the phase adjustment amount does not exceed the specified value, the phase modulator performs magnification correction of an image, and when the phase adjustment amount-determining unit determines that the phase adjustment amount has exceeded the specified value, the phase adjustment amount set by the phase modulator is converted to a frequency adjustment amount by the frequency adjustment amount converter to perform magnification correction of the image based on the frequency adjustment amount.

According to the thirty-sixth embodiment, since the monitoring region can be optimized corresponding to the type, size, or orientation of the transfer paper, setting of the monitoring region becomes easy. Furthermore, conversion (calculation) of the phase adjustment amount in an unnecessary portion is omitted.

As a thirty-seventh embodiment, in the image forming apparatus according to the thirty-fifth embodiment, the specified value-changing unit (the controller 250" shown in FIG. 42 functions as this unit) that changes the specified value corresponding to the type, size, or orientation of the transfer paper is provided.

An optimum monitoring region and an optimum specified value can be set corresponding to the type, size, or orientation of the transfer paper.

As a thirty-eighth embodiment, in the image forming apparatus according to the thirty-sixth or the thirty-seventh embodiment, the phase modulator can be made to correct the write start position in the horizontal scanning direction by a write start position-correcting phase adjustment amount, and the magnification in the horizontal scanning direction by a magnification-correcting phase adjustment amount in the horizontal scanning direction, respectively, and the phase adjustment amount-determining unit determines the magnitude correlation between the phase adjustment amount obtained by adding up the write start position-correcting phase adjustment amount and the magnification-correcting phase adjustment amount in the horizontal scanning direction and the set specified value.

Therefore, an accurate phase adjustment amount in the selected region can be determined according to the type, size, or orientation of the transfer paper, and an optimum monitoring region and an optimum specified value can be selected, thereby enabling prevention of image degradation. Further, the frequency of converting the phase adjustment amount set by the phase modulator to the frequency adjustment amount by the frequency modulator can be reduced.

As a thirty-ninth embodiment, in the image forming apparatus according to the thirty-sixth or the thirty-seventh embodiment, the phase modulator can be made to correct the write start position in the horizontal scanning direction by a write start position-correcting phase adjustment amount, and the magnification in the horizontal scanning direction by a magnification-correcting phase adjustment amount in the horizontal scanning direction, respectively, and the phase adjustment amount-determining unit determines the magnitude correlation between the magnification-correcting phase adjustment amount in the horizontal scanning direction in the horizontal scanning predetermined region and the set specified value.

Thus, the phase adjustment amount, which is not affected by the correction of the write start position in the region selected corresponding to the type, size, or orientation of the transfer paper, can be determined, and an optimum monitoring region and an optimum specified value can be selected. Accordingly, the frequency of converting the phase adjustment amount set by the phase modulator to the frequency adjustment amount by the frequency modulator can be reduced.

According to the present invention, since the magnitude correlation between the phase shift value and the specified value is determined, and magnification correction of an image is converted from the one by phase modulation to the one by frequency modulation, in which image degradation does not occur, based on the determination result. Accordingly, degradation in an image can be prevented by setting the specified value to a value within a tolerance limit of image degradation. Further, since the frequency of suspending the image forming operation can be reduced by executing the magnification correction of the image by frequency modulation, a drop in gross printing speed (number of image formation per unit time), as the image forming apparatus, can be prevented.

Further, according to the image forming apparatus including the frequency adjustment amount converter that converts the phase adjustment amount set by the phase modulator to the frequency adjustment amount by the frequency modulator, the phase adjustment amount set by the phase modulator is directly converted to the frequency adjustment amount by the frequency modulator without performing measurement of the amount or the like, magnification correction of an image can be controlled only by calculation, without suspending continuous printing. Accordingly, a drop in printing speed, as the image forming apparatus, can be prevented.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a deflector that deflects optical beams modulated according to an image signal to perform scanning in a horizontal scanning direction to form an image on an image carrier;
   two optical beam detectors that respectively detect optical beams deflected by the deflector at two positions on a horizontal scanning line;
   a time difference measuring unit that measures the time difference between detection of the optical beams by the detectors;
   a magnification correcting unit that corrects the magnification of an image in the horizontal scanning direction based on the time difference measured by the time difference measuring unit, wherein the magnification correcting unit includes
      a frequency modulator that performs magnification correction of an image by changing a frequency of the image signal in units of a line or lines; and
      a phase modulator that performs magnification correction of the image by fixing the frequency and changing a cycle time of an optional pixel in units of pixel;
   a comparing unit that compares the phase adjustment amount calculated by the phase modulator with a preset specified value; and
   an arrangement that causes the phase modulator to perform the magnification correction of the image upon the comparing unit determining that the phase adjustment amount does not exceed the specified value, and, once the comparing unit determines that the phase adjustment amount exceeds the specified value, causes the frequency modulator to perform the magnification correction of the image.

2. The image forming apparatus according to claim 1, wherein the phase modulator corrects a write start position in the horizontal scanning direction by a write start position-correcting phase adjustment amount, and corrects a magnification in the horizontal scanning direction by a magnification-correcting phase adjustment amount in the horizontal scanning direction, and
   the comparing unit compares the magnification-correcting phase adjustment amount in the horizontal scanning direction with the specified value.

3. The image forming apparatus according to claim 1, wherein the phase modulator corrects a write start position in the horizontal scanning direction by a write start position-correcting phase adjustment amount, and corrects a magnification in the horizontal scanning direction by a magnification-correcting phase adjustment amount in the horizontal scanning direction, and
   the comparing unit compares a phase adjustment amount obtained by adding up the write start position-correcting phase adjustment amount and the magnification-correcting phase adjustment amount in the horizontal scanning direction with the specified value.

4. An image forming apparatus comprising:
   a deflector that deflects optical beams modulated according to an image signal to perform scanning in a horizontal scanning direction to form an image on an image carrier;
   two optical beam detectors that respectively detect optical beams deflected by the deflector at two positions on a horizontal scanning line;
   a time difference measuring unit that measures the time difference between detection of the optical beams by the detectors;
   a magnification correcting unit that corrects the magnification of an image in the horizontal scanning direction based on the time difference measured by the time difference measuring unit, wherein the magnification correcting unit includes
      a frequency modulator that performs magnification correction of an image by changing a frequency of the image signal in units of line or lines; and
      a phase modulator that performs magnification correction of the image by changing a cycle time of an optional pixel in units of pixel;
   a comparing unit that compares a phase adjustment amount in a predetermined region in the horizontal scanning direction calculated by the phase modulator with a preset specified value; and
   an arrangement that, depending on the result obtained by the comparing unit, decides whether the phase modulator performs the magnification correction of the image or the frequency modulator performs the magnification correction of the image.

5. The image forming apparatus according to claim 4, wherein the phase modulator corrects a write start position in the horizontal scanning direction by a write start position-correcting phase adjustment amount, and corrects a magnification in the horizontal scanning direction by a magnification-correcting phase adjustment amount in the horizontal scanning direction, and
   the comparing unit compares the magnification-correcting phase adjustment amount in the horizontal scanning predetermined region with the specified value.

6. The image forming apparatus according to claim 4, wherein the phase modulator corrects a write start position in the horizontal scanning direction by a write start position-correcting phase adjustment amount, and corrects a magnification in the horizontal scanning direction by a magnification-correcting phase adjustment amount in the horizontal scanning direction, and
   the comparing unit compares a phase adjustment amount obtained by adding up the write start position-correcting phase adjustment amount in the horizontal scanning predetermined region and the magnification-correcting phase adjustment amount in the horizontal scanning direction with the specified value.

7. An image forming apparatus comprising:
a deflector that deflects optical beams modulated according to an image signal to perform scanning in a horizontal scanning direction to form an image on an image carrier;
two optical beam detectors that respectively detect optical beams deflected by the deflector at two positions on a horizontal scanning line;
a time difference measuring unit that measures the time difference between detection of the optical beams by the detectors;
a magnification correcting unit that corrects the magnification of an image in the horizontal scanning direction based on the time difference measured by the time difference measuring unit, wherein the magnification correcting unit includes
a frequency modulator that performs magnification correction of an image by changing a frequency of the image signal in units of line or lines; and
a phase modulator that performs magnification correction of the image by changing a cycle time of an optional pixel in units of pixel;
a comparing unit that compares the phase adjustment amount in a predetermined region in the horizontal scanning direction calculated by the phase modulator with a preset specified value;
a predetermined region-changing unit that changes the predetermined region in the horizontal scanning direction corresponding to an image area in the horizontal scanning direction; and
an arrangement that, depending on the result obtained by the comparing unit, decides whether the phase modulator performs the magnification correction of the image or the frequency modulator performs the magnification correction of the image.

8. The image forming apparatus according to claim 7, further comprising a specified value-changing unit that changes the specified value.

9. The image forming apparatus according to claim 8, wherein the specified value-changing unit changes the specified value according to the type, size, or orientation of a transfer paper.

10. The image forming apparatus according to claim 7, wherein the phase modulator corrects a write start position in the horizontal scanning direction by a write start position-correcting phase adjustment amount, and corrects a magnification in the horizontal scanning direction by a magnification-correcting phase adjustment amount in the horizontal scanning direction, and
the comparing unit compares the magnification-correcting phase adjustment amount in the horizontal scanning predetermined region with the specified value.

11. The image forming apparatus according to claim 7, wherein the phase modulator corrects a write start position in the horizontal scanning direction by a write start position-correcting phase adjustment amount, and corrects a magnification in the horizontal scanning direction by a magnification-correcting phase adjustment amount in the horizontal scanning direction, and
the comparing unit compares a phase adjustment amount obtained by adding up the write start position-correcting phase adjustment amount and the magnification-correcting phase adjustment amount in the horizontal scanning predetermined region with the specified value.

12. An image forming apparatus comprising:
a deflector that deflects optical beams modulated according to an image signal to perform scanning in a horizontal scanning direction to form an image on an image carrier;
two optical beam detectors that respectively detect optical beams deflected by the deflector at two positions on a horizontal scanning line;
a time difference measuring unit that measures the time difference between detection of the optical beams by the detectors;
a magnification correcting unit that corrects the magnification of an image in the horizontal scanning direction based on the time difference measured by the time difference measuring unit, wherein the magnification correcting unit includes
a frequency modulator that performs magnification correction of an image by changing a frequency of the image signal in units of line or lines; and
a phase modulator that performs magnification correction of the image by changing a cycle time of an optional pixel in units of pixel;
a comparing unit that compares the phase adjustment amount in a predetermined region in the horizontal scanning direction calculated by the phase modulator with a preset specified value;
a predetermined region-changing unit that changes the predetermined region in the horizontal scanning direction depending on a size, a shape, or an orientation of a transfer paper; and
an arrangement that, depending on the result obtained by the comparing unit, decides whether the phase modulator performs the magnification correction of the image or the frequency modulator performs the magnification correction of the image.

13. The image forming apparatus according to claim 12, further comprising a specified value-changing unit that changes the specified value.

14. The image forming apparatus according to claim 12, wherein the phase modulator corrects a write start position in the horizontal scanning direction by a write start position-correcting phase adjustment amount in a horizontal scanning predetermined region, and corrects a magnification in the horizontal scanning direction by a magnification-correcting phase adjustment amount in a horizontal scanning predetermined region, and
the comparing unit compares the magnification-correcting phase adjustment amount in the horizontal scanning predetermined region with the specified value.

15. The image forming apparatus according to claim 12, wherein the phase modulator corrects a write start position in the horizontal scanning direction by a write start position-correcting phase adjustment amount in a horizontal scanning predetermined region, and corrects a magnification in the horizontal scanning direction by a magnification-correcting phase adjustment amount in a horizontal scanning predetermined region, and
the comparing unit compares a phase adjustment amount obtained by adding up the write start position-correcting phase adjustment amount and the magnification-correcting phase adjustment amount in the horizontal scanning predetermined region with the specified value.

16. An image forming apparatus comprising:
a deflector that deflects optical beams modulated according to an image signal to perform scanning in a horizontal scanning direction to form an image on an image carrier;

two optical beam detectors that respectively detect optical beams deflected by the deflector at two positions on a horizontal scanning line;

a time difference measuring unit that measures the time difference between detection of the optical beams by the detectors;

a magnification correcting unit that corrects the magnification of an image in the horizontal scanning direction based on the time difference measured by the time difference measuring unit, wherein the magnification correcting unit includes a frequency modulator that performs magnification correction of an image by changing a frequency of the image signal in units of line or lines; and a phase modulator that performs magnification correction of the image by fixing the frequency and changing a cycle time of an optional pixel in the unit of pixel;

a comparing unit that compares the phase adjustment amount calculated by the phase modulator with a preset specified value;

a specified value-changing unit that changes the specified value according to an image type; and an arrangement that causes the phase modulator to perform the magnification correction of the image until the comparing unit determines that the phase adjustment amount exceeds the specified value, and, once the comparing unit determines that the phase adjustment amount exceeds the specified value, causes the frequency modulator to perform the magnification correction of the image.

17. The image forming apparatus according to claim 16, wherein the phase modulator corrects a write start position in the horizontal scanning direction by a write start position-correcting phase adjustment amount, and corrects a magnification in the horizontal scanning direction by a magnification-correcting phase adjustment amount, and the comparing unit compares the magnification-correcting phase adjustment amount in the horizontal scanning predetermined region with the specified value.

18. The image forming apparatus according to claim 16, wherein the phase modulator corrects a write start position in the horizontal scanning direction by a write start position-correcting phase adjustment amount, and corrects a magnification in the horizontal scanning direction by a magnification-correcting phase adjustment amount in the horizontal scanning direction, and the comparing unit compares a phase adjustment amount obtained by adding up the write start position-correcting phase adjustment amount and the magnification-correcting phase adjustment amount in the horizontal scanning direction with the specified value.

19. An image forming apparatus comprising:

a deflector that deflects optical beams modulated according to an image signal to perform scanning in a horizontal scanning direction to form an image on an image carrier;

two optical beam detectors that respectively detect optical beams deflected by the deflector at two positions on a horizontal scanning line;

a time difference measuring unit that measures the time difference between detection of the optical beams by the detectors;

a magnification correcting unit that corrects the magnification of an image in the horizontal scanning direction based on the time difference measured by the time difference measuring unit, wherein the magnification correcting unit includes a frequency modulator that performs magnification correction of an image by changing a frequency of the image signal in units of a line or lines; and a phase modulator that performs magnification correction of the image by fixing the frequency and changing a cycle time of an optional pixel in units of pixel;

a comparing unit that compares the phase adjustment amount in a horizontal scanning predetermined region calculated by the phase modulator with a preset specified value;

a specified value-changing unit that changes the specified value according to an image type; and an arrangement that, depending on the result obtained by the comparing unit, decides whether the phase modulator performs the magnification correction of the image or the frequency modulator performs the magnification correction of the image.

20. The image forming apparatus according to claim 19, wherein the horizontal scanning predetermined region is in the horizontal scanning image area.

21. The image forming apparatus according to claim 19, wherein the phase modulator corrects a write start position in the horizontal scanning direction by a write start position-correcting phase adjustment amount, and corrects a magnification in the horizontal scanning direction by a magnification-correcting phase adjustment amount, and the comparing unit compares the magnification-correcting phase adjustment amount in the horizontal scanning predetermined region with the specified value.

22. The image forming apparatus according to claim 19, wherein the phase modulator corrects a write start position in the horizontal scanning direction by a write start position-correcting phase adjustment amount, and corrects a magnification in the horizontal scanning direction by a magnification-correcting phase adjustment amount in the horizontal scanning direction, and the comparing unit compares a phase adjustment amount obtained by adding up the write start position-correcting phase adjustment amount and the magnification-correcting phase adjustment amount in the horizontal scanning predetermined region with the specified value.

23. An image forming apparatus comprising:

a deflector that deflects optical beams modulated according to an image signal to perform scanning in a horizontal scanning direction to form an image on an image carrier;

two optical beam detectors that respectively detect optical beams deflected by the deflector at two positions on a horizontal scanning line;

a time difference measuring unit that measures the time difference between detection of the optical beams by the detectors;

a magnification correcting unit that corrects the magnification of an image in the horizontal scanning direction based on the time difference measured by the time difference measuring unit, wherein the magnification correcting unit includes a frequency modulator that performs magnification correction of an image by changing a frequency of the image signal in units of a line or lines; and a phase modulator that performs magnification correction of the image by fixing the frequency and changing a cycle time of an optional pixel in units of pixel; and a frequency adjustment amount converter that converts the phase adjustment amount set by the phase modulator to a frequency adjustment amount by the frequency modulator.

24. The image forming apparatus according to claim 23, further comprising
- a comparing unit that compares the phase adjustment amount with a preset specified value; and
- an arrangement that causes the phase modulator to perform the magnification correction of the image upon the comparing unit determining that the phase adjustment amount does not exceed the specified value, and, once the comparing unit determines that the phase adjustment amount exceeds the specified value, causes the frequency modulator to perform the magnification correction of the image based on the frequency adjustment amount calculated by the frequency adjustment amount converter.

25. The image forming apparatus according to claim 23, wherein the phase modulator corrects a write start position in the horizontal scanning direction by a write start position-correcting phase adjustment amount, and corrects a magnification in the horizontal scanning direction by a magnification-correcting phase adjustment amount in the horizontal scanning direction, and
- the image forming apparatus further comprises a comparing unit that compares a phase adjustment amount obtained by adding up the write start position-correcting phase adjustment amount and the magnification-correcting phase adjustment amount in the horizontal scanning direction with a preset specified value; and
- an arrangement that causes the phase modulator to perform the magnification correction of the image upon the comparing unit determining that the phase adjustment amount does not exceed the specified value, and, once the comparing unit determines that the phase adjustment amount exceeds the specified value, causes the frequency modulator to perform the magnification correction of the image based on the frequency adjustment amount calculated by the frequency adjustment amount converter.

26. The image forming apparatus according to claim 23, wherein the phase modulator corrects a write start position in the horizontal scanning direction by a write start position-correcting phase adjustment amount, and corrects a magnification in the horizontal scanning direction by a magnification-correcting phase adjustment amount in the horizontal scanning direction, and
- the image forming apparatus further comprises a comparing unit that compares the magnification-correcting phase adjustment amount in the horizontal scanning direction with a preset specified value; and
- an arrangement that causes the phase modulator to perform the magnification correction of the image upon the comparing unit determining that the phase adjustment amount does not exceed the specified value, and, once the comparing unit determines that the phase adjustment amount exceeds the specified value, causes the frequency modulator to perform the magnification correction of the image based on the frequency adjustment amount calculated by the frequency adjustment amount converter.

27. The image forming apparatus according to claim 26, wherein the comparing unit compares the magnification-correcting phase adjustment amount in the horizontal scanning direction in a horizontal scanning predetermined region with the specified value.

28. The image forming apparatus according to claim 27, wherein the horizontal scanning predetermined region is in an image area in the horizontal scanning direction.

29. The image forming apparatus according to claim 24, wherein the phase modulator corrects a write start position in the horizontal scanning direction by a write start position-correcting phase adjustment amount, and corrects a magnification in the horizontal scanning direction by a magnification-correcting phase adjustment amount in the horizontal scanning direction, and
- the comparing unit compares a phase adjustment amount obtained by adding up the write start position-correcting phase adjustment amount and the magnification-correcting phase adjustment amount in the horizontal scanning direction in the horizontal scanning predetermined region with the specified value.

30. The image forming apparatus according to claim 24, wherein the phase modulator corrects a write start position in the horizontal scanning direction by a write start position-correcting phase adjustment amount, and corrects a magnification in the horizontal scanning direction by a magnification-correcting phase adjustment amount in the horizontal scanning direction, and
- the comparing unit compares the write start position-correcting phase adjustment amount in a horizontal scanning predetermined region with a preset specified value in the horizontal scanning predetermined region.

31. An image forming apparatus comprising:
- a deflector that deflects optical beams modulated according to an image signal to perform scanning in a horizontal scanning direction to form an image on an image carrier;
- two optical beam detectors that respectively detect optical beams deflected by the deflector at two positions on a horizontal scanning line;
- a time difference measuring unit that measures the time difference between detection of the optical beams by the detectors;
- a magnification correcting unit that corrects the magnification of an image in the horizontal scanning direction based on the time difference measured by the time difference measuring unit, wherein the magnification correcting unit includes
   - a frequency modulator that performs magnification correction of an image by changing a frequency of the image signal in units of a line or lines; and
   - a phase modulator that performs magnification correction of the image by fixing the frequency and changing a cycle time of an optional pixel in units of pixel;
- a frequency adjustment amount converter that converts the phase adjustment amount set by the phase modulator to a frequency adjustment amount by the frequency modulator;
- a comparing unit that compares the phase adjustment amount in a horizontal scanning predetermined region with a preset specified value;
- a region-changing unit that changes the horizontal scanning predetermined region according to a horizontal scanning imaging range; and
- an arrangement that causes the phase modulator to perform the magnification correction of the image upon the comparing unit determining that the phase adjustment amount does not exceed the specified value, and, once the comparing unit determines that the phase adjustment amount exceeds the specified value, causes the frequency modulator to perform the magnification correction of the image based on the frequency adjustment amount calculated by the frequency adjustment amount converter.

32. The image forming apparatus according to claim 31, further comprising a specified value-changing unit that changes the specified value according to the horizontal scanning imaging range.

33. The image forming apparatus according to claim 31, wherein the phase modulator corrects a write start position in the horizontal scanning direction by a write start position-correcting phase adjustment amount, and corrects a magnification in the horizontal scanning direction by a magnification-correcting phase adjustment amount in the horizontal scanning direction, and the comparing unit compares a phase adjustment amount obtained by adding up the write start position-correcting phase adjustment amount and the magnification-correcting phase adjustment amount in the horizontal scanning direction in the horizontal scanning predetermined region with the specified value.

34. The image forming apparatus according to claim 31, wherein the phase modulator corrects a write start position in the horizontal scanning direction by a write start position-correcting phase adjustment amount, and corrects a magnification in the horizontal scanning direction by a magnification-correcting phase adjustment amount in the horizontal scanning direction, and the comparing unit compares the magnification-correcting phase adjustment amount in the horizontal scanning direction in the horizontal scanning predetermined region with a preset specified value in the horizontal scanning predetermined region.

35. An image forming apparatus comprising:

a deflector that deflects optical beams modulated according to an image signal to perform scanning in a horizontal scanning direction to form an image on an image carrier;

two optical beam detectors that respectively detect optical beams deflected by the deflector at two positions on a horizontal scanning line;

a time difference measuring unit that measures the time difference between detection of the optical beams by the detectors;

a magnification correcting unit that corrects the magnification of an image in the horizontal scanning direction based on the time difference measured by the time difference measuring unit, wherein the magnification correcting unit includes a frequency modulator that performs magnification correction of an image by changing a frequency of the image signal in units of a line or lines; and a phase modulator that performs magnification correction of the image by fixing the frequency and changing a cycle time of an optional pixel in units of pixel;

a frequency adjustment amount converter that converts the phase adjustment amount set by the phase modulator to a frequency adjustment amount by the frequency modulator;

a comparing unit that compares the phase adjustment amount in a horizontal scanning predetermined region exceeds a preset specified value;

a region-changing unit that changes the horizontal scanning predetermined region according to a size, a shape, or an orientation of a transfer paper; and an arrangement that causes the phase modulator to perform the magnification correction of the image upon the comparing unit determining that the phase adjustment amount does not exceed the specified value, and, once the comparing unit determines that the phase adjustment amount exceeds the specified value, causes the frequency modulator to perform the magnification correction of the image based on the frequency adjustment amount calculated by the frequency adjustment amount converter.

36. The image forming apparatus according to claim 35, further comprising a specified value-changing unit that changes the specified value according to the size, the shape, or the orientation of the transfer paper.

37. The image forming apparatus according to claim 35, wherein the phase modulator corrects a write start position in the horizontal scanning direction by a write start position-correcting phase adjustment amount, and corrects a magnification in the horizontal scanning direction by a magnification-correcting phase adjustment amount in the horizontal scanning direction, and the comparing unit compares a phase adjustment amount obtained by adding up the write start position-correcting phase adjustment amount and the magnification-correcting phase adjustment amount in the horizontal scanning direction in the horizontal scanning predetermined region with the specified value.

38. The image forming apparatus according to claim 35, wherein the phase modulator corrects a write start position in the horizontal scanning direction by a write start position-correcting phase adjustment amount, and corrects a magnification in the horizontal scanning direction by a magnification-correcting phase adjustment amount in the horizontal scanning direction, and the comparing unit compares the magnification-correcting phase adjustment amount in the horizontal scanning direction in the horizontal scanning predetermined region with the specified value.

* * * * *